US010808789B2

(12) United States Patent
Fox et al.

(10) Patent No.: US 10,808,789 B2
(45) Date of Patent: *Oct. 20, 2020

(54) TRANSLATIONAL INERTER ASSEMBLY AND METHOD FOR DAMPING MOVEMENT OF A FLIGHT CONTROL SURFACE

(71) Applicant: The Boeing Company, Chicago, IL (US)

(72) Inventors: Michael T. Fox, Saint Charles, MO (US); Jeffrey M. Roach, Saint Charles, MO (US); Eric A. Howell, Ballwin, MO (US)

(73) Assignee: The Boeing Company, Chicago, IL (US)

( * ) Notice: Subject to any disclaimer, the term of this patent is extended or adjusted under 35 U.S.C. 154(b) by 125 days.

This patent is subject to a terminal disclaimer.

(21) Appl. No.: 16/159,633

(22) Filed: Oct. 13, 2018

(65) Prior Publication Data

US 2019/0048959 A1    Feb. 14, 2019

Related U.S. Application Data

(63) Continuation of application No. 15/867,940, filed on Jan. 11, 2018, now Pat. No. 10,145,434, which is a
(Continued)

(51) Int. Cl.
*F16F 7/10* (2006.01)
*F16F 7/06* (2006.01)
(Continued)

(52) U.S. Cl.
CPC ............... *F16F 7/065* (2013.01); *B64C 9/02* (2013.01); *F16F 7/1022* (2013.01);
(Continued)

(58) Field of Classification Search
CPC .......... B64C 9/02; B64C 13/24; B64C 13/34; B64C 13/40; B64C 9/30; F16F 7/1022;
(Continued)

(56) References Cited

U.S. PATENT DOCUMENTS 1,291,664 A * 1/1919 Von Schrenx ......... G05G 1/405
                                                     74/512
1,584,931 A * 5/1926 Handy ...................... F02D 9/00
                                                     137/483
(Continued)

FOREIGN PATENT DOCUMENTS

DE      102012215614 A1    5/2014
EP           1001184 A2    5/2000
WO       WO2012054774 A2   4/2012

OTHER PUBLICATIONS

Extended European Search Report, Appl. No. EP17161213.8, dated Oct. 10, 2017, 6 pages.
(Continued)

*Primary Examiner* — Medhat Badawi

(57) ABSTRACT

There is provided a translational inerter assembly for damping movement of a flight control surface of an aircraft with a support structure. The translational inerter assembly includes a press fit element rotatably disposed within the flight control surface. The translational inerter assembly further includes an inertia element disposed in the press fit element. The translational inerter assembly further includes a torsion bar coupled to the inertia element and to the support structure of the aircraft, such that when the flight control surface rotates, the inertia element translates, and movement of the flight control surface is dampened.

20 Claims, 23 Drawing Sheets

Related U.S. Application Data continuation-in-part of application No. 15/159,706, filed on May 19, 2016, now Pat. No. 10,088,006.

(51) Int. Cl.
| | | |
|---|---|---|
| *F16F 15/12* | (2006.01) | |
| *F16F 15/121* | (2006.01) | |
| *B64C 9/02* | (2006.01) | |

(52) U.S. Cl.
CPC ...... *F16F 15/1204* (2013.01); *F16F 15/1208* (2013.01); *F16F 15/1216* (2013.01)

(58) Field of Classification Search
CPC ...... F16F 15/02; F16F 15/073; F16F 2222/08; F16F 2232/02; F16F 2232/06; F16F 15/1204; F16F 15/1208; F16F 15/1216; F16F 7/065; F16H 19/04; F16H 2025/2043; F16H 2025/2075; F16H 2025/2078; F16H 25/2233; Y02T 50/32; Y02T 50/44
See application file for complete search history.

(56) References Cited

U.S. PATENT DOCUMENTS

| | | | | |
|---|---|---|---|---|
| 1,928,961 | A * | 10/1933 | Brown | A01B 63/06 172/492 |
| 2,611,282 | A * | 9/1952 | Bright | F16H 21/10 74/518 |
| 2,620,772 | A * | 12/1952 | McLane | B64C 13/24 91/369.1 |
| 2,669,401 | A * | 2/1954 | Bosserman | B64C 13/00 244/82 |
| 2,679,827 | A * | 6/1954 | Jack Perdue | F01B 17/02 92/8 |
| 2,720,368 | A * | 10/1955 | Payne, Jr. | B64C 13/00 244/223 |
| 2,721,446 | A * | 10/1955 | Bumb | F15B 1/24 60/415 |
| 2,796,774 | A * | 6/1957 | Peed, Jr. | B64C 13/24 74/522 |
| 2,817,483 | A * | 12/1957 | Hill | B64C 13/40 244/82 |
| 2,856,179 | A * | 10/1958 | Hogan | B64C 25/60 188/129 |
| 2,916,205 | A * | 12/1959 | Litz | G06G 5/00 235/201 ME |
| 2,974,908 | A * | 3/1961 | Platt | B64C 13/24 244/178 |
| 3,205,728 | A * | 9/1965 | Morris | B64C 29/0091 74/516 |
| 3,303,714 | A * | 2/1967 | Fontaine | B64C 13/24 74/470 |
| 3,369,779 | A * | 2/1968 | Frederiksen | B64C 13/24 244/226 |
| 3,603,577 | A * | 9/1971 | DeRaad | F16F 7/06 267/151 |
| 3,625,005 | A * | 12/1971 | Saunders et al. | B60T 13/162 60/550 |
| 3,633,366 | A * | 1/1972 | Cripe | B60T 13/10 60/550 |
| 3,693,474 | A * | 9/1972 | Trick | E02F 9/2004 74/522 |
| 3,707,075 | A * | 12/1972 | Cripe | B60T 7/04 60/550 |
| 3,709,522 | A * | 1/1973 | Olson | B60D 1/155 280/453 |
| 3,876,040 | A * | 4/1975 | Yang | F16F 7/1022 188/378 |
| 4,005,617 | A * | 2/1977 | Sourbel | B60T 7/06 74/516 |
| RE29,221 | E * | 5/1977 | Yang | F16F 7/1022 188/378 |
| 4,054,186 | A * | 10/1977 | Banks, Jr. | F16F 7/1022 188/378 |
| 4,177,882 | A * | 12/1979 | Dowell | F16L 3/202 188/185 |
| 4,241,814 | A * | 12/1980 | Masclet | F16D 57/06 188/266 |
| 4,276,967 | A * | 7/1981 | Dowell | F16F 7/1022 188/134 |
| 4,474,273 | A * | 10/1984 | Le Pierres | F16F 7/04 188/129 |
| 4,525,126 | A * | 6/1985 | Laumont | F04C 11/008 417/310 |
| 4,595,158 | A * | 6/1986 | Robinson | B64C 9/02 244/223 |
| 4,722,238 | A * | 2/1988 | Navarro | B23F 1/06 74/422 |
| 4,739,962 | A * | 4/1988 | Morita | F16F 9/34 267/140.13 |
| 4,773,620 | A * | 9/1988 | Seidel | B64C 3/50 244/99.2 |
| 4,865,269 | A * | 9/1989 | Metcalf | B64C 13/14 244/99.13 |
| 4,898,257 | A * | 2/1990 | Brandstadter | B60G 17/0152 180/22 |
| 5,307,892 | A * | 5/1994 | Phillips | B62D 5/09 180/422 |
| 5,337,864 | A * | 8/1994 | Sjostrom | B60G 13/18 188/266.2 |
| 5,431,015 | A * | 7/1995 | Hein | F15B 15/068 244/99.5 |
| 5,435,531 | A * | 7/1995 | Smith | F16F 15/02 188/378 |
| 5,593,109 | A * | 1/1997 | Williams | G05D 17/02 244/3.21 |
| 5,620,168 | A * | 4/1997 | Ohtake | F16F 13/26 267/140.13 |
| 5,704,596 | A * | 1/1998 | Smith | F16F 7/1005 188/285 |
| 5,788,029 | A * | 8/1998 | Smith | F16F 7/1005 188/267 |
| 5,992,582 | A * | 11/1999 | Lou | F16F 9/12 188/267.1 |
| 6,032,552 | A * | 3/2000 | Alleai | F16F 7/10 248/562 |
| 6,230,450 | B1 * | 5/2001 | Kuroda | E04H 9/02 188/322.5 |
| 6,253,888 | B1 * | 7/2001 | Bell | F16F 9/504 188/275 |
| 6,352,143 | B1 * | 3/2002 | Niaura | F16F 9/532 188/267.1 |
| 6,412,616 | B1 * | 7/2002 | Allen | B60G 11/56 188/301 |
| 6,622,972 | B2 * | 9/2003 | Urnes, Sr. | G05D 1/0055 244/194 |
| 6,679,185 | B2 * | 1/2004 | Sullivan | B61B 10/046 104/172.1 |
| 6,698,688 | B1 * | 3/2004 | Jones | B64C 1/26 244/99.3 |
| 6,983,832 | B2 * | 1/2006 | Namuduri | F16F 9/36 188/267.2 |
| 7,051,849 | B2 * | 5/2006 | Browne | F16F 9/535 188/266.4 |
| 7,225,905 | B2 * | 6/2007 | Namuduri | F16F 9/535 188/267.1 |
| 7,285,933 | B2 * | 10/2007 | A'Harrah | B64C 13/10 318/638 |
| 7,316,303 | B2 | 1/2008 | Smith | |
| 7,484,743 | B2 * | 2/2009 | Gorodisher | B60G 17/04 280/89.13 |
| 7,503,523 | B2 * | 3/2009 | Perez-Sanchez | B64C 1/36 220/810 |
| 7,510,150 | B2 * | 3/2009 | Williams | B64C 9/02 244/211 |
| 7,631,736 | B2 * | 12/2009 | Thies | B60G 17/0272 188/380 |

(56) References Cited

U.S. PATENT DOCUMENTS

| | | | | |
|---|---|---|---|---|
| 8,567,714 | B2* | 10/2013 | Sheahan, Jr. | B64C 13/24 244/213 |
| 8,611,201 | B2* | 12/2013 | Desjardins | G11B 19/2018 369/263.1 |
| 8,725,321 | B2* | 5/2014 | Hagerott | B64C 9/04 701/10 |
| 9,103,466 | B2* | 8/2015 | McNeely | F16K 17/0433 |
| 9,127,507 | B2* | 9/2015 | Jensen | E21B 4/006 |
| 9,315,256 | B2* | 4/2016 | Maenz | B64C 9/02 |
| 9,316,297 | B2* | 4/2016 | Watanabe | F16C 11/0614 |
| 9,334,914 | B2* | 5/2016 | Gartner | F16F 7/1022 |
| 9,340,278 | B2* | 5/2016 | Hagerott | B64C 9/04 |
| 9,702,349 | B2* | 7/2017 | Anderson | B60G 17/019 |
| 2003/0005142 | A1* | 1/2003 | Elzur | H04L 69/22 709/232 |
| 2004/0079839 | A1* | 4/2004 | Bath | B64C 1/26 244/131 |
| 2005/0034943 | A1* | 2/2005 | Smith | F16F 7/1022 188/301 |
| 2005/0212189 | A1* | 9/2005 | Kondo | F16F 15/03 267/195 |
| 2005/0217906 | A1* | 10/2005 | Spark | B60T 8/24 180/22 |
| 2005/0230201 | A1* | 10/2005 | Kondou | B60G 13/00 188/267 |
| 2007/0045918 | A1* | 3/2007 | Thornhill | F16F 13/1463 267/140.12 |
| 2009/0108510 | A1* | 4/2009 | Wang | F16F 7/1022 267/75 |
| 2009/0139225 | A1* | 6/2009 | Wang | F15B 7/008 60/469 |
| 2009/0212475 | A1* | 8/2009 | Tropf | F16F 15/02 267/75 |
| 2010/0038473 | A1* | 2/2010 | Schneider | B64D 27/24 244/60 |
| 2010/0148463 | A1* | 6/2010 | Wang | B60G 13/14 280/124.101 |
| 2010/0296293 | A1* | 11/2010 | Herbert | F16F 15/02 362/276 |
| 2012/0199428 | A1* | 8/2012 | Smith | F16F 7/1034 188/280 |
| 2012/0227485 | A1* | 9/2012 | Gregory | G01M 1/36 73/460 |
| 2013/0030648 | A1* | 1/2013 | Matsumoto | B60W 10/06 701/37 |
| 2013/0032442 | A1* | 2/2013 | Tuluie | B60G 13/16 188/378 |
| 2013/0037362 | A1* | 2/2013 | Gartner | F16F 9/19 188/378 |
| 2013/0200248 | A1* | 8/2013 | Polzer | G01R 33/022 248/550 |
| 2013/0205944 | A1* | 8/2013 | Sudau | F16F 15/1315 74/573.1 |
| 2014/0156143 | A1* | 6/2014 | Evangelou | B60G 17/0157 701/37 |
| 2014/0231197 | A1* | 8/2014 | Watanabe | F16F 9/12 188/290 |
| 2014/0246820 | A1* | 9/2014 | Chen | F16F 15/02 267/140.11 |
| 2014/0260778 | A1* | 9/2014 | Versteyhe | F16F 15/1204 74/572.2 |
| 2015/0123467 | A1* | 5/2015 | Yasui | H02J 4/00 307/9.1 |
| 2015/0224845 | A1* | 8/2015 | Anderson | B60G 17/019 701/37 |
| 2016/0229443 | A1* | 8/2016 | Takei | B62D 3/126 |
| 2017/0182859 | A1* | 6/2017 | Anderson | B60G 17/019 |
| 2017/0254366 | A1* | 9/2017 | Antchak | F16F 15/1216 |
| 2017/0297748 | A1* | 10/2017 | Zondervan | B64C 19/00 |
| 2017/0314584 | A1* | 11/2017 | Holtgraver | F15B 15/2815 |
| 2017/0335916 | A1* | 11/2017 | Fox | B64C 13/40 |
| 2018/0065151 | A1* | 3/2018 | Houston | H02K 7/061 |
| 2018/0135717 | A1* | 5/2018 | Fox | F16F 7/1022 |
| 2018/0154728 | A1* | 6/2018 | Giovanardi | B60G 17/04 |
| 2018/0156293 | A1* | 6/2018 | Fox | F16F 15/073 |
| 2019/0048959 | A1* | 2/2019 | Fox | F16F 7/065 |

OTHER PUBLICATIONS

Notification of European Publication No. EP17161213.8, dated Oct. 25, 2017, 2 pages.

* cited by examiner

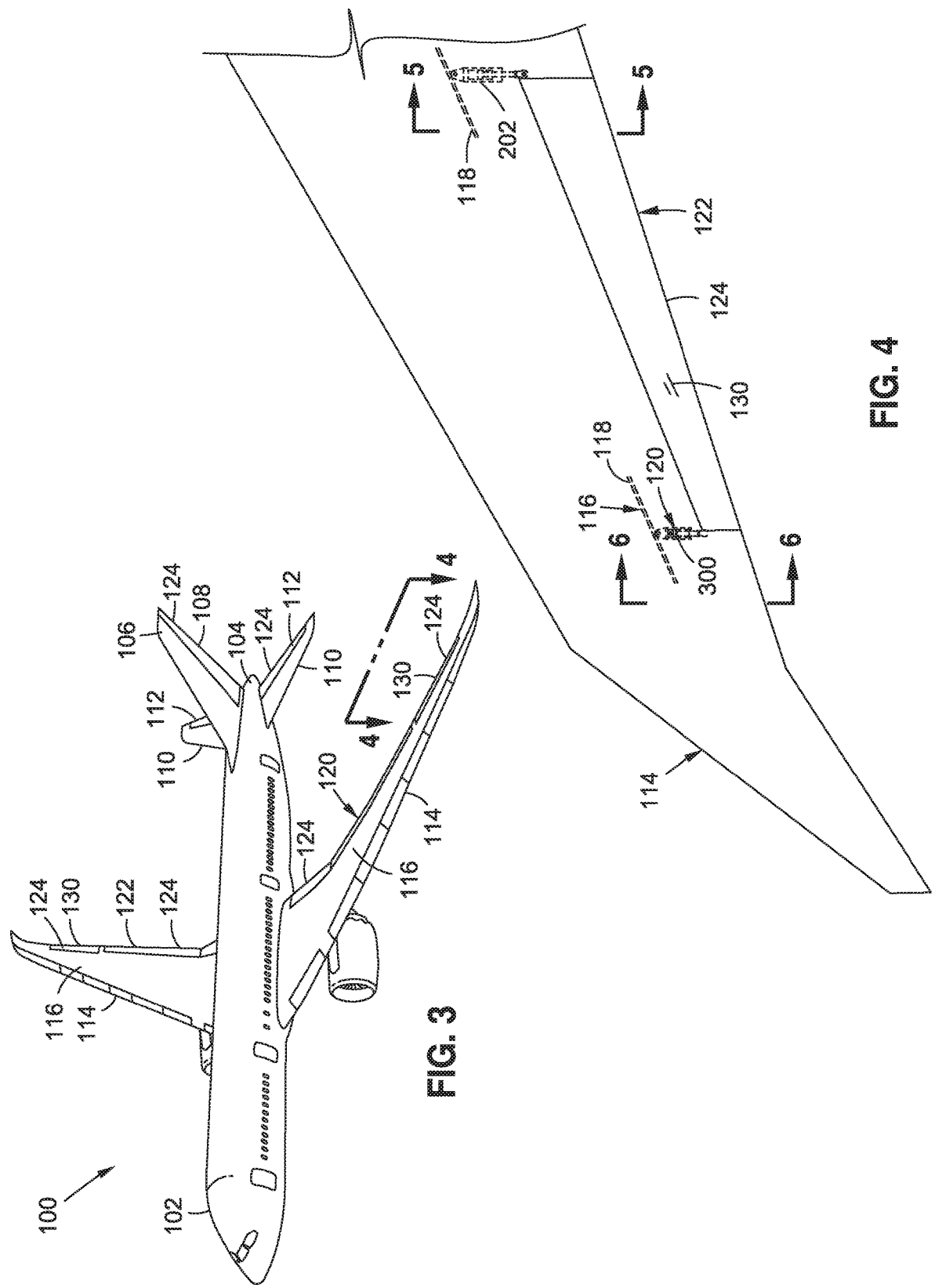

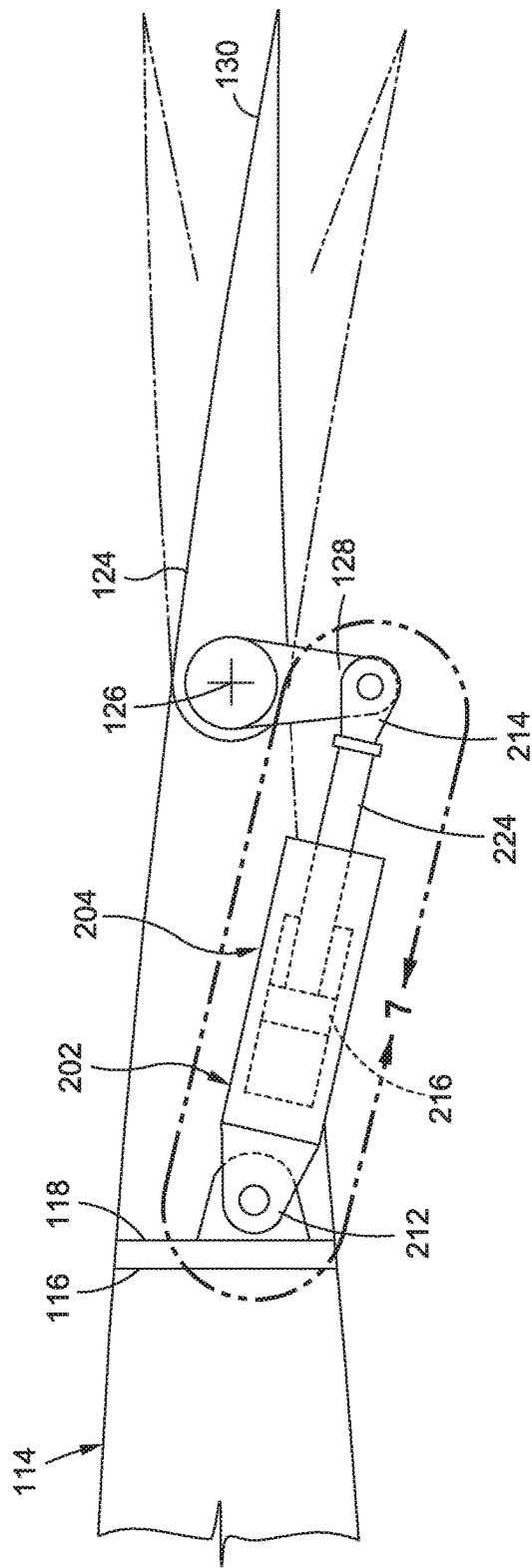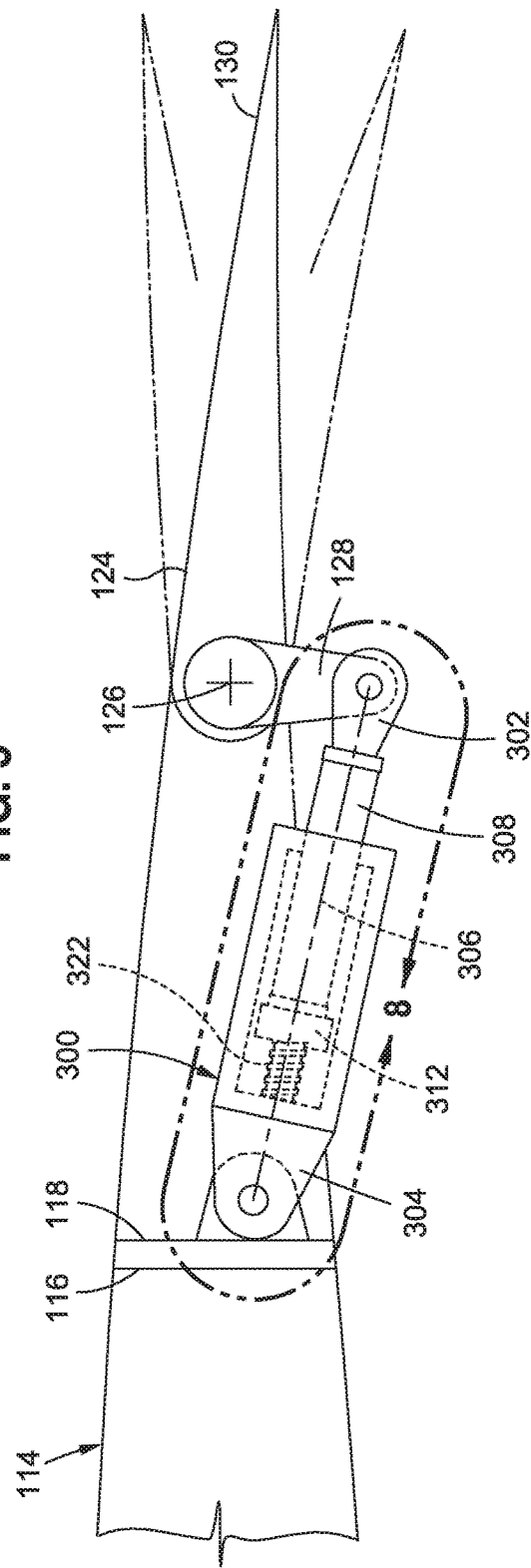

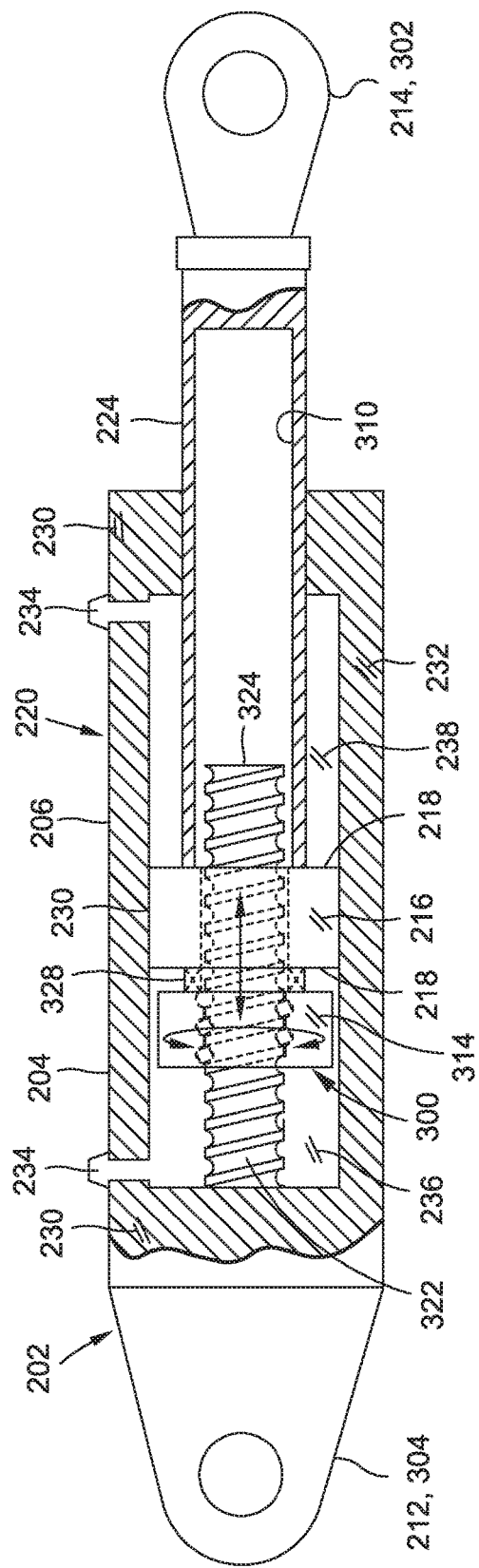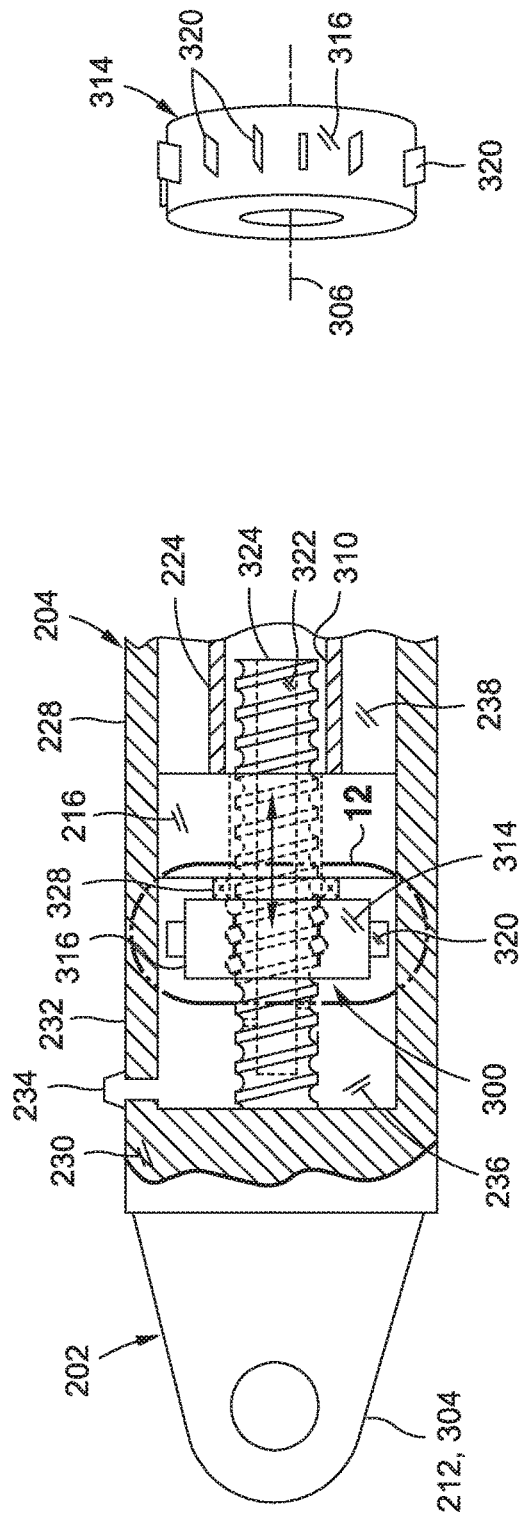

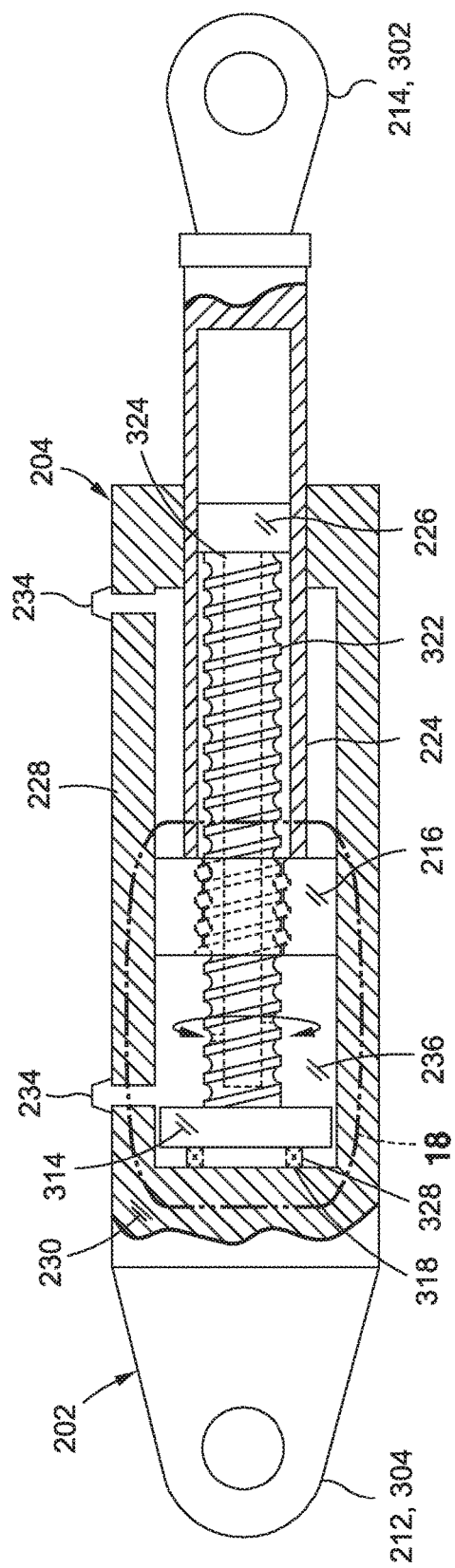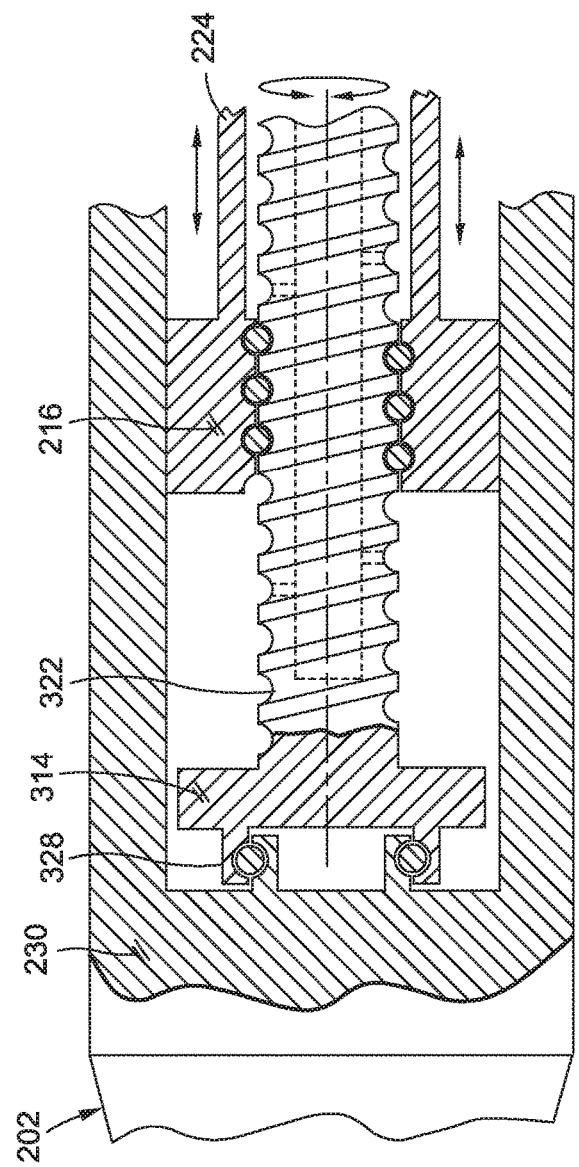
FIG. 17
FIG. 18

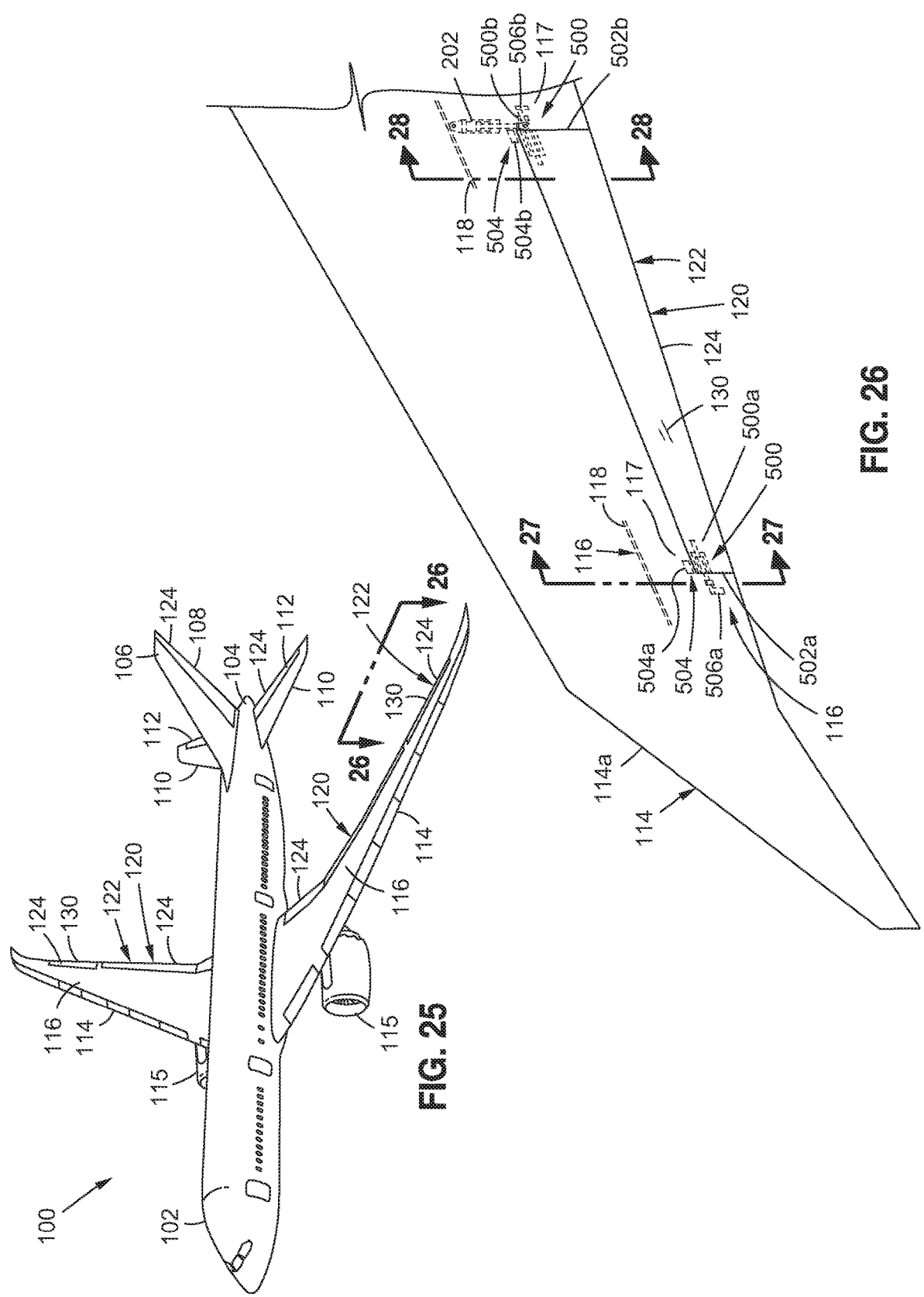

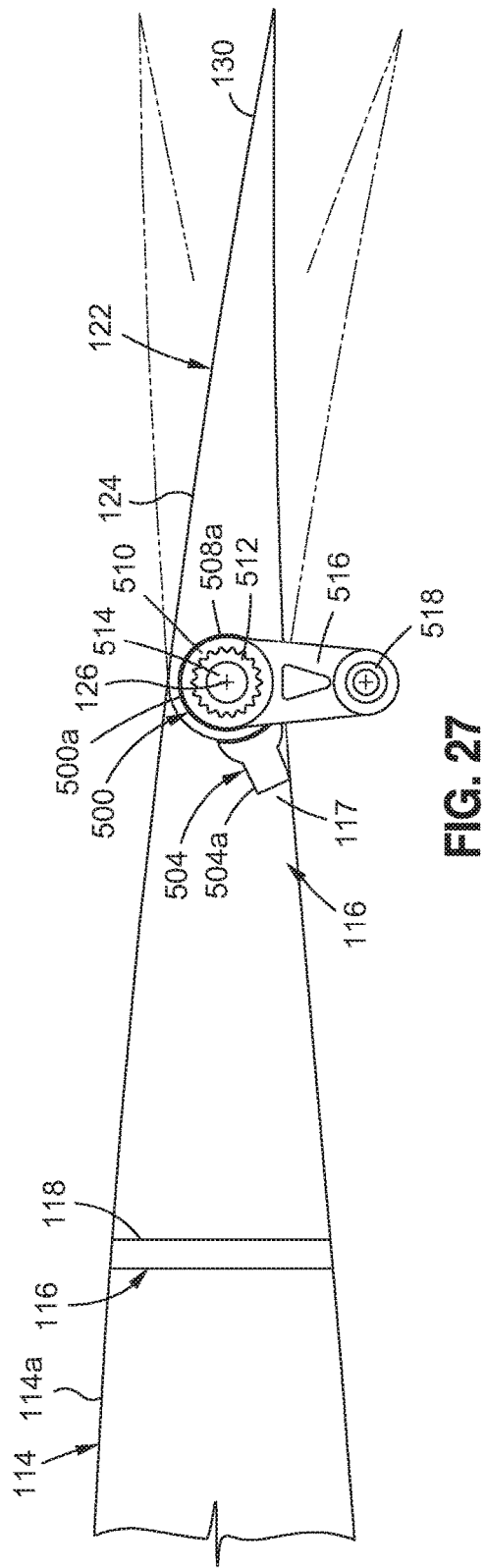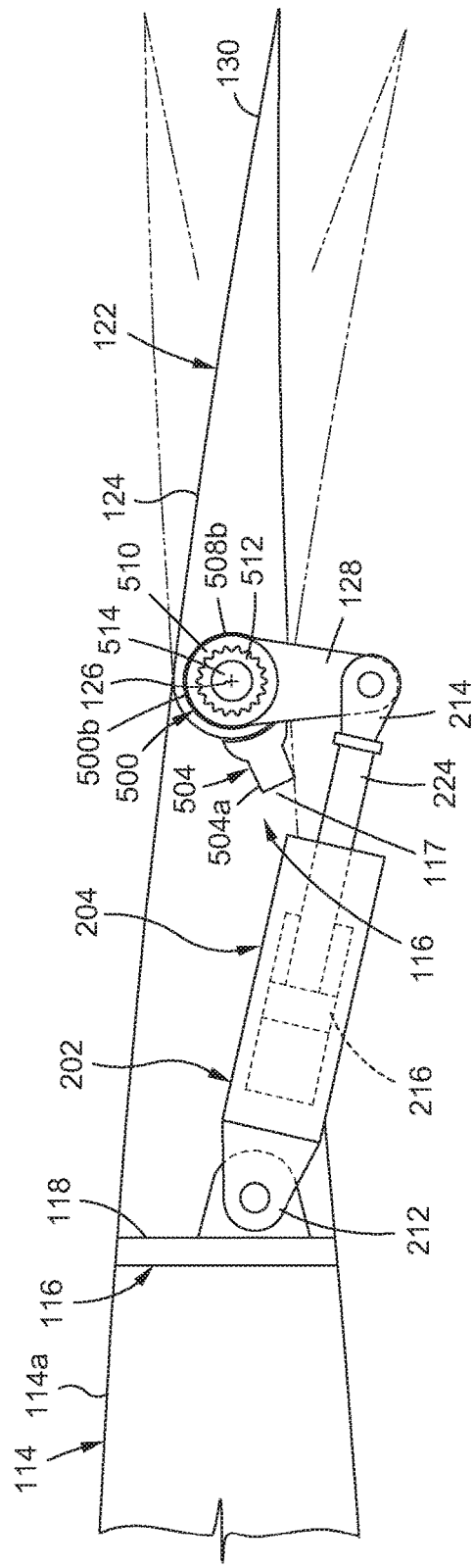

TRANSLATIONAL INERTER ASSEMBLY AND METHOD FOR DAMPING MOVEMENT OF A FLIGHT CONTROL SURFACE

CROSS-REFERENCE TO RELATED APPLICATIONS

The present application is a continuation application of and claims priority to pending U.S. application Ser. No. 15/867,940, filed on Jan. 11, 2018, now U.S. Pat. No. 10,145,434, issued Dec. 4, 2018, and entitled "Translational Inerter Assembly and Method for Damping Movement of a Flight Control Surface", the entire contents of which is expressly incorporated by reference herein, and the present continuation application is related to contemporaneously filed continuation application U.S. patent application Ser. No. 16/159,636, titled "Dual Rack and Pinion Rotational Inerter System and Method for Damping Movement of a Flight Control Surface of an Aircraft", filed on Oct. 13, 2018, now U.S. Pat. No. 10,352,389, issued Jul. 16, 2019, the entire contents of which is expressly incorporated by reference herein; and which U.S. application Ser. No. 15/867,940 is a continuation-in-part application of and claims priority to U.S. application Ser. No. 15/159,706, filed on May 19, 2016, now U.S. Pat. No. 10,088,006, issued Oct. 2, 2018, entitled "Rotational Inerter and Method for Damping an Actuator", the entire contents of which is expressly incorporated by reference herein, and which U.S. application Ser. No. 15/867,940 is related to continuation-in-part U.S. patent application Ser. No. 15/867,988, titled "Dual Rack and Pinion Rotational Inerter System and Method for Damping Movement of a Flight Control Surface of an Aircraft", filed on Jan. 11, 2018, now U.S. Pat. No. 10,107,347, issued Oct. 23, 2018, the entire contents of which is expressly incorporated by reference herein.

FIELD

The present disclosure relates to actuators and, more particularly, to a translational inerter assembly and method for damping movement of a flight control surface.

BACKGROUND

Aircraft typically include a flight control system for directional and attitude control of the aircraft in response to commands from a flight crew or an autopilot. A flight control system may include a plurality of movable flight control surfaces such as ailerons on the wings for roll control, elevators on the horizontal tail of the empennage for pitch control, a rudder on the vertical tail of the empennage for yaw control, and other movable control surfaces. Movement of a flight control surface is typically effected by one or more actuators mechanically coupled between a support structure (e.g., a wing spar) and the flight control surface (e.g., an aileron). In many aircraft, the actuators for flight control surfaces are linear hydraulic actuators driven by one or more hydraulic systems which typically operate at a fixed working pressure.

One of the challenges facing aircraft designers is preventing the occurrence of flutter of the flight control surfaces during flight. Control surface flutter may be described as unstable aerodynamically-induced oscillations of the flight control surface, and may occur in flight control systems where the operating bandwidth of the flight control system overlaps the resonant frequency of the flight control surface. Unless damped, the oscillations may rapidly increase in amplitude with the potential for undesirable results, including exceeding the strength capability of the mounting system of the flight control surface and the actuator. Contributing to the potential for control surface flutter is elasticity in the flight control system. For example, hydraulic actuators may exhibit a linear spring response under load due to compressibility of the hydraulic fluid. The compressibility of the hydraulic fluid may be characterized by the cross-sectional area of the actuator piston, the volume of the hydraulic fluid, and the effective bulk modulus of elasticity of the hydraulic fluid.

One method of addressing control surface flutter involves designing the flight control system such that the operating bandwidth does not overlap the resonant frequency of the flight control surface, and may include limiting the inertia of the load on the actuator and/or increasing the piston cross-sectional area as a means to react the inertia load. Unfortunately, the above known methods result in an actuator system that is sized not to provide the actuator with static load-carrying capability, but rather to provide the actuator with the ability to react larger inertia as a means to avoid resonance in the operating bandwidth. As may be appreciated, limiting control surface inertia corresponds to a decrease in control surface area. A decrease in the surface area of higher inertia control surfaces of an aircraft empennage may reduce the attitude controllability of the aircraft. As may be appreciated, an increase in the piston cross-sectional area of an actuator corresponds to an increase in the size and weight of the hydraulic system components including the size and weight of the actuators, tubing, reservoirs, and other components. The increased size of the actuators may protrude further outside of the outer mold line of the aerodynamic surfaces resulting in an increase in aerodynamic drag of an aircraft. The reduced attitude controllability, increased weight of the hydraulic system, and increased aerodynamic drag may reduce safety, fuel efficiency, range, and/or payload capacity of the aircraft.

As can be seen, there exists a need in the art for a system and method for allowing the operating bandwidth of an actuator to match or encompass the resonant frequency of a movable device without oscillatory response.

In addition, flutter suppression is a known challenge for high-pressure, hydraulic, flight-control actuation. High pressure hydraulics systems face an upper limit due to aero-servo-elasticity which drives a lower limit on actuator linear stiffness. That lower limit depends on the kinematics and inertia of the flight control surface.

Known flight control systems and method for addressing flutter suppression are primarily focused on increasing linear stiffness by increasing actuator piston diameter, which may cause increased flight control system and aircraft size, weight, and power. Increased flight control system and aircraft size, weight, and power may result in increased flight fuel costs. Other known flight control systems and methods for addressing flutter suppression attempt to enhance the active control system performance by increasing the servo bandwidth to operate in the high dynamic resonant frequency range of the actuator and valve. However, such known flight control systems and methods involve the used of active control elements, such as the actuator and valve size or diameter, rather than a passive means to change the dynamics of the flight control system. The use of such active control elements may overly complicate the control elements and be less space efficient.

As can be seen, there exists a need in the art for an assembly and method to address flutter suppression and flutter critical control surface applications on aircraft, to dampen movement of flight control surfaces, and to optimize a flight control system design in terms of space efficiency and changing the dynamic characteristics of the hardware under control rather than complicating the flight control system elements themselves.

SUMMARY

The above-noted needs associated with actuators are specifically addressed and alleviated by the present disclosure which provides a translational inerter assembly for damping movement of a flight control surface of an aircraft. The translational inerter assembly comprises a press fit element fixedly disposed within a first end of the flight control surface and rotatably movable with the flight control surface. The translational inerter assembly further comprises an inertia element coupled to and installed in the press fit element. The inertia element has a plurality of exterior helical splines corresponding to a plurality of interior helical splines of the press fit element.

The translational inerter assembly further comprises a torsion bar having a torsion bar first end coupled to and installed in the inertia element, and having a torsion bar second end fixedly attached to a support structure of the aircraft. The torsion bar further has a plurality of exterior linear splines corresponding to a plurality of interior linear splines of the inertia element. Rotation of the flight control surface causes translational movement of the inertia element, via the press fit element, along a hinge axis of the flight control surface and along the torsion bar, resulting in the translational inerter assembly damping movement of the flight control surface.

Also disclosed is an aircraft comprising a flight control surface pivotably coupled to a support structure. The aircraft further comprises one or more actuators configured to actuate the flight control surface. The aircraft further discloses at least one translational inerter assembly for damping movement of the flight control surface. The at least one translational inerter assembly is attached to a first end of the flight control surface.

The at least one translational inerter assembly comprises a press fit element fixedly disposed within the first end of the flight control surface and rotatably movable with the flight control surface. The at least one translational inerter assembly further comprises an inertia element coupled to and installed in the press fit element. The inertia element has a plurality of exterior helical splines corresponding to a plurality of interior helical splines of the press fit element.

The at least one translational inerter assembly further comprises a torsion bar having a torsion bar first end coupled to and installed in the inertia element, and having a torsion bar second end fixedly attached to the support structure of the aircraft. The torsion bar further has a plurality of exterior linear splines corresponding to a plurality of interior linear splines of the inertia element. Rotation of the flight control surface causes translational movement of the inertia element, via the press fit element, along a hinge axis of the flight control surface and along the torsion bar, resulting in the at least one translational inerter assembly damping movement of the flight control surface.

Also disclosed is a method for damping movement of a flight control surface of an aircraft. The method comprises the step of installing at least one translational inerter assembly at a first end of the flight control surface. The at least one translational inerter assembly comprises a press fit element fixedly disposed within the first end of the flight control surface and rotatably movable with the flight control surface. The at least one translational inerter assembly further comprises an inertia element coupled to and installed in the press fit element. The inertia element has a plurality of exterior helical splines corresponding to a plurality of interior helical splines of the press fit element. The at least one translational inerter assembly further comprises a torsion bar having a torsion bar first end coupled to and installed in the inertia element, and having a torsion bar second end fixedly attached to a support structure of the aircraft. The torsion bar further has a plurality of exterior linear splines corresponding to a plurality of interior linear splines of the inertia element.

The method further comprises the step of rotating the flight control surface using one or more actuators. The method further comprises the step of using the at least one translational inerter assembly to axially accelerate in a translational movement along a hinge axis of the flight control surface, the inertia element relative to the torsion bar, simultaneous with, and in proportion to, rotation of the flight control surface. The method further comprises the step of damping movement of the flight control surface, using the at least one translational inerter assembly.

Also disclosed is a translational inerter assembly for damping movement of a flight control surface of an aircraft with a support structure. The translational inerter assembly comprises a press fit element rotatably disposed within the flight control surface. The translational inerter assembly further comprises an inertia element disposed in the press fit element. The translational inerter assembly further comprises a torsion bar coupled to the inertia element and to the support structure of the aircraft, such that when the flight control surface rotates, the inertia element translates, and movement of the flight control surface is dampened.

Also disclosed is an aircraft comprising a flight control surface pivotably coupled to a support structure, one or more actuators actuating the flight control surface, and at least one translational inerter assembly for damping movement of the flight control surface. The at least one translational inerter assembly comprises a press fit element rotatably disposed within the flight control surface. The at least one translational inerter assembly further comprises an inertia element disposed in the press fit element. The at least one translational inerter assembly further comprises a torsion bar coupled to the inertia element and to the support structure, such that when the flight control surface rotates, the inertia element translates, and movement of the flight control surface is dampened.

Also disclosed is a method for damping movement of a flight control surface of an aircraft having a support structure. The method comprises the step of attaching at least one translational inerter assembly to the flight control surface. The at least one translational inerter assembly comprises a press fit element rotatably disposed within the flight control surface, an inertia element disposed in the press fit element, and a torsion bar coupled to the inertia element and to the support structure of the aircraft. The method further comprises rotating the flight control surface using one or more actuators, to cause the inertia element, via the press fit element, to translate along a hinge axis of the flight control surface, and to translate along the torsion bar. The method further comprises damping movement of the flight control surface, using the at least one translational inerter assembly. The method may further comprise, after attaching the at least one translational inerter assembly and prior to rotating the flight control surface, attaching another translational inerter assembly to the flight control surface, wherein the two translational inerter assemblies comprise a first translational inerter assembly, with a first press fit element, a first inertia element, and a first torsion bar, attached to a first end of the flight control surface, and comprise a second translational inerter assembly, with a second press fit element, a second inertia element, and a second torsion bar, attached to a second end of the flight control surface.

The above-noted needs associated with actuators are specifically addressed and alleviated by the present disclosure which provides an apparatus including an inerter for damping an actuator. The inerter includes a first terminal and a second terminal movable relative to one another along an inerter axis and configured to be mutually exclusively coupled to a support structure and a movable device actuated by an actuator. In one example, the inerter further includes a rod coupled to and movable with the first terminal. The inerter also includes a threaded shaft coupled to and movable with the second terminal. The inerter additionally includes a flywheel having a flywheel annulus coupled to the rod. The flywheel is configured to rotate in proportion to axial acceleration of the rod relative to the threaded shaft in correspondence with actuation of the movable device by the actuator.

Also disclosed is an aircraft having a flight control surface pivotably coupled to a support structure of the aircraft. The aircraft further includes a hydraulic actuator configured to actuate the flight control surface. In addition, the aircraft includes an inerter having a first terminal and a second terminal mutually exclusively coupled to the support structure and the flight control surface. The inerter additionally includes a rod movable with the first terminal, and a threaded shaft movable with the second terminal. The inerter also includes a flywheel coupled to the rod and the threaded shaft. The flywheel is configured to rotate in proportion to axial acceleration of the rod relative to the threaded shaft in correspondence with actuation of the flight control surface by the actuator.

In addition, disclosed is a method of damping an actuator. The method includes actuating, using an actuator, a movable device. In addition, the method includes axially accelerating, using an inerter coupled to the movable device, a first terminal relative to a second terminal of the inerter simultaneous with and in proportion to actuation of the movable device. Furthermore, the method includes rotationally accelerating a flywheel of the inerter in proportion to and simultaneous with the axial acceleration of the first terminal relative to the second terminal. Additionally, the method includes reducing actuator load oscillatory amplitude of the movable device and actuator in response to rotationally accelerating the flywheel.

The features, functions and advantages that have been discussed can be achieved independently in various examples of the present disclosure or may be combined in yet other examples, further details of which can be seen with reference to the following description and drawings below.

BRIEF DESCRIPTION OF THE DRAWINGS

These and other features of the present disclosure will become more apparent upon reference to the drawings wherein like numbers refer to like parts throughout and wherein:

FIG. 3 is a perspective view of an aircraft;

FIG. 4 is a top view of a portion of a wing illustrating an actuator and an inerter operatively coupled to an aileron;

FIG. 5 is a sectional view of a wing taken along line 5 of FIG. 4 and illustrating an example of a linear hydraulic actuator mechanically coupled between a wing spar and one end of an aileron;

FIG. 6 is a sectional view of the wing taken along line 6 of FIG. 4 and illustrating an example of an inerter coupled to the aileron on an end opposite the actuator;

FIG. 10 is a sectional view of an example of an inerter integrated into an unbalanced hydraulic actuator and illustrating the inerter flywheel rotatably coupled to a piston of the hydraulic actuator;

FIG. 11 is a sectional view of an example of an inerter having flywheel protrusions for generating viscous damping within hydraulic fluid during rotation of the flywheel;

FIG. 12 is a perspective view of an example of an inerter taken along line 12 of FIG. 11 and illustrating a plurality of radially extending flywheel blades circumferentially spaced around the flywheel perimeter;

FIG. 17 is a sectional view of an example of an inerter integrated into a hydraulic actuator and wherein the flywheel and threaded shaft are rotatably coupled to the actuator end wall and the piston fixedly coupled to the rod;

FIG. 18 is a magnified sectional view of the flywheel and piston taken along line 18 of FIG. 17 and illustrating the flywheel annulus rotatably coupled to the actuator end wall and the piston threadably engaged to the threaded shaft in a manner such that linear translation of the rod relative to the threaded shaft causes rotation of the flywheel and threaded shaft;

FIG. 25 is a perspective view of an aircraft;

FIG. 26 is a top view of a wing section of a wing, taken along line 26-26 of FIG. 25, illustrating an actuator and two translational inerter assemblies operatively coupled to a flight control surface in the form of an aileron;

FIG. 27 is a sectional view of the wing section, taken along line 27-27 of FIG. 26, and illustrating an example of a first translational inerter assembly installed in a first end opening of a first end of the flight control surface;

FIG. 28 is a sectional view of the wing section, taken along line 28-28 of FIG. 26, and illustrating an example of a second translational inerter assembly installed in a second end opening of a second end of the flight control surface;

DETAILED DESCRIPTION

Figure 1:
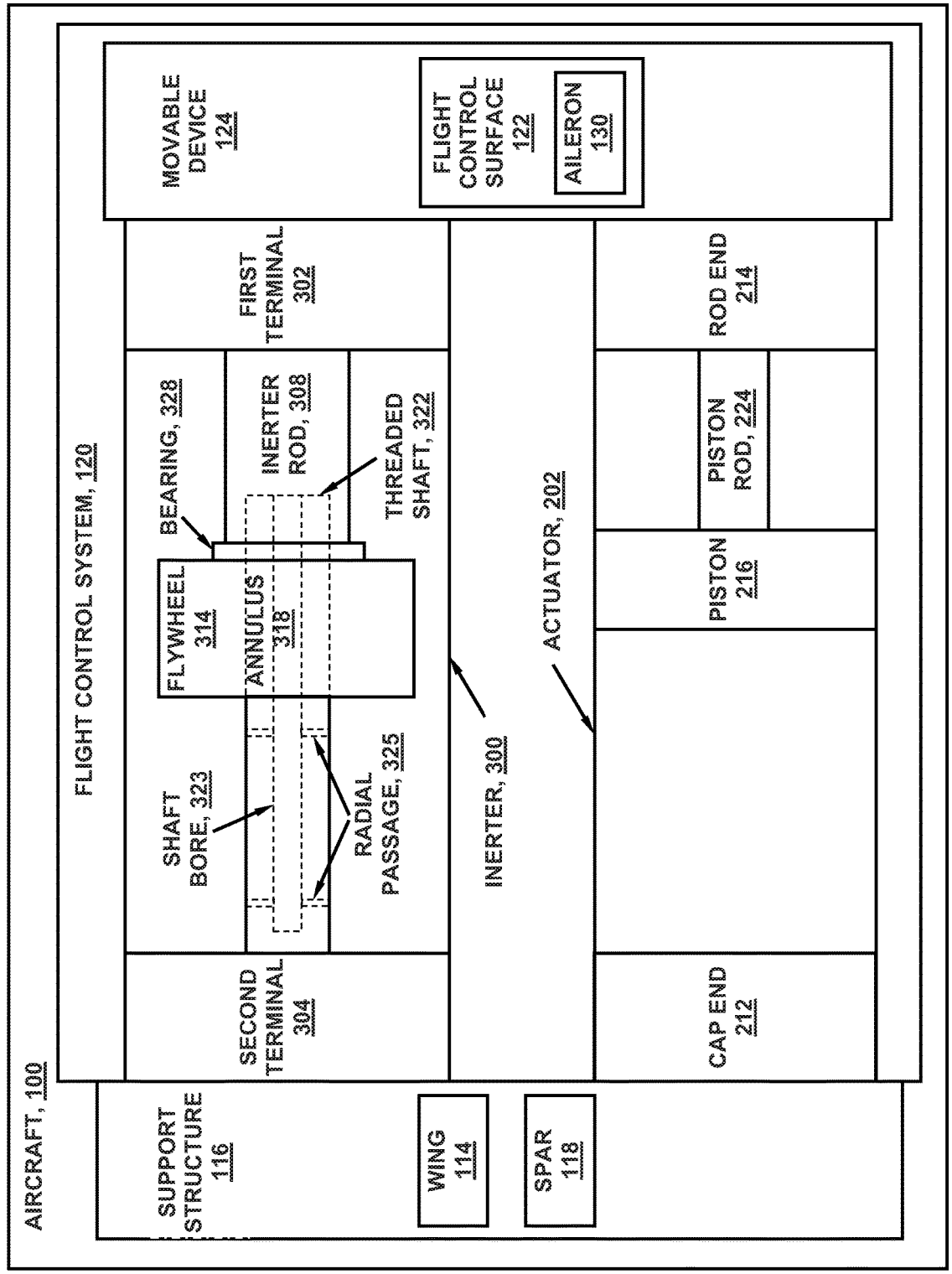
FIG. 1 is a block diagram of a flight control system of an aircraft including a hydraulic actuator for actuating a flight control surface and further including an inerter for damping the hydraulic actuator.

Referring now to the drawings wherein the showings are for purposes of illustrating various examples of the present disclosure, shown in FIG. 1 is a block diagram of a hydraulic actuator 204 coupled between a support structure 116 and a movable device 124 and configured to move or actuate the movable device 124. The block diagram advantageously includes a rotational inerter 300 for damping the actuator 202. The inerter 300 is shown coupled between the support structure 116 and the movable device 124 and is configured to improve the dynamic response of the movable device 124 during actuation by the actuator 202, as described in greater detail below. In the example shown in FIGS. 1 and 4-9, the inerter 300 is provided as a separate component from the actuator 202. However, in other examples (e.g., FIGS. 2 and 10-21) described below, the inerter 300 is integrated into the actuator 202.

The actuator 202 includes a piston 216 coupled to a piston rod 224. The piston 216 is slidable within an actuator housing 228 (e.g., a cylinder). The actuator 202 further includes a rod end 214 and a cap end 212 axially movable relative to one another in response to pressurized hydraulic fluid acting in an unbalanced manner on one or both sides of the piston 216 inside the actuator housing 228. In the example shown, the rod end 214 is coupled to the movable device 124 and the cap end 212 is coupled to the support structure 116. However, the actuator 202 may be mounted such that the rod end 214 is coupled to the support structure 116 and the cap end 212 is coupled to the movable device 124.

Referring still to FIG. 1, the inerter 300 includes a first terminal 302 and a second terminal 304 axially movable or translatable relative to one another along an inerter axis 306 (FIG. 8) in correspondence with actuation of the movable device 124 by the actuator 202. In the example shown, the first terminal 302 is coupled to the movable device 124 and the second terminal 304 is coupled to the support structure 116. However, the inerter 300 may be mounted such that the first terminal 302 is coupled to the support structure 116 and the second terminal 304 is coupled to the movable device 124. In an example not shown, the support structure to which the inerter 300 is coupled may be a different support structure than the support structure 116 to which the actuator 202 is coupled.

The inerter 300 includes an inerter rod 308 coupled to and axially movable (e.g., translatable) with the first terminal 302. The inerter rod 308 may be aligned with or parallel to the inerter axis 306. The inerter rod 308 may be hollow to define a rod bore 310. The threaded shaft 322 is coupled to and axially movable (e.g., translatable) with the second terminal 304. The threaded shaft 322 may be aligned with or parallel to the inerter axis 306. The threaded shaft 322 has a free end 324 that may be receivable within the rod bore 310. The threaded shaft 322 may be hollow or may include a shaft bore 323 open on the free end 324 of the threaded shaft 322. The threaded shaft 322 may include radial passages 325 extending radially from the shaft bore 323 to the exterior side of the threaded shaft 322 to allow fluid flow between the exterior side of the threaded shaft 322 and the shaft bore 323. The shaft bore 323 may allow fluid (e.g., hydraulic fluid—not shown) to flow from the fluid cavity at a second terminal 304 (for non-integrated inerters—FIG. 1) or cap end 212 (for integrated inerters—FIG. 2), through the shaft bore 323, and into the fluid cavity at the flee end 324 (FIG. 8) of the threaded shaft 322 to allow the fluid to lubricate moving parts of the bearing 328 and/or at the flywheel annulus 318. The size (e.g., diameter) of the shaft bore 323 and the size (e.g., diameter) and quantity of the radial passages 325 may be configured to apportion fluid flow to the bearing 328 and the flywheel annulus 318.

As shown in FIG. 1, the inerter 300 includes a flywheel 314 (e.g., a spinning mass). In some examples (e.g., FIGS.

6 and 8-16), the flywheel 314 is threadably coupled to the threaded shaft 322 which converts linear motion of the threaded shaft 322 into rotational motion of the flywheel 314. The flywheel 314 is configured to rotate in proportion to axial movement of the inerter rod 308 relative to the threaded shaft 322 in correspondence with actuation of the movable device 124 by the actuator 202. In this regard, the flywheel 314 is configured to rotationally accelerate and decelerate in proportion to axial acceleration and deceleration of the inerter rod 308 (e.g., coupled to the first terminal 302) relative to the threaded shaft 322 (e.g., coupled to the second terminal 304).

Advantageously, the flywheel 314 is coupled to the inerter rod 308 at a flywheel annulus 318 and is threadably engaged to the threaded shaft 322, as shown in FIGS. 1, 8-9, and 14 and described in greater detail below. However, in other examples, the flywheel annulus 318 may be coupled to the piston 216 as shown in FIGS. 10-13 and 15-16 and described below. In still further examples, the flywheel annulus 318 may be coupled to the actuator housing 228 as shown in FIGS. 17-20 and described below.

Regardless of the component to which the flywheel 314 is coupled, the flywheel 314 may include at least one bearing 328 (e.g., a thrust bearing 328) at the flywheel annulus 318 to rotatably couple the flywheel 314 to the inerter rod 308 (FIGS. 1, 8-9, and 14), the piston 216 (FIGS. 10-13 and 15-16), or the actuator housing 228 (FIGS. 17-20). The bearing 328 allows the flywheel 314 to axially translate with the inerter rod 308 as the flywheel 314 rotates on the threads of the threaded shaft 322 in response to axial movement of the inerter rod 308 relative to the threaded shaft 322. Advantageously, by coupling the flywheel 314 to the component (i.e., the inerter rod 308, the piston 216, or the actuator housing 228) at the flywheel annulus 318 instead of at the flywheel perimeter 316, the flywheel 314 exhibits limited flexure in the axial direction during high-frequency, oscillatory, axial acceleration of the first terminal 302 relative to the second terminal 304. Such axial flexure of the flywheel mass would otherwise reduce flywheel rotational motion during high-frequency, oscillatory, axial acceleration.

Referring still to the example of FIG. 1, the support structure 116 is shown configured as a wing spar 118 of a wing 114 of an aircraft 100. The movable device 124 is shown as a flight control surface 122 of a flight control system 120 of the aircraft 100. The flight control surface 122 may be hingedly coupled to the rigid support structure 116 such as a wing spar 118 or other structure. The flight control surface 122 may be pivotably about a hinge axis 126. The flight control surface 122 may comprise any one of a variety of different configurations including, but not limited to, a spoiler, an aileron, an elevator 112, an elevon, a flaperon, a rudder 108, a high-lift device such as a leading edge slat, a trailing edge flap, or any other type of movable device 124.

The actuator 202 provides positive force to move the flight control surface 122 to a commanded position in response to a command input from the flight crew or an autopilot. The inerter 300 provides for control and damping of displacements of the flight control surface 122. One or more inerters 300 may be included in a flight control system 120. In one example, the one or more inerters 300 may be configured to suppress or prevent control surface flutter as may be aerodynamically-induced at a resonant frequency of the flight control surface 122. For example, the presently-disclosed inerter 300 may be configured to reduce actuator load oscillatory amplitude at resonance (e.g., at a resonant frequency) of up to approximately 20 Hz (e.g., ±5 Hz) which may correspond to the flutter frequency of a flight control surface 122 of an aircraft 100. Additionally or alternatively, the inerter 300 may provide additional functionality for improving the dynamic response of a movable device 124, such as increasing the actuation rate of the movable device 124 and/or preventing position overshoot of a commanded position of the movable device 124, as described in greater detail below.

In one example, the inerter 300 may be configured such that rotation of the flywheel 314 reduces actuator load oscillatory amplitude at resonance of the coupled actuator 202 and movable device 124 by at least approximately 10 percent relative to the actuator load oscillatory amplitude that would otherwise occur using the same actuator 202 without an inerter 300. Advantageously, the presently-disclosed inerter 300 permits the operating bandwidth of the actuator 202 to encompass or match the resonant frequency of the coupled movable device 124 and actuator 202 without the potential for oscillatory response, without the potential for exceeding the strength capability of the mounting system (not shown) of the flight control surface 122 and actuator 202, and/or without the potential for flight control surface 122 deflections that could aerodynamically destabilize the aircraft 100.

The presently-disclosed examples of the inerter 300 allow for a reduction in the overall size and weight of an actuator 202 system without the potential for oscillatory response. More specifically, the inerter 300 allows for a reduction in the inertia or inertial load on the actuator 202 which, in turn, allows for a reduction in piston cross-sectional area of the actuator 202 and a decrease in the size and weight of other hydraulic system components including reservoirs, tubing diameter, accumulators, pumps, and other components. In this regard, the inerter 300 increases the power density for a hydraulic actuator system in any application where dynamic response is limited by piston cross-sectional area or load inertia. The presently-disclosed inerter 300 examples may be implemented with hydraulic actuators 204 configured to be operated at a working pressure of at least 5000 psi. For example, the inerter 300 examples may be implemented with hydraulic actuators 204 operated at a working pressure of approximately 3000 psi and, in some examples, the hydraulic actuators 204 may be operated at a working pressure of approximately 8000 psi. A relatively high working pressure of a hydraulic actuator 204 may facilitate a reduction in total flow of hydraulic fluid through the hydraulic system (e.g., flight control system 120) which may enable a reduction in the volumetric requirement for hydraulic fluid reservoirs and accumulators.

In the case of an aircraft 100, the reduced size of the actuators 202 may reduce the amount by which such actuators 202 protrude outside of the outer mold line (not shown) of the aircraft 100 with a resulting decrease in aerodynamic drag. Even further, the presently-disclosed inerter examples may allow for a reduction in the amount of off-take power from the aircraft propulsion units (e.g., gas-turbine engines) which may provide the potential for using higher bypass ratio gas turbine engines such as in commercial aircraft applications. The decrease in the size of the hydraulic system, the reduction in aerodynamic drag, and/or the reduction in off-take power may translate to an increase in aircraft performance including, but not limited to, increased fuel efficiency, range, and/or payload capacity.

Although the presently-disclosed inerter examples are described in the context of a linear hydraulic actuator 204, the inerter 300 may be implemented in other types of actuators 202 including, but not limited to, a rotary hydraulic actuator, an electro-hydraulic actuator (e.g., rotary or linear), a mechanical actuator, an electro-mechanical actuator, and other types of actuators. In one example (see FIG. 21), the electro-mechanical actuator 242 may be a linear electro-mechanical actuator having a threaded shaft 322 coupled to a movable device 124. As described in greater detail below with reference to FIG. 21, the linear electro-mechanical actuator 242 may include an electric actuator motor 244 for causing axial motion of a threaded shaft 322. A flywheel 314 may be threadably engaged to the threaded shaft 322 and may be configured to rotationally accelerate and decelerate in proportion to axial acceleration and deceleration of the threaded shaft 322 during actuation of the movable device 124 by the linear electro-mechanical actuator 242.

It should also be noted that although the presently-disclosed inerter examples are described in the context of an aircraft flight control system 120, any one of the inerters 300 may be implemented in any type of open-loop or closed-loop control system for use in any one of a variety of different applications in any industry, without limitation. In this regard, the presently-disclosed inerters 300 may be implemented in any vehicular application or non-vehicular application. For example, an inerter 300 may be implemented in any marine, ground, air, and/or space application, and in any vehicular or non-vehicular system, subsystem, assembly, subassembly, structure, building, machine, and application that uses an actuator to actuate a movable device.

In some examples, an inerter 300 may be implemented for damping movement of a movable device configured to control the direction of travel of a vehicle. For example, an inerter may be implemented for damping movement of aerodynamic control surfaces of an air vehicle, hydrodynamic control surfaces of a marine vessel, thrust directors including thrust-vectoring nozzles of an aircraft or a launch vehicle (e.g., a rocket), or any other type of mechanical device that influences the direction of travel of a vehicle and which may be susceptible to external vibratory forces. In a specific example of a wheeled vehicle configured to move over land, any one of the presently-disclosed inerter examples may be implemented in a steering system to control or avoid wheel shimmy, such as may occur in a steerable wheel of an aircraft landing gear such as a nose landing gear.

Figure 2:
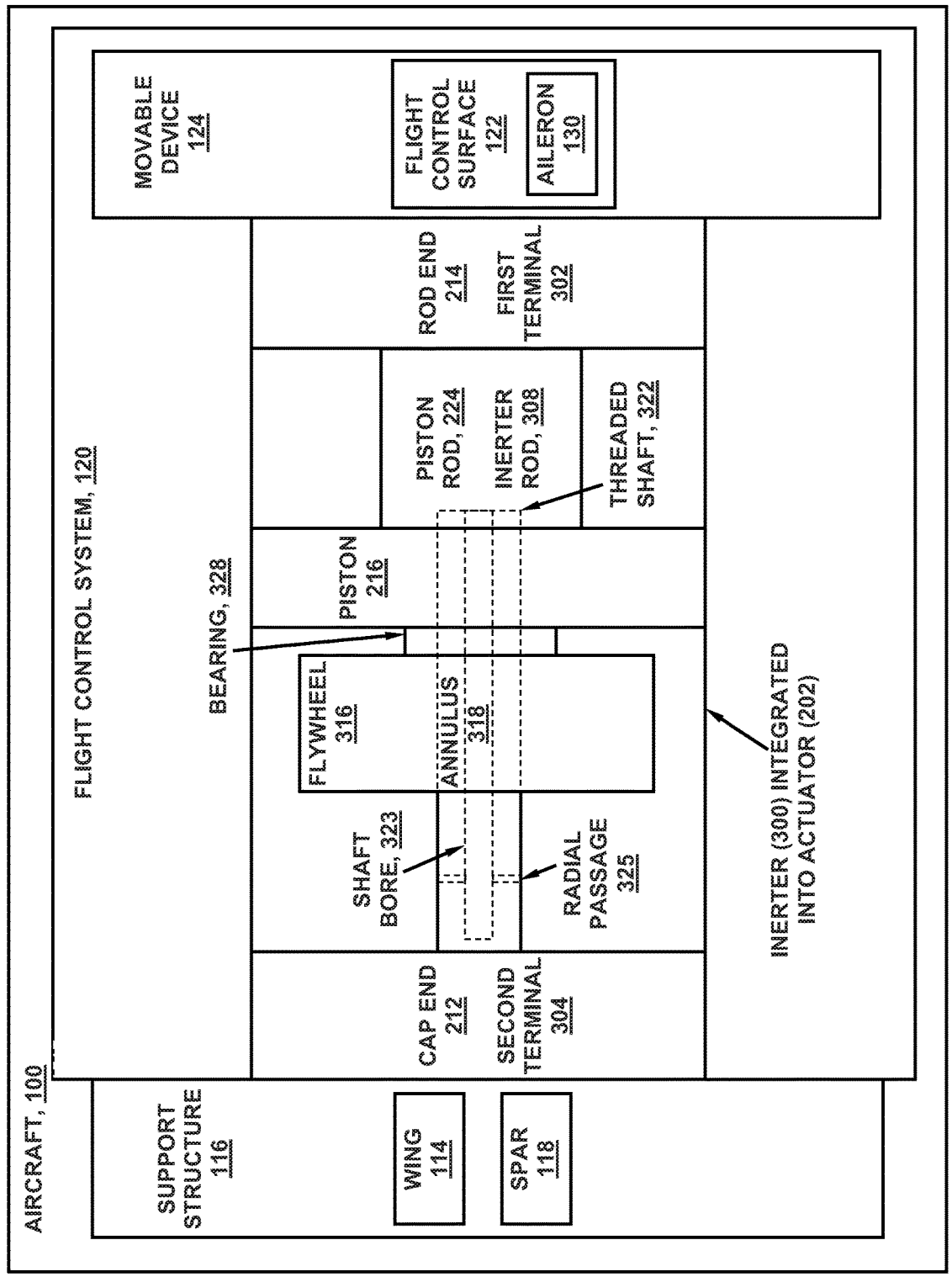
FIG. 2 is a block diagram of an example of an inerter integrated into a hydraulic actuator.

FIG. 2 is a block diagram of an example of an inerter 300 integrated into a hydraulic actuator 204 coupled between a support structure 116 and a flight control surface 122 of a flight control system 120 of an aircraft 100. In the example shown, the actuator 202 is a linear hydraulic actuator 204 having a piston 216 coupled to a rod (e.g., piston rod 224) and axially slidable within a housing (not shown). In the example shown, the flywheel 314 of the inerter 300 is rotatably coupled to the piston 216 at the flywheel annulus 318. The flywheel 314 is threadably coupled to the threaded shaft 322 and configured to rotationally accelerate in proportion to axial acceleration of the piston 216 and rod relative to the threaded shaft 322. However, as mentioned above, the flywheel 314 may be rotatably coupled to the piston 216 (e.g., FIGS. 10-16) or the flywheel 314 may be rotatably coupled to the cap end 212 (e.g., FIGS. 17-20) or rod end 214 of the actuator housing 228.

As mentioned above, the threaded shaft 322 may include a shaft bore 323 open on the free end 324 and having radial passages 325 to allow fluid (e.g., hydraulic fluid) to flow from the cap end chamber 236 at the cap end 212), through the shaft bore 323, and out of the free end 324 of the threaded shaft 322 to allow the fluid to lubricate moving parts of the bearing 328 and/or the flywheel annulus 318. The shaft bore 323 and radial passages 325 may be included in any one of the inerter 300 examples disclosed herein.

In the present disclosure, for examples wherein the inerter 300 is integrated into the actuator 202, the rod end 214 or cap end 212 of the actuator 202 functions as the first terminal 302 of the inerter 300, and the remaining rod end 214 or cap end 212 of the actuator 202 functions as the second terminal 304 of the inerter 300. In this regard, the terms "first terminal" and "second terminal" are non-respectively used interchangeably with the terms "rod end" and "cap end." In addition, for examples where the inerter 300 is integrated into the actuator 202, the term "rod" is used interchangeably with the terms "piston rod" and "inerter rod." Similarly, for examples where the inerter 300 is integrated into the actuator 202, the term "housing" is used interchangeably with the terms "actuator housing" and "inerter housing."

FIG. 3 is a perspective view of an aircraft 100 having one or more inerters 300 for control and/or damping of one or more actuators 202. The aircraft 100 may include a fuselage 102 and a pair of wings 114 extending outwardly from the fuselage 102. The aircraft 100 may include a pair of propulsion units (e.g., gas turbine engines). As mentioned above, each wing 114 may include one or more movable devices 124 configured as flight control surfaces 122 which may be actuated by an actuator 202 damped and/or assisted by an inerter 300. Such flight control surfaces 122 on the wings 114 may include, but are not limited to, spoilers, ailerons, and one or more high-lift devices such as a leading edge slats and/or trailing edge flaps. At the aft end of the fuselage 102, the empennage 104 may include one or more horizontal tails 110 and a vertical tail 106, any one or more of which may include flight control surfaces 122 such as an elevator 112, a rudder 108, or other types of movable devices 124 that may be actuated by an actuator 202 damped and/or assisted by an inerter 300.

FIG. 4 is a top view of a portion of the wing 114 of FIG. 3 illustrating an aileron actuated by a hydraulic actuator 204 located on one end of the aileron and having an inerter 300 located on an opposite and the aileron 130. The aileron 130 may be hingedly coupled to a fixed support structure 116 of the wing 114 such as a wing spar 118. In FIG. 4, the hydraulic actuator 204 and the inerter 300 are provided as separate components and may each be coupled between the support structure 116 (e.g., the wing spar 118) and the aileron 130.

FIG. 5 is a sectional view of the wing 114 of FIG. 4 showing an example of a linear hydraulic actuator 204 mechanically coupled between the wing spar 118 and one end of the aileron 130. In the example shown, the rod end 214 of the hydraulic actuator 204 is coupled to a bellcrank 128. The bellcrank 128 is hingedly coupled to the aileron in a manner such that linear actuation of the hydraulic actuator 204 causes pivoting of the aileron about the hinge axis 126. The cap end 212 of the hydraulic actuator 204 is coupled to the wing spar 118.

FIG. 6 is a sectional view of the wing 114 of FIG. 4 and showing an example of an inerter 300 coupled between the wing spar 118 and the aileron 130. As mentioned above, the inerter 300 is located on an end of the aileron opposite the hydraulic actuator 204. The first terminal 302 of the inerter 300 is coupled to a bellcrank 128. The second terminal 304 of the inerter 300 is coupled to the wing spar 118. Due to the hydraulic actuator 204 and the inerter 300 being coupled to the same movable device 124 (i.e., the aileron 130), relative axial acceleration of the cap end 212 and rod end 214 of the actuator 202 causes proportional axial acceleration of the first terminal 302 and second terminal 304 of the inerter 300 resulting in rotational acceleration of the flywheel 314.

Figure 7:
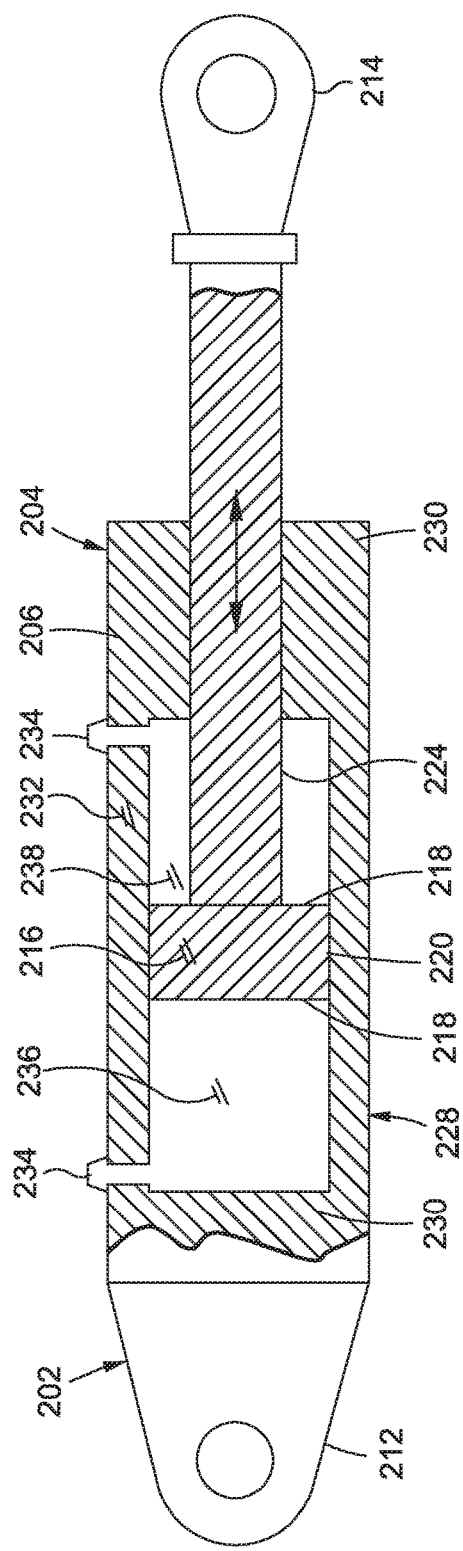
FIG. 7 is a sectional view of an example of a linear hydraulic actuator having a piston axially slidable within an actuator housing.

FIG. 7 is a partially cutaway sectional view of an example of a double-acting hydraulic actuator 204 having a cap end 212 and a rod end 214 axially movable relative to one another during actuation of the movable device 124. As mentioned above, the rod end 214 and the cap end 212 may be mutually exclusively coupled to the support structure 116 and the movable device 124. For example, the rod end 214 may be coupled to the support structure 116 and the cap end 212 may be coupled to the movable device 124, or the rod end 214 may be coupled to the movable device 124 and the cap end 212 may be coupled to the support structure 116.

In FIG. 7, the piston 216 is coupled to a free end 324 of the piston rod 224 and is axially slidable within the actuator housing 228. The piston 216 divides the actuator housing 228 into a cap end chamber 236 and a rod end chamber 238. The actuator housing 228 of the double-acting hydraulic actuator 204 includes a pair of fluid ports 234 through which pressurized hydraulic fluid enters and leaves the cap end chamber 236 and the rod end chamber 238 chambers for moving the piston 216 within the actuator housing 228. In any of the presently-disclosed examples, the hydraulic actuator 204 may also be configured as a single-acting actuator (not shown) wherein the actuator housing 228 contains a single fluid port 234 for receiving pressurized hydraulic fluid in the actuator housing 228 as a means to move the piston 216 along one direction within the actuator housing 228, and optionally include a biasing member (e.g., a spring—not shown) for moving the piston 216 in an opposite direction.

Figure 8:
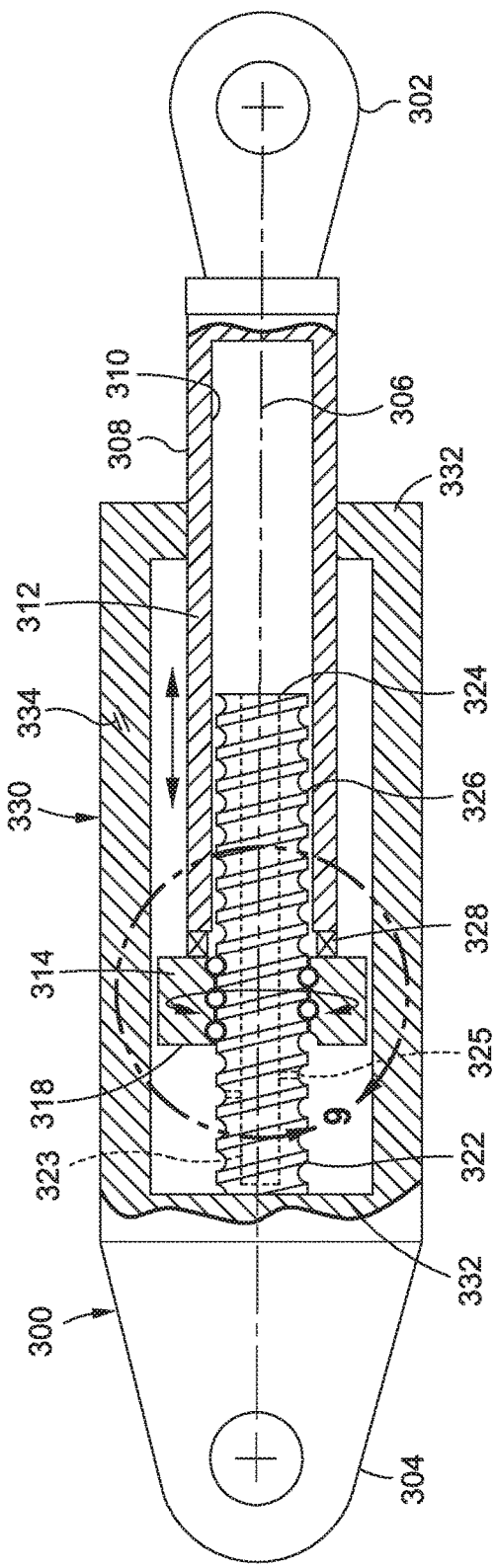
FIG. 8 is a sectional view of an example of an inerter having a rod coupled to a first terminal and a threaded shaft coupled to a second terminal and including a flywheel threadably engaged to the threaded shaft and configured to rotate in proportion to axial acceleration of the rod and first terminal relative to the threaded shaft and second terminal.

FIG. 8 is a partially cutaway sectional view of an example of an inerter 300 having an inerter housing 330 containing the flywheel 314 and having an inerter side wall 334 and opposing inerter end walls 332. One inerter end wall 332 may include a housing bore through which the inerter rod 308 extends and terminates at the first terminal 302. The inerter 300 includes a threaded shaft 322 coupled to the inerter end wall 332 located at the second terminal 304. In the example of FIG. 8, the flywheel 314 is coupled to an end of the inerter rod 308 and threadably engaged to the threaded shaft 322. The flywheel 314 rotates in proportion to axial acceleration of the inerter rod 308 and first terminal 302 relative to the threaded shaft 322 and second terminal 304.

Figure 9:
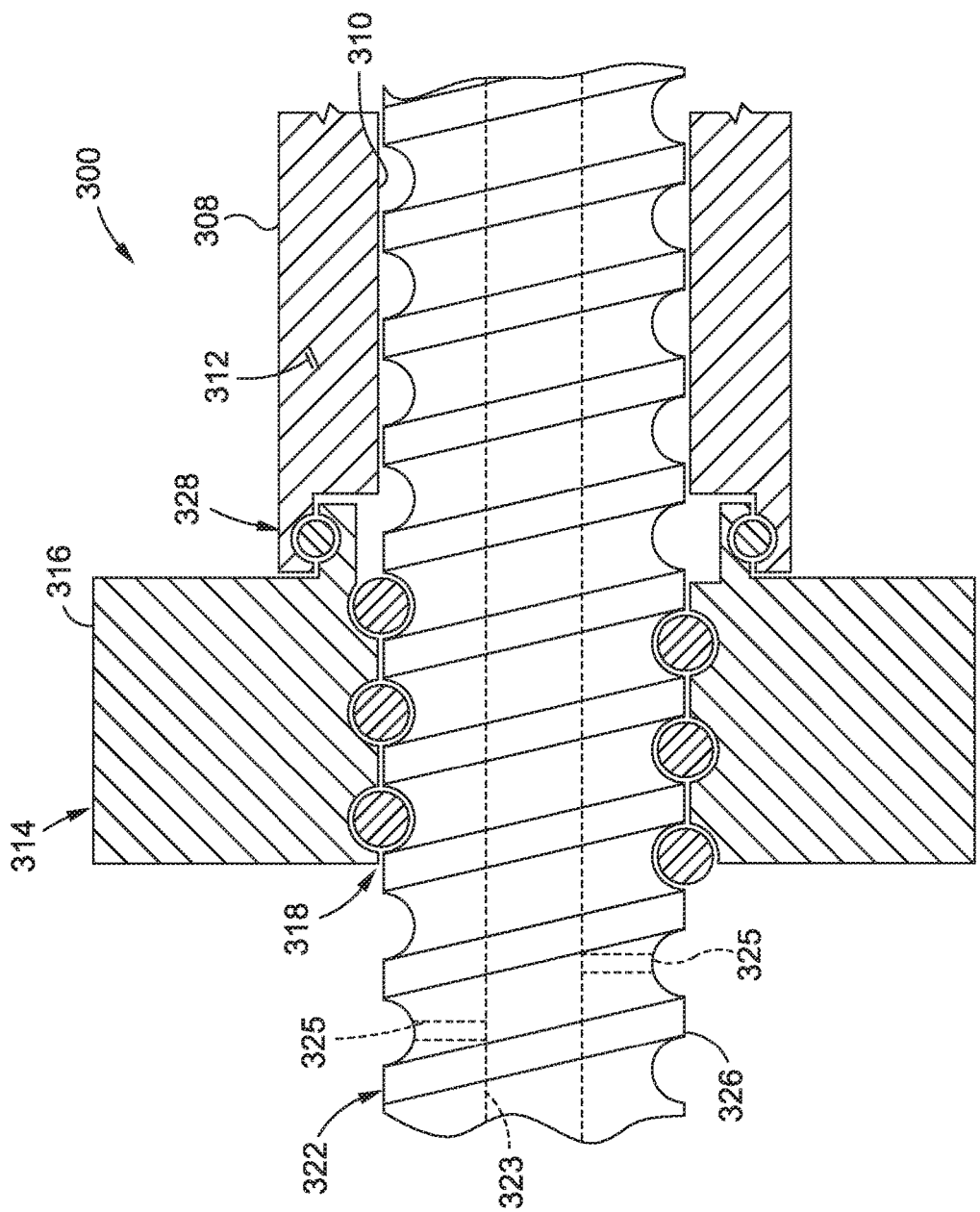
FIG. 9 is a magnified sectional view of the flywheel taken along line 9 of FIG. 8 and illustrating a bearing rotatably coupling the flywheel annulus to the inerter rod and further illustrating the threadable engagement of the flywheel to the threaded shaft.

FIG. 9 is a magnified sectional view of FIG. 8 showing the flywheel 314 coupled to the inerter rod 308 at the flywheel annulus 318. The flywheel annulus 318 is also threadably engaged to the threaded shaft 322. In the example shown, the threaded shaft 322 is configured as a ball screw 326 having helical grooves for receiving ball bearings which couple similarly-configured helical grooves in the flywheel annulus 318 to the ball screw 326 with minimal friction. Although not shown, the flywheel annulus 318 may include a ball nut for circulating the ball bearings coupling the flywheel 314 to the ball screw 326. In another example not shown, the threaded shaft 322 may comprise a lead screw having threads to which the flywheel annulus 318 are directly engaged. As may be appreciated, the flywheel 314 may be configured for engagement to any one of a variety of different types of configurations of threaded shafts, and is not limited to the ball screw 326 example illustrated in FIG. 9.

Also shown in FIG. 9 is an example of a bearing 328 for coupling the flywheel annulus 318 to the inerter rod 308 such that the inerter rod 308 and flywheel 314 may translate in unison as the flywheel 314 rotates due to threadable engagement with the threaded shaft 322. Although the bearing 328 is shown as a ball bearing, the bearing 328 may be provided in any one a variety of different configurations capable of axially coupling the flywheel 314 to the inerter rod 308 with a minimal amount of axial free play. For example, the bearing 328 may be configured as a roller bearing (not shown). In still further examples, the flywheel 314 may be coupled to the inerter rod 308 without a bearing while still allowing the flywheel 314 to rotate during translation of the inerter rod 308 and flywheel 314 relative to the threaded shaft 322.

FIG. 10 is a sectional view of an example of an inerter 300 integrated into a hydraulic actuator 204 having a housing containing a piston 216. The actuator 202 is a double-acting actuator including a pair of fluid ports 234 for receiving pressurized hydraulic fluid in a cap end chamber 236 and a rod end chamber 238 located on opposite sides of the piston 216. The actuator 202 is an unbalanced actuator 206 wherein one of the piston sides 218 has a greater cross-sectional area than the opposite piston side 218. The piston 216 may include a piston 216 seal (e.g., an O-ring seal—not shown) extending around the piston perimeter 220 for sealing the piston perimeter 220 to the actuator side wall 232.

As mentioned above, for examples where the inerter 300 is integrated into an actuator 202, the rod end 214 or the cap end 212 of the actuator 202 functions as the first terminal 302 of the inerter 300, and the remaining rod end 214 or the cap end 212 of the actuator 202 functions as the second terminal 304 of the inerter 300. In the example shown, the flywheel 314 is mounted in the cap end chamber 236 and is rotatably coupled to the piston 216 at the flywheel annulus 318. The flywheel 314 is threadably engaged to the threaded shaft 322 which passes through the piston 216 and extends into the rod bore 310. The flywheel 314 is configured to rotationally accelerate in proportion to axial acceleration of the piston 216 and piston rod 224 relative to the threaded shaft 322.

FIG. 11 shows an example of an inerter 300 having flywheel protrusions 320 for generating viscous damping during rotation of the flywheel 314 when the flywheel 314 is immersed in hydraulic fluid. The flywheel protrusions 320 generate or increase the viscous damping capability of the inerter 300 during rotation of the flywheel 314, and thereby increase the damping capability of the inerter 300.

FIG. 12 is a perspective view of an example of an inerter 300 having a plurality of radially extending flywheel blades circumferentially spaced around the flywheel perimeter 316. During rotation of the flywheel 314, the flywheel blades may generate viscous damping capability and add to the inerting capability of the inerter 300. Although FIG. 12 illustrates the flywheel protrusions 320 as radially-extending flywheel blades, the flywheel 314 may be provided with flywheel protrusions 320 extending from any portion of the flywheel 314 including one or both of the opposing sides of the flywheel 314. In addition, the flywheel protrusions 320 may be provided in any geometric size, shape or configuration, without limitation, and are not limited to flywheel blades.

Figure 13:
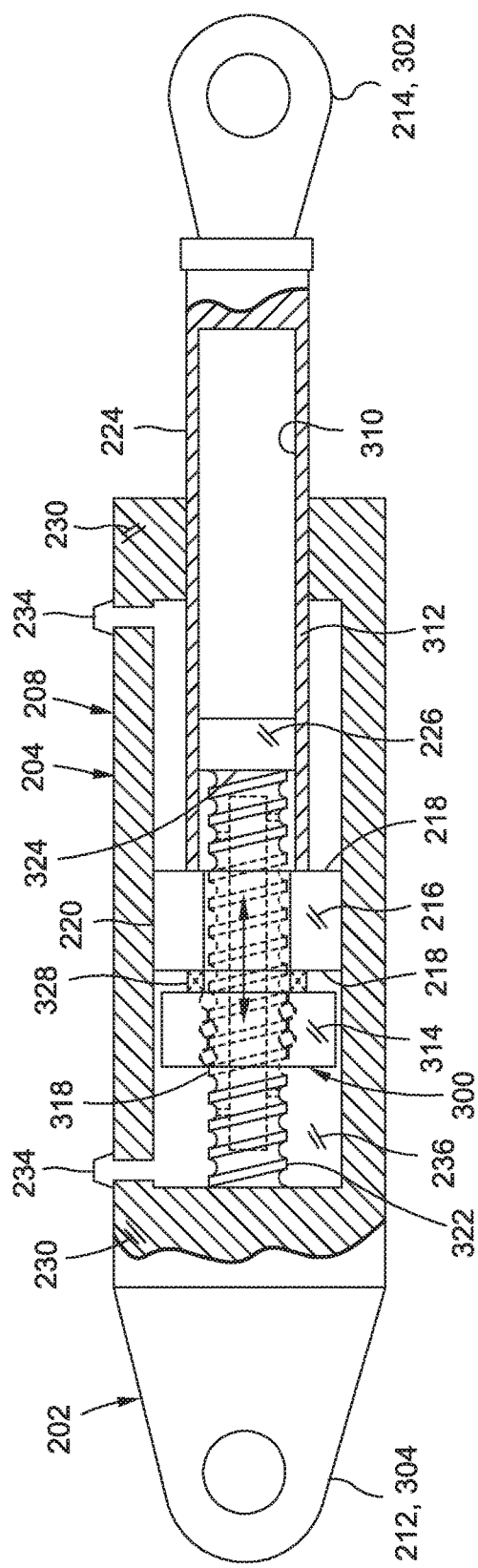
FIG. 13 is a sectional view of an example of an inerter integrated into a partially-balanced hydraulic actuator having an interior piston axially slidable within the piston rod.

FIG. 13 is a sectional view of an example of an inerter 300 integrated into a hydraulic actuator 204 configured as a partially-balanced actuator 208. The partially-balanced actuator 208 includes an interior piston 226 coupled to a free end 324 of the threaded shaft 322. The interior piston 226 may be axially slidable within the rod bore 310 and may be rotatably coupled to the end of the threaded shaft 322 such that the interior piston 226 is non-rotatable relative to the rod bore 310 during axial movement of the piston rod 224 relative to the threaded shaft 322. Although not shown, the perimeter of the interior piston 226 may be sealed (e.g., via an O-ring) to the rod wall 312 of the rod bore 310. The inclusion of the interior piston 226 may reduce the total volume of hydraulic fluid required to fill the cap end chamber 236 during extension of the piston rod 224 relative to the increased volume of hydraulic fluid required to fill the cap end chamber 236 for examples (e.g., FIG. 8) lacking an interior piston 226.

Figure 14:
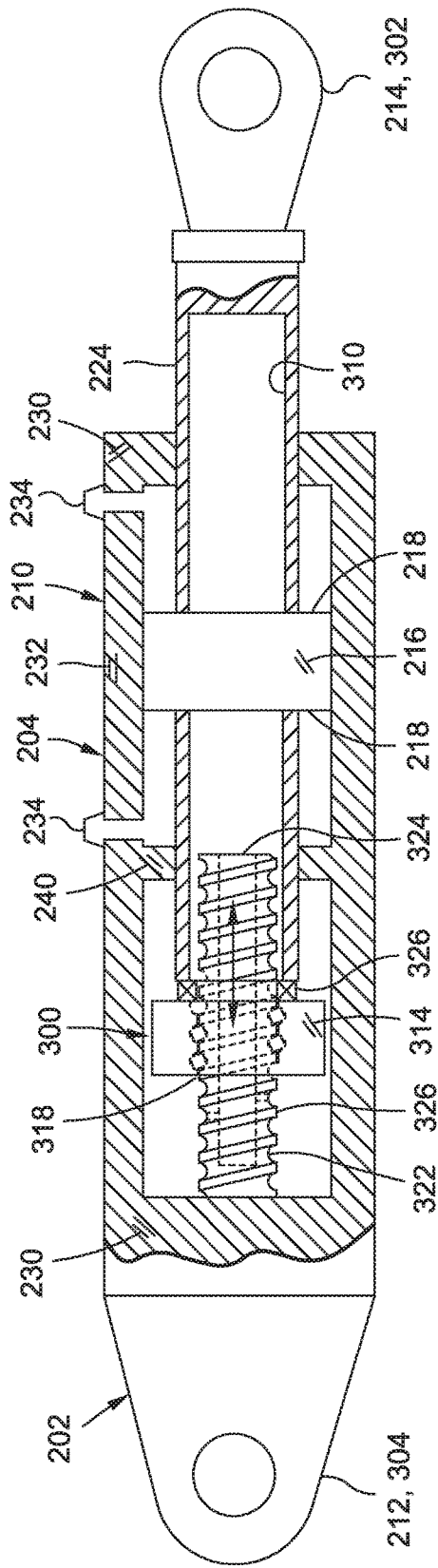
FIG. 14 is a sectional view of an example of an inerter integrated into a balanced hydraulic actuator having opposing piston sides with substantially equivalent cross-sectional areas.

FIG. 14 is a partially cutaway sectional view of an example of an inerter 300 integrated into a hydraulic actuator 204 configured as a balanced actuator 210 having opposing piston sides 218 with substantially equivalent cross-sectional areas. The housing may include a separator wall 240 separating the portion of the housing containing the flywheel 314 from the portion of the housing containing the piston 216. A cap end chamber 236 is located on one of the piston sides 218 and the rod end chamber 238 is located on the opposite piston side 218. The piston 216 may be mounted on the piston rod 224. In FIG. 14, one end of the piston rod 224 extends through the actuator end wall 230 and terminates at the rod end 214 (e.g., the first terminal 302). An opposite end of the piston rod 224 extends through the separator wall 240. The flywheel 314 is rotatably coupled to the piston rod 224 in a manner as described above.

Figure 15:
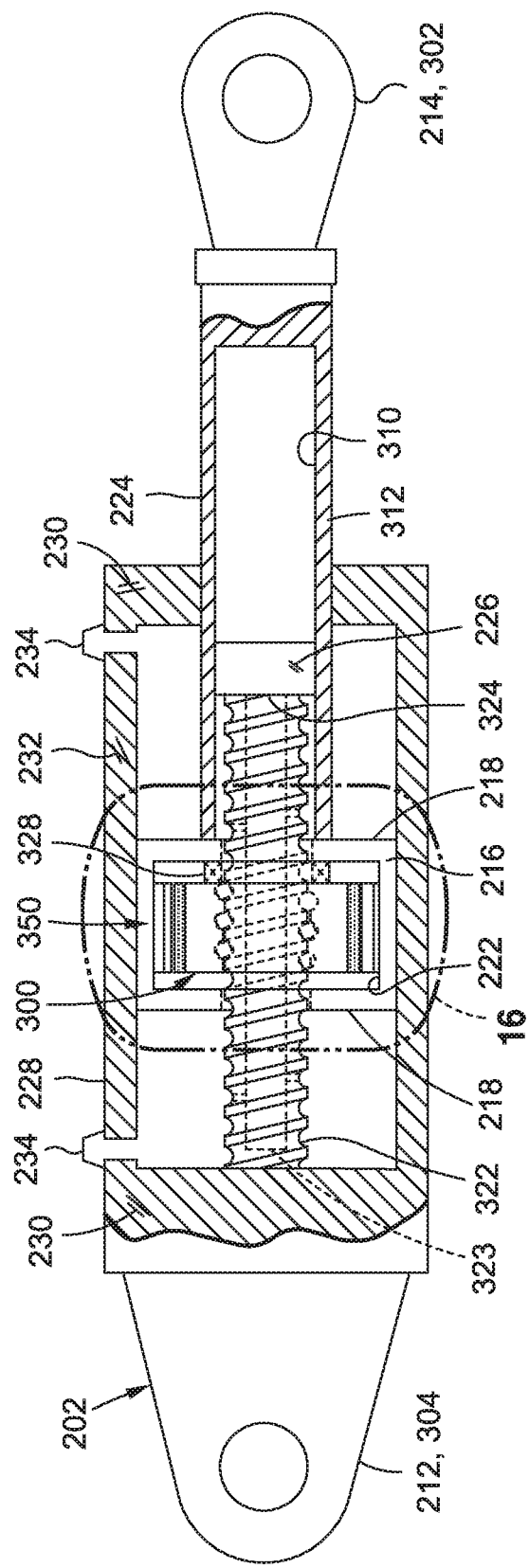
FIG. 15 is a sectional view of an example of an inerter integrated into a hydraulic actuator and wherein the flywheel is rotatably housed within the piston of the hydraulic actuator and including an electric flywheel motor and a brake for actively controlling rotation of the flywheel.

FIG. 15 is a partially cutaway sectional view of an example of an inerter 300 having an electric flywheel motor 350 integrated into a hydraulic actuator 204. The flywheel motor 350 may facilitate active control of flywheel 314 rotation using electromotive force from the integrated flywheel motor 350. Active control may include using the flywheel motor 350 to apply a torque to the flywheel 314 to resist or aid the torque that is generated by the flywheel 314 due to axial acceleration of the first terminal 302 relative to the second terminal 304. The flywheel motor 350 may be configured to provide active damping and/or active braking of the actuator 202 and the load inertia.

Figure 16:
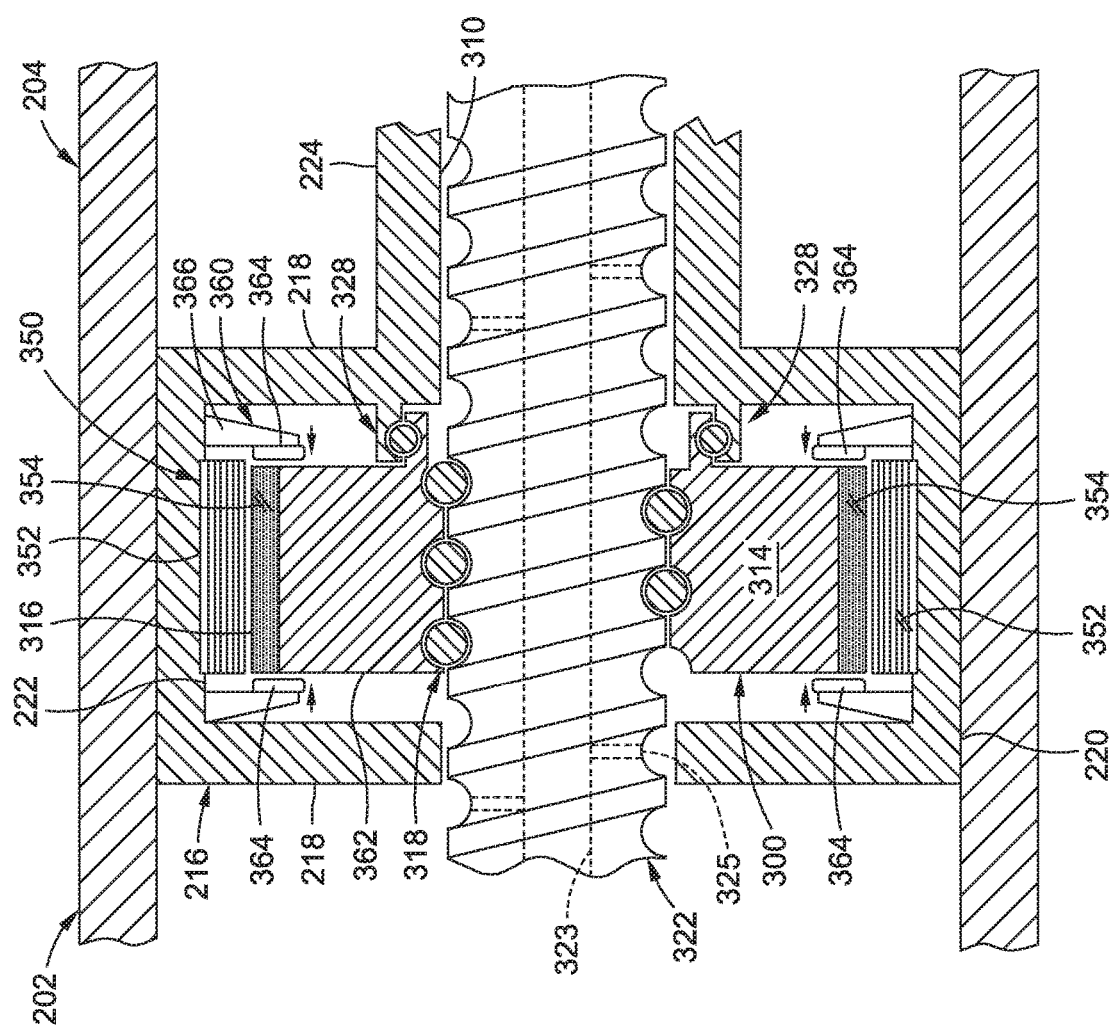
FIG. 16 is a magnified sectional view of the flywheel and piston taken along line 16 of FIG. 15 and illustrating the electric flywheel motor having permanent magnets mounted to the flywheel perimeter and windings mounted to the piston inner wall.

FIG. 16 is a magnified sectional view of FIG. 15 showing the flywheel 314 rotatably coupled to and contained within a generally hollow piston 216 which is actually slidable within the actuator housing 228. Also shown in the flywheel motor 350 incorporated into the flywheel 314 and the piston 216 and configured to actively control rotation of the flywheel 314 in correspondence with relative axial movement of the rod and threaded shaft 322. The flywheel motor 350 may be operated in a manner to accelerate and/or decelerate the flywheel 314 by applying a torque to the flywheel 314 either in correspondence with (e.g., the same direction as) or in opposition to the direction of rotation of the flywheel 314. In this manner, the flywheel motor 350 may apply a torque to the flywheel 314 to resist or aid the flywheel torque generated due to axial acceleration of the first terminal 302 relative to the second terminal 304.

In the example of FIG. 16, the flywheel motor 350 is a permanent magnet direct-current (DC) motor having one or more permanent magnets 354 mounted to the flywheel 314. For example, a plurality of permanent magnets 354 may be circumferentially spaced around the flywheel perimeter 316. In addition, the flywheel motor 350 may include a plurality of windings 352 mounted to the piston 216. In one example, a plurality of windings 352 may be circumferentially spaced around the piston inner wall 222 (e.g., FIGS. 15-16). In another example, a plurality of windings 352 may be circumferentially spaced around the side wall 232 of the housing (e.g., FIGS. 19-20) as described below. In other examples, the flywheel motor 350 may be a brushless DC motor or some other motor configuration, and is not limited to a permanent magnet DC motor configuration as shown in FIGS. 15-16 and 19-20. In an example not shown, a linear position sensor may be included with the actuator 202 to sense the linear position of the piston 216 and generate a signal representative of the linear piston position for commutating the flywheel motor 350 in correspondence with the piston position.

As mentioned above, the flywheel motor 350 in FIGS. 15-16 may be configured to assist or aid in rotating the flywheel 314 for a commanded direction of motion of the movable device 124. For example, the flywheel motor 350 may provide a torque to accelerate the flywheel 314 at the start of motion of the movable device 124 toward a commanded position. The torque applied to the flywheel 314 by the flywheel motor 350 may be approximately equal in magnitude to the torque required to rotationally accelerate the flywheel 314 due to axial acceleration of the threaded shaft 322 relative to the rod. By using the flywheel motor 350 to remove the torque required to rotationally accelerate the flywheel 314, the piston 216 may move more quickly to a commanded position than if the flywheel motor 350 did not accelerate the flywheel 314. In this manner, the flywheel motor 350 may allow faster responsiveness of a movable device 124 than a conventional actuator 202. The level of damping provided by an inerter 300 having active control of the flywheel 314 may be greater than the damping that is feasible in a closed-loop control system without active control due to the risk of control system instability. Although FIGS. 15-16 illustrate a flywheel motor 350 incorporated into an inerter 300 integrated with an actuator 202, a flywheel motor 350 may be incorporated into an inerter 300 that is a separate component from the actuator 202 (e.g., FIGS. 4-8).

In a further example of active control, the flywheel motor 350 may be operated in a manner to provide a torque to decelerate the flywheel 314 as the movable device 124 approaches a commanded position. In this regard, the flywheel motor 350 may be operated as a brake to oppose the flywheel torque generated by the axial deceleration of the threaded shaft 322 relative to the piston rod 224. Actively controlling flywheel 314 rotation in this manner may prevent or limit position overshoot of the movable device 124 and thereby increase the stability of the movable device 124. In such an arrangement, the actuator 202 and inerter 300 may be configured with a failure mode that ensures that without active motor control, the actuator 202 is capable of exhibiting a desired damped response in a manner preventing underdamping of the movable device 124. An inerter 300 having a flywheel motor 350 for active control may be connected to the movable device 124 without being part of the actuator 202 such that in the event of a disconnect of the actuator 202 from the movable device 124 or in the event of a failure of the actuator 202 to hold the load of the movable device 124, the flywheel motor 350 may be operated in a manner preventing underdamped movement of the movable device 124 for the given failure mode.

Referring still to FIG. 16, in another example of active control, the flywheel motor 350 may include a brake 360 configured to provide dynamic braking of the flywheel 314. In this regard, the brake 360 may be operated in a manner to decelerate the flywheel 314 or to increase existing deceleration of the flywheel 314. For examples that include a flywheel motor 350, the brake 360 may be operated in a manner to increase existing deceleration of the flywheel 314 caused by rotational drag of the flywheel motor 350. In addition, the flywheel motor 350 may be operated in a manner to oppose disturbances (e.g., undesirable motion) of the actuator 202.

In the example of FIG. 16, the brake 360 may be configured as a disc brake having brake pads 364. The flywheel 314 may function as a brake rotor against which the brake pads 364 may be frictionally engaged during braking. In other examples not shown, a separate brake rotor may be provided which may be directly or indirectly coupled to the flywheel 314. In the example shown, a hydraulic brake cylinder (not shown) may be included to actuate the brake pads 364 into frictional engagement with one or both of the opposing axial faces 362 (e.g., planar faces) of the flywheel 314 for decelerating the flywheel 314. Preferably, the brake 360 may include at least two pairs of opposing brake pads 364 located on diametrically opposing sides of the brake rotor. Each pair of brake pads 364 may be held in position by a bracket 366. Although the brake 360 is described and illustrated as a disc brake, the inerter 300 may incorporate any one or more different types of brakes such as a drum brake or any other type of brake capable of decelerating the flywheel 314.

Referring to FIG. 17, shown is a partially cutaway sectional view of another example of an inerter 300 integrated into a hydraulic actuator 204. The flywheel 314 is rotatably coupled or attached to the actuator end wall 230 which may be coupled to the second terminal 304. The piston 216 is fixedly coupled or attached to the piston rod 224 which extends from the piston 216 through the actuator end wall 230 and is coupled to the first terminal 302. In an alternative example not shown, the flywheel 314 may be rotatably coupled to the actuator end wall 230 which is attached to the first terminal 302, and the piston rod 224 may be coupled to the second terminal 304.

FIG. 18 is a magnified sectional view of FIG. 17 illustrating the flywheel annulus 318 rotatably coupled by a bearing 328 to the actuator end wall 230. The threaded shaft 322 is fixedly coupled to the flywheel 314 and is rotatable in unison with the flywheel 314. As mentioned above, the piston 216 is fixedly coupled to the piston rod 224 and threadably engaged to the threaded shaft 322 in a manner such that linear translation of the piston rod 224 relative to the threaded shaft 322 causes rotation of the flywheel 314 and threaded shaft 322 in unison. As indicated above, axial movement of the threaded shaft 322 relative to the piston rod 224 may be in correspondence with actuation of the movable device 124 by the actuator 202.

Figure 19:
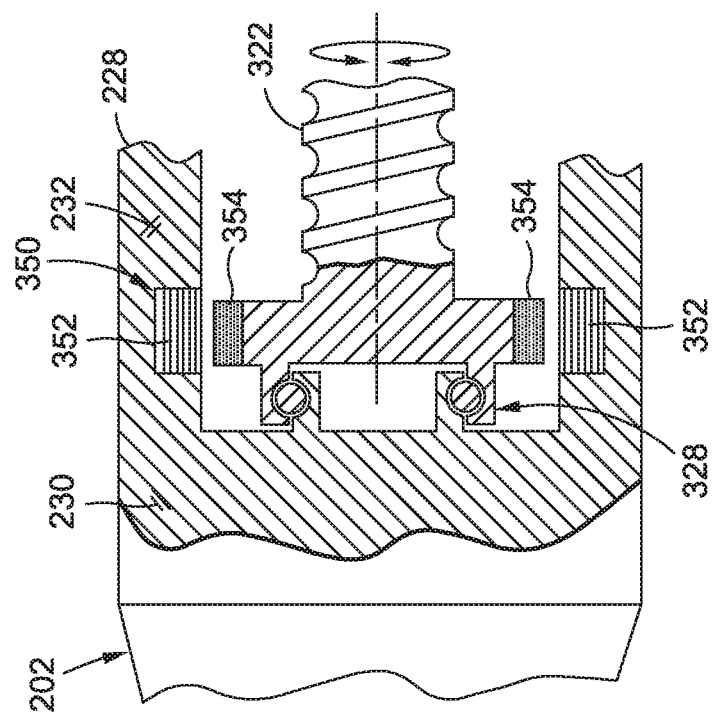
FIG. 19 is a sectional view of an example of a flywheel rotatably coupled to the actuator end wall and having an electric flywheel motor including permanent magnets mounted to the flywheel perimeter and windings mounted to the housing side wall of the actuator.

FIG. 19 illustrates an example of a flywheel 314 rotatably coupled to the actuator end wall 230 and incorporating a flywheel motor 350 for active control of the rotation of the flywheel 314 in a manner as described above. The flywheel motor 350 may include permanent magnets 354 mounted to the flywheel perimeter 316. For example, as described above with regard to FIG. 16, a plurality of permanent magnets 354 may be circumferentially spaced around the flywheel perimeter 316. FIG. 19 also shows a plurality of windings 352 circumferentially spaced around the actuator side wall 232 of the actuator housing 228.

Figure 20:
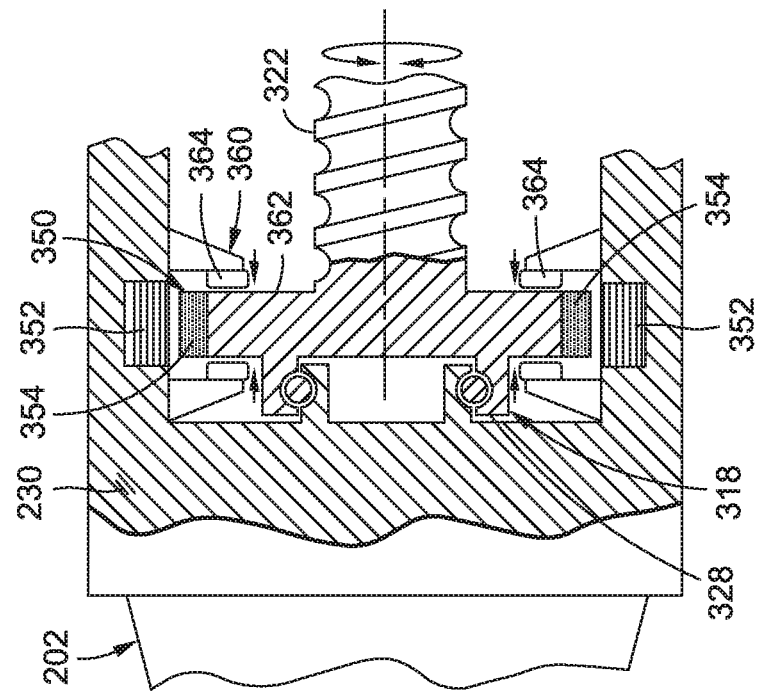
FIG. 20 is a sectional view of a further example of a flywheel having an electric flywheel motor and further including a brake configured to provide dynamic braking of the flywheel.

FIG. 20 illustrates an example of a flywheel 314 including a brake 360 configured to provide dynamic braking of the flywheel 314. In the example shown, the brake 360 is configured as a disc brake having one or more pairs of brake pads 364 for frictionally engaging opposing axial faces 362 of the flywheel 314. The brake 360 in FIG. 20 may be configured and operated similar to the arrangement illustrated in FIG. 16 and described above.

Figure 21:
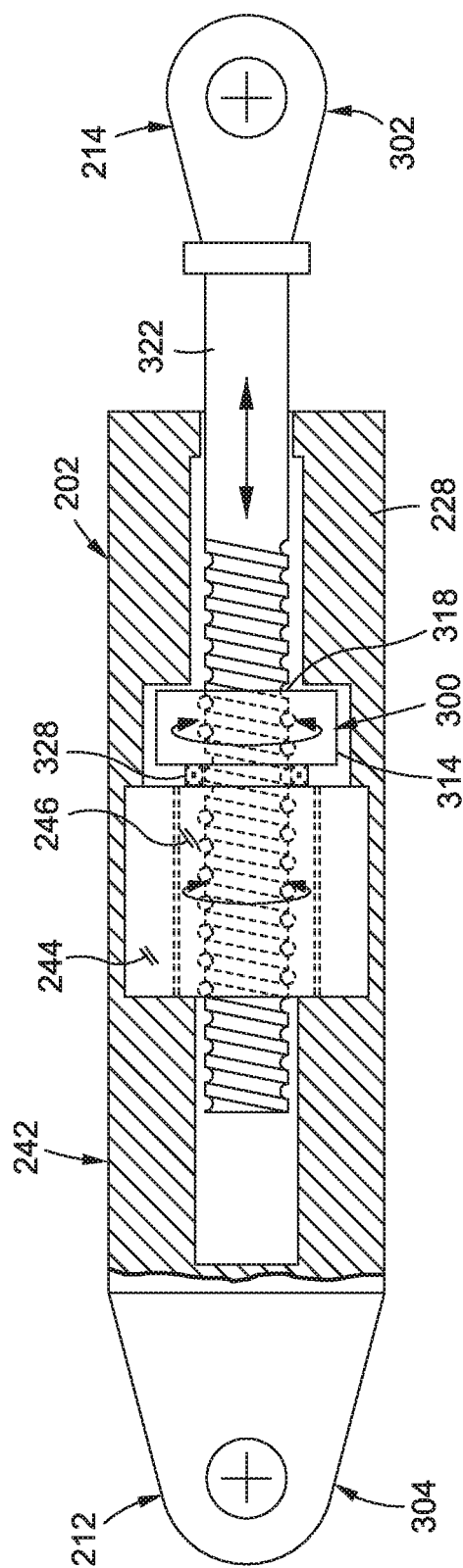
FIG. 21 is a sectional view of an example of an inerter integrated into a linear electro-mechanical actuator and illustrating the flywheel rotatably coupled to an actuator motor and threadably engaged to a threaded shaft.

FIG. 21 illustrates an example of an inerter 300 integrated into a linear electro-mechanical actuator 242. The electro-mechanical actuator 242 may extend between a support structure 116 (FIG. 2) and a movable device 124 (FIG. 2). The electro-mechanical actuator 242 may include an electric actuator motor 244 supported by the actuator housing 228. The first terminal 302 may be coupled to a movable device 124. The electro-mechanical actuator 242 may include a second terminal 304 which may be coupled to a support structure 116. Alternatively, the first terminal 302 may be coupled to the support structure 116 and the second terminal 304 may be coupled to the movable device 124.

The electro-mechanical actuator 242 may include a threaded shaft 322 (e.g., an Acme-threaded shaft, a ball screw, etc.) extending through the actuator motor 244 and terminating at the first terminal 302. The actuator motor 244 may be operably coupled to the threaded shaft 322 by a motor-shaft coupler 246 which may be threadably engaged to the threaded shaft 322. Operation of the actuator motor 244 may cause axial motion of the threaded shaft 322 for actuating the movable device 124. In this regard, the threaded shaft 322 may axially move in proportion (e.g., in magnitude and direction) to angular displacement of the actuator motor 244. A flywheel 314 may be threadably engaged to the threaded shaft 322. In addition, the flywheel annulus 318 may be rotatably coupled to the actuator motor 244 via a bearing 328 such that axial acceleration of the threaded shaft 322 causes rotational acceleration of the flywheel 314. The flywheel 314 may be configured to rotationally accelerate and decelerate in proportion to axial acceleration and deceleration of the threaded shaft 322 (e.g., relative to the actuator motor 244) during actuation of the movable device 124.

In this regard, rotation of the flywheel 314 during actuation of the electro-mechanical actuator 242 of FIG. 21 may provide any one or more of the advantages described herein for improving the dynamic response of the movable device 124 during actuation by the electro-mechanical actuator 242. For example, the flywheel 314 may reduce actuator load oscillatory amplitude at resonance of the coupled electro-mechanical actuator 242/movable device 124. In addition, although not shown in FIG. 21, a flywheel motor 350 (e.g., FIG. 16) and/or a dynamic brake 360 (FIG. 16) may optionally be included with the flywheel 314 to allow for active control of the rotation of the flywheel 314 using any one or more of the flywheel control techniques described herein.

Figure 22:
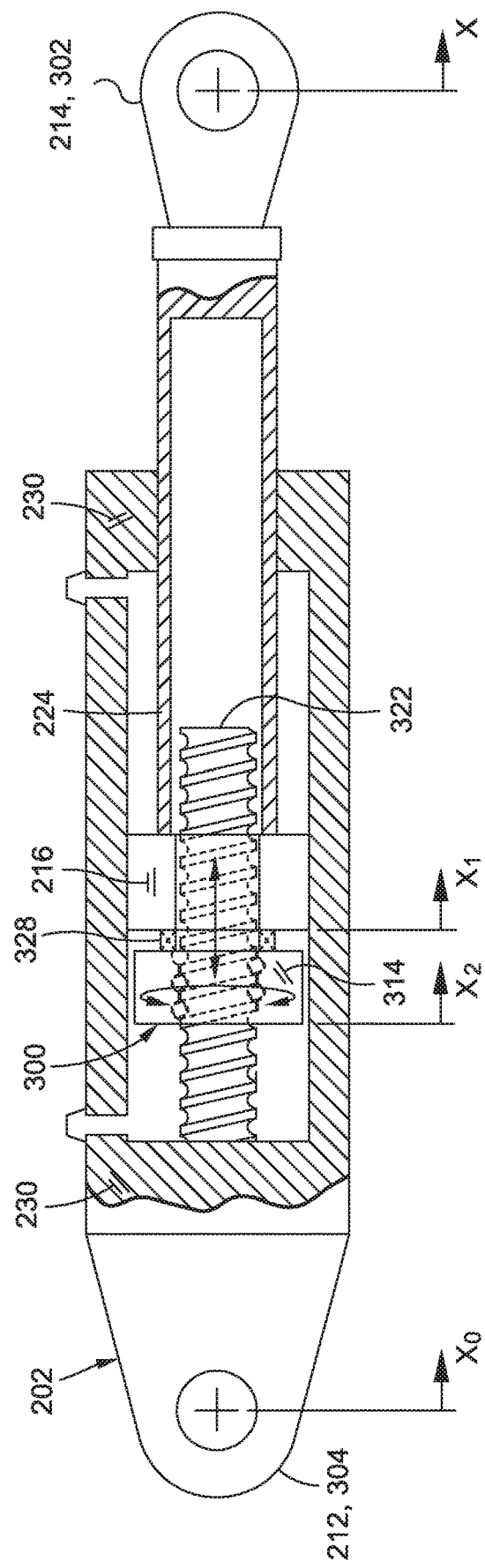
FIG. 22 is a sectional view of an example of an inerter integrated into a hydraulic actuator and illustrating the notations x, $x_0$, $x_1$, and $x_2$ respectively denoting reference points for translation of the rod end, the cap end, the piston, and the flywheel wherein the notations are used in the derivation of a transfer function characterizing the response of an actuator having an integrated inerter.

FIG. 22 is a sectional view of an example of an inerter 300 integrated into a hydraulic actuator 204 as described above and illustrated in FIG. 10. FIG. 22 includes the notations x, $x_0$, $x_1$, and $x_2$ respectively denoting reference points for translation of the rod end 214, the cap end 212, the piston 216, and the flywheel 314. The notations x, $x_0$, $x_1$, and $x_2$ are parameters that are used in a below-described of a transfer junction $$\frac{X(s)}{F(s)}$$

(Equation 220) mathematically characterizing the response of the apparatus of FIG. 22. Table 1 includes a listing of the parameters used in the derivation of the transfer function. Included with each listed parameter is an indication of the physical type of the parameter and a brief description of the parameter.

TABLE 1

| Parameter | Physical type | Description |
| --- | --- | --- |
| F | force | actuator reacted force (newton) |
| $F_1$ | force | piston reacted force (newton) |
| $F_2$ | force | flywheel reacted force (newton) |
| $F_3$ | force | flywheel to piston compliance force (newton) |
| $T_2$ | torque | flywheel acceleration torque (newton-meter) |
| $\dot{x}$ | translation | actuator rod end translation reference (meter) |
| $x_1, \dot{x}_1, \ddot{x}_1$ | translation | piston translation reference (meter) |
| $x_2, \dot{x}_2, \ddot{x}_2$ | translation | flywheel translation transformed from rotation (meter) |
| $x_0, \dot{x}_0, \ddot{x}_0$ | translation | actuator cap end translation reference (meter) |
| $\theta, \dot{\theta}, \ddot{\theta}$ | rotation | flywheel rotation reference (radian) |
| J | mass moment of inertia | flywheel inertia in rotation (kilogram-meter$^2$) |
| B | damping coefficient | flywheel torque resisting $\dot{\theta}$ (newton-meter/radian/s) |
| Z | stiffness | flywheel rotational stiffness (radian/newton-meter) |
| M | mass | actuator reacted inertia at rod end (kilogram) |
| C | damping coefficient | actuator force resisting $\dot{x}$ (newton/meter/s) |
| K | stiffness | actuator stiffness (meter/newton) |
| r | thread rate | revolutions per translation (radian/meter) |
| $\omega_n$ | natural frequency | $2^{nd}$ order model characteristic (radian/second) |
| $\zeta$ | damping factor | $2^{nd}$ order model characteristic (no unit) |
| c | constant | zero offset to a common reference |

Equations 100 to 210 inclusive are the assumptions behind the derivation of the transfer function of Equation 220. Referring to the example apparatus of FIG. 22, the total reacted force F (e.g., at the rod end 214) may be computed as the sum of the piston 216 reacted force $F_1$ and the flywheel 314 reacted force $F_2$ as shown in Equation 100, wherein the sign of $F_1$ and $F_2$ are the same from a disturbance rejection sense:

$$F = F_1 + F_2 \quad \text{(Equation 100)}$$

The torque $T_2$ developed by the flywheel 314 may be determined using Equation 110 as the sum of the product of the flywheel rotational inertia J and flywheel rotational acceleration $\ddot{\theta}$ and the product of a flywheel damping coefficient B and the flywheel rotational velocity $\dot{\theta}$:

$$T_2 = J\ddot{\theta} + B\dot{\theta} \quad \text{(Equation 110)}$$

The flywheel reacted force $F_2$ may be computed using equation 120 as the product of the flywheel torque $T_2$ and the thread rate r (e.g., thread pitch) of the threaded shaft 322. The thread rate may be described as the linear distance of travel of the flywheel 314 per revolution:

$$F_2 = r(J\ddot{\theta} + B\dot{\theta}) \quad \text{(Equation 120)}$$

The rotation of the flywheel 314 may be characterized by the flywheel angular displacement or rotational angle $\theta$, rotational velocity $\dot{\theta}$, and rotational acceleration $\ddot{\theta}$, as respectively represented by Equations 130, 140, and 150. The flywheel rotational angle $\theta$ is the product of the thread rate r and the linear distance of flywheel translation $x_2$ as represented by Equation 130. The parameter c is a constant representing a linear offset relative to a common reference. The flywheel rotational velocity $\dot{\theta}$ is the product of the thread rate r and the linear velocity $\dot{x}_2$ of the flywheel 314 as represented by Equation 140. The flywheel rotational acceleration $\ddot{\theta}$ is the product of the thread rate r and the linear acceleration $\ddot{x}_2$ of the flywheel 314 as represented by Equation 150.

$$\theta + c = rx_2 \quad \text{(Equation 130)}$$

$$\dot{\theta} = r\dot{x}_2 \quad \text{(Equation 140)}$$

$$\ddot{\theta} = r\ddot{x}_2 \quad \text{(Equation 150)}$$

A flywheel 314 to piston 216 compliance force $F_3$ may be computed using Equation 160 as the product of the flywheel rotational stiffness Z and the difference between flywheel translation $x_2$ and piston translation $x_1$. For the example apparatus of FIG. 22 wherein the inerter (e.g., the flywheel 314) is integrated into the actuator 202, the flywheel 314 moves with the piston 216 such that the flywheel translation $x_2$ and the piston translation $x_1$ are the same, as indicated below in Equation 190. In this regard, the piston compliance force $F_3$ is zero (0) due to the assumption that $x_2 = x_1$ as indicated below in Equation 190.

$$F_3 = Z(x_2 - x_1) \quad \text{(Equation 160)}$$

Substituting Equations 140 and 150 for flywheel velocity $\dot{\theta}$ and flywheel acceleration $\ddot{\theta}$ into Equation 120, the flywheel reacted force $F_2$ may be expressed as follows:

$$F_2 = r^2(J\ddot{x}_2 + B\dot{x}_2) \quad \text{(Equation 170)}$$

The piston reacted force $F_1$ may be computed as the sum of the product of the actuator (e.g., the piston) reacted inertia M at the rod end 214 and the piston acceleration $\ddot{x}_1$, the product of the actuator (e.g., the piston) resisting force C and the piston velocity $\dot{x}$, and the product of the actuator stiffness K and the piston displacement $x_1$, as shown in Equation 180:

$$F_1 = M\ddot{x}_1 + C\dot{x}_1 + Kx_1 \quad \text{(Equation 180)}$$

As mentioned above, for the example shown in FIG. 22 wherein the inerter (e.g., the flywheel 314 and threaded shaft 322) is integrated into the actuator 202 such that the flywheel 314 and the piston 216 move in unison, the flywheel translation $x_2$ and the piston translation $x_1$ are the same as represented by Equation 190. In addition the rod end 214 and the piston 216 move in unison as represented by Equation 200. The cap end 212 at $x_0$ is assumed to be fixed (e.g., non-translating) as represented by Equation 210.

$$x_2 = x_1 \quad \text{(Equation 190)}$$

$$\dot{x}_1 = \dot{x} \quad \text{(Equation 200)}$$

$$\ddot{x}_0 = \dot{x}_0 = x_0 = 0 \quad \text{(Equation 210)}$$

Performing a Laplace transform on a differential equation (not shown) representing the natural frequency of the example apparatus shown in FIG. 22, the resulting transfer function $\dfrac{X(s)}{F(s)}$ is expressed as shown in Equation 220 wherein X(s) represent the response of the apparatus of FIG. 22 and F(s) represents the input to the apparatus:

$$\dfrac{X(s)}{F(s)} = \dfrac{\dfrac{1}{r^2 J + M}}{s^2 + \dfrac{r^2 B + C}{r^2 J + M}s + \dfrac{K}{r^2 J + M}} \quad \text{(Equation 220)}$$

The natural frequency $\omega_n$ of oscillation of the example apparatus of FIG. 22 may be expressed as shown in Equation 230 wherein K is the actuator stiffness, r is the thread rate, and J is the flywheel rotational inertia, as described above.

$$\omega_n = \left(\dfrac{K}{r^2 J + M}\right)^{1/2} \quad \text{(Equation 230)}$$

Equation 240 represents the damping factor $\zeta$ of the example apparatus of FIG. 22 which characterizes the decay in oscillatory response to the input (e.g., flutter of a flight control surface).

$$\zeta = \dfrac{r^2 B + C}{2(K(r^2 J + M))^{1/2}} \quad \text{(Equation 240)}$$

Figure 23:
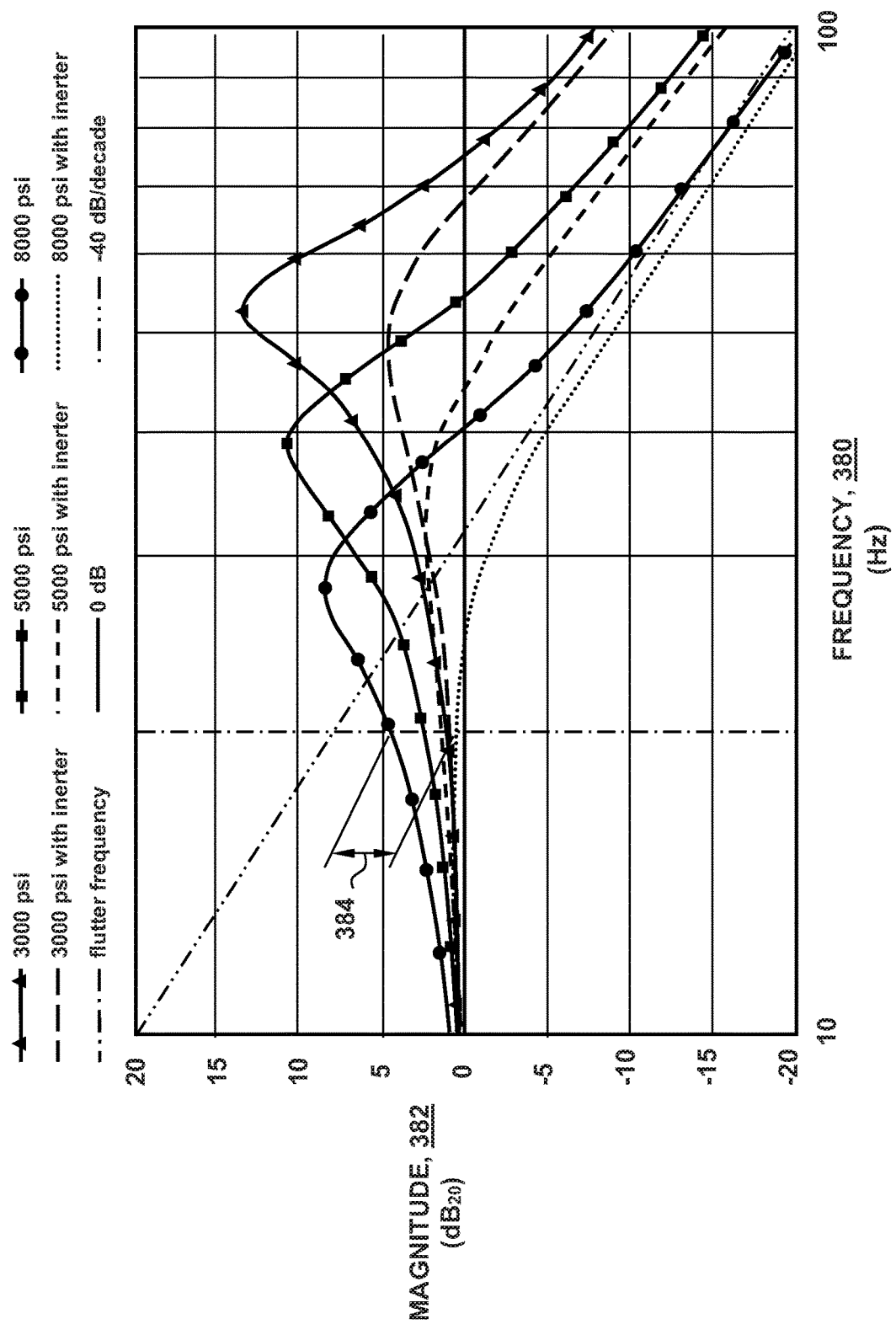
FIG. 23 is a graph plotting frequency vs. magnitude (e.g., amplitude) for an actuator operating under a working pressure of 3000 psi, 5000 psi, and 8000 psi, and illustrating a reduction in amplitude for the actuator damped by an inerter relative to the amplitude of the actuator undamped by an inerter.

FIG. 23 is a graph plotting frequency 380 vs. magnitude 382 (amplitude) of the oscillatory response to a dynamic load for an actuator 202 operating under three (3) different working pressures (3000 psi, 5000 psi, and 8000 psi). The vertical centerline represents a flutter frequency of 20 Hz corresponding to the dynamic load. The plots of FIG. 23 illustrate the reduction in response amplitude 384 provided by the actuator 202 with integrated inerter 300 of FIG. 22, relative to the response amplitude for the same actuator operating without an inerter. The reduction in response amplitude represents an optimization based on setting the response amplitude at the flutter frequency for the actuator 202 operating at 8000 psi with an inerter 300 equal to the response amplitude at the flutter frequency for the actuator 202 operating at 3000 psi without the inerter 300, and optimizing the thread pitch r of the threaded shaft 322, the flywheel rotational inertia J, and the damping factor $\zeta$ (Equation 240). For the actuator 202 operating at 8000 psi, the inerter 300 facilitates a reduction in response amplitude 384 of almost 5 dB at the flutter frequency of 20 Hz.

Figure 24:
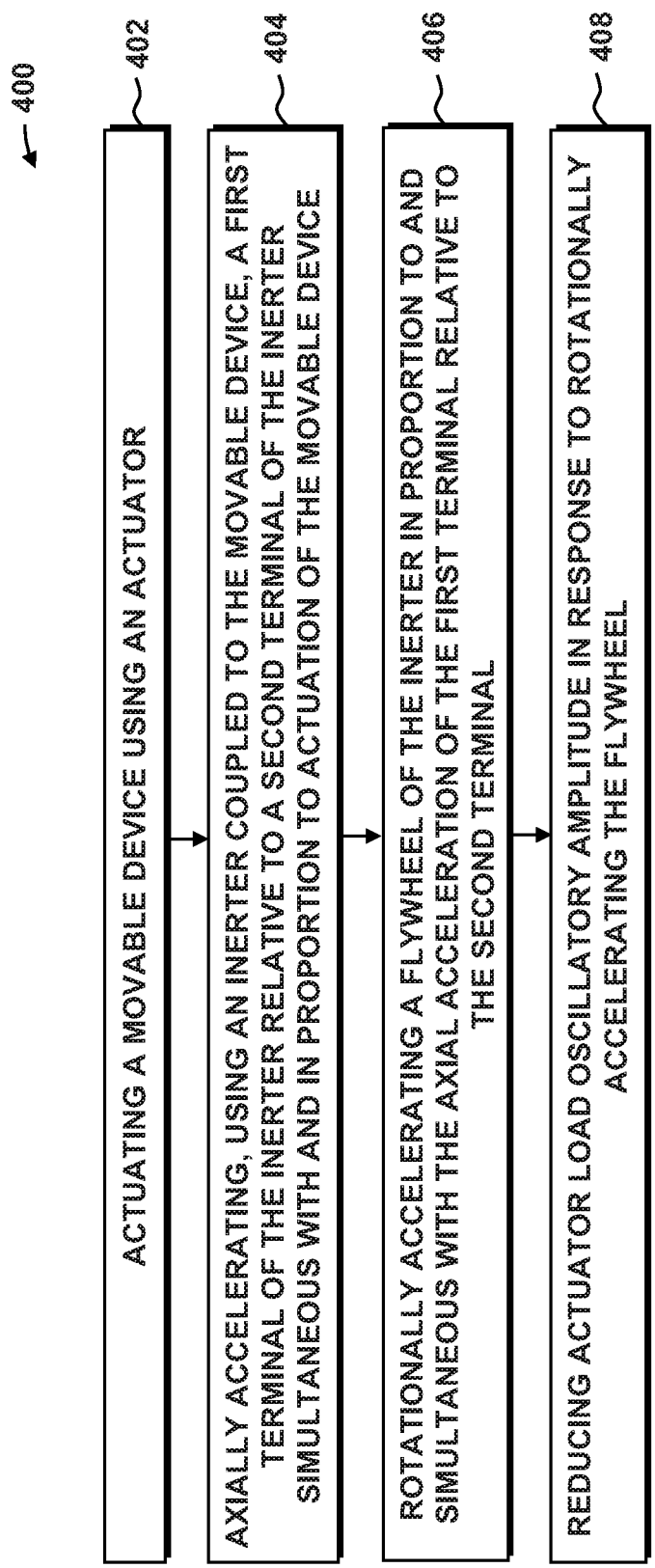
FIG. 24 is a flowchart having one or more operations that may be included in method of damping an actuator using an inerter.

FIG. 24 is a flowchart having one or more operations that may be included in a method 400 of damping an actuator 202 using an inerter 300. As mentioned above, the damping of the actuator 202 may comprise reducing actuator load oscillatory amplitude using inerter 300. As indicated above, in some examples, the inerter 300 may be a separate component from the actuator 202 and coupled to the same movable device 124 as the actuator 202 (e.g., FIGS. 1 and 4-9). In other examples, the inerter 300 may be integrated into the actuator 202 (e.g., FIGS. 2 and 10-22).

Step 402 of the method 400 includes actuating the movable device 124 using an actuator 202. In the example of a flight control system 120 of an aircraft 100, the method may include using a linear actuator such as a linear hydraulic actuator 204 or a linear electro-mechanical actuator 242. For example, FIGS. 4-6 illustrate a linear hydraulic actuator 204 configured to actuate an aileron 130 pivotably mounted to a wing 114 of an aircraft 100. However, as mentioned above, the movable device 124 may be any type of movable device that may be actuated by an actuator 202.

Step 404 of the method 400 includes axially accelerating, using an inerter 300 coupled to the movable device 124, the first terminal 302 of the inerter 300 relative to the second terminal 304 of the inerter 300. As indicated above, the inerter 300 may be coupled between the support structure 116 and the movable device 124 (e.g., FIGS. 4 and 6). For example, the first terminal 302 may be coupled to the movable device 124 and the second terminal 304 may be coupled to the support structure 116, or the first terminal 302 may be coupled to the support structure 116 and the second terminal 304 may be coupled to the movable device 124. Alternatively, the inerter 300 may be integrated into the actuator 202 (e.g., FIGS. 10-21) which may be coupled between the support structure 116 and the movable device 124. In such examples, as mentioned above, the rod end 214 or the cap end 212 of the actuator 202 functions as (e.g., is one and the same as) the first terminal 302 of the inerter 300, and the remaining rod end 214 or cap end 212 of the actuator 202 functions as (e.g., is one and the same as) the second terminal 304 of the inerter 300.

Step 406 of the method 400 includes rotationally accelerating the flywheel 314 simultaneous with the axial acceleration of the first terminal 302 relative to the second terminal 304. Because the inerter 300 and the actuator 202 are coupled to the same movable device 124 (e.g., FIGS. 1 and 4-9) or because the inerter 300 is integrated into the actuator 202 (e.g., FIGS. 2 and 10-21), the axial acceleration of the first terminal 302 relative to the second terminal 304 is simultaneous with and in proportion to the actuation of the movable device 124 by the actuator 202. In this regard, the flywheel 314 rotationally accelerates and decelerates in proportion to the axial acceleration and deceleration of the first terminal 302 relative to the second terminal 304 in correspondence with the actuation of the movable device 124 by the actuator 202.

Step 408 of the method 400 includes damping the movement of the actuator 202 in response to rotating the flywheel 314. In one example, the method may include reducing actuator load oscillatory amplitude of the movable device 124 in response to rotationally accelerating the flywheel 314. Regardless of whether the inerter 300 is a separate component from the actuator 202 or the inerter 300 is integrated into the actuator 202, the method may include rotationally accelerating the flywheel 314 in a manner reducing actuator load oscillatory amplitude at resonance of the movable device 124 coupled to the actuator 202. In one example, the method may include reducing actuator load oscillatory amplitude by at least 50% relative to the oscillatory amplitude for the movable device 124 actuated by the same actuator but without the inerter, as mentioned above. The inerter 300 may be configured to reduce actuator load oscillatory amplitude at a resonant frequency of up to approximately 20 Hz (e.g., ±5 Hz). The movable device 124 may be a flight control surface 122 (e.g., a hydraulically-actuated aileron 130) of an aircraft 100 and the resonance (e.g., the resonant frequency) may correspond to flutter of the flight control surface 122 as induced by aerodynamic forces acting on the flight control surface 122.

As mentioned above, in examples where the inerter 300 is integrated into the actuator 202, the flywheel 314 may include a plurality of flywheel protrusions 320 (e.g., flywheel blades—see FIGS. 11-12) extending outwardly from the flywheel 314. The flywheel 314 and the flywheel protrusions 320 may be immersed in hydraulic fluid contained within the cap end chamber 236. In such examples, the method may include rotating the flywheel 314 within the hydraulic fluid and generating or increasing viscous damping of the actuator 202 movement in response to rotating the flywheel 314 in correspondence with the actuation of the movable device 124. The viscous damping may contribute toward the damping provided by the rotational inertia of the flywheel 314.

In still other examples, the method may include actively controlling the rotation of the flywheel 314 in correspondence with relative axial movement of the piston rod 224 and threaded shaft 322. For example, the inerter 300 may include or incorporate an electric flywheel motor 350 as described above in the examples illustrated in FIGS. 15-16 and 19-20. In some examples, as mentioned above, the actuator 202 may include a linear position sensor (not shown) configured to sense the linear position of the piston 216 within the actuator 202 and generate a signal representative of the piston position. The method may include commutating the flywheel motor 350 in correspondence with the linear position of the piston 216 as represented by the signal generated by the position sensor.

Active control of the flywheel 314 rotation may include accelerating and/or decelerating the flywheel 314 using the flywheel motor 350. For example, the flywheel motor 350 may be operated in a manner to apply a torque to the flywheel 314 in correspondence with or in the direction of rotation of the flywheel 314. In this regard, the flywheel motor 350 may assist a commanded direction of motion of the actuator 202. In some examples, active control of flywheel rotation may include accelerating the flywheel 314 during initiation of actuation by the actuator 202 of the movable device 124 toward a commanded position. In this regard, the flywheel motor 350 may rotationally accelerate the flywheel 314 at the start of axial acceleration of the first terminal 302 relative to second terminal 304 by an amount at least partially or completely eliminating the force generated at the first terminal 302 and second terminal 304 due to actuation of the movable device 124 by the actuator 202. By using the flywheel motor 350 to rotationally accelerate the flywheel 314 at the start of axial acceleration, the force required to axially move the first terminal 302 relative to the second terminal 304 may be reduced or eliminated which may increase the speed at which the actuator 202 moves the movable device 124 toward a commanded position.

Alternatively, the flywheel motor 350 may be operated in a manner to apply a torque to the flywheel 314 in a direction opposite the rotation of the flywheel 314. In this regard, the application of motor-generated torque in a direction opposite the rotation of the flywheel 314 may resist the torque generated by the relative axial acceleration of the first terminal 302 and second terminal 304. In this regard, active control by the flywheel motor 350 may oppose the terminal-developed torque at the end of actuator 202 motion when the commanded position is reached. In this manner, the step of actively controlling rotation of the flywheel 314 may include using the flywheel motor 350 to dynamically brake or decelerate the flywheel 314 as the actuator 202 approaches a commanded position to prevent position overshoot.

In a further example, active control of flywheel 314 rotation may include using a brake 360 (e.g., FIGS. 16 and 20) to decelerate the flywheel 314 as the actuator 202 approaches a commanded position of the movable device 124 to prevent position overshoot of the commanded position. The method may additionally include dynamically braking the rotation of the flywheel 314 such as to oppose disturbances (e.g., undesirable motion) of the actuator 202. The step of dynamically braking (e.g., decelerating or reducing rotational speed) of the flywheel 314 may be performed using a brake 360 operatively engageable to the flywheel 314 (e.g., FIGS. 16 and 20) or operatively engageable to a brake rotor (not shown) that may be fixedly coupled to the flywheel 314. Alternatively or additionally, the step of dynamically braking the flywheel 314 may be performed using rotational drag generated by the flywheel motor 350 as described above.

Now referring to FIG. 25, FIG. 25 is a perspective view of an aircraft 100 having one or more translational inerter assemblies 500 (see FIGS. 26-31) for damping movement 606 (see FIG. 31) of the flight control surface 122 of the aircraft 100. The aircraft 100 may include the fuselage 102 and the pair of wings 114 extending outwardly from the fuselage 102. The aircraft 100 may include a pair of propulsion units 115 (e.g., gas turbine engines). As mentioned above, each wing 114 may include one or more movable devices 124 configured as flight control surfaces 122 of the flight control system 120, where the flight control surfaces 122 may be actuated by one or more actuators 202 (see FIG. 26) that may be coupled to the one or more translational inerter assemblies 500 (see FIGS. 26-31). The flight control surface 122 (see FIGS. 25, 26) may be hingedly coupled to a support structure 116 (see FIGS. 25, 26) that is rigid, such as the wing 114, including a wing portion support structure 117 (see FIG. 26), such as the wing spar 118 (see FIG. 26), or such as another suitable support structure.

Such flight control surfaces 122 (see FIG. 25) on the wings 114 (see FIG. 25) may include, but are not limited to, spoilers, ailerons 130 (see FIG. 25), and one or more high-lift devices, such as a leading edge slats and/or trailing edge flaps. At the aft end of the fuselage 102 (see FIG. 25), the empennage 104 (see FIG. 25) may include one or more horizontal tails 110 (see FIG. 25) and the vertical tail 106 (see FIG. 25), any one or more of which may include flight control surfaces 122 (see FIG. 25) such as the elevator 112 (see FIG. 25), the rudder 108 (see FIG. 25), or other types of movable devices 124 (see FIG. 25) that may be actuated by one or more actuators 202 (see FIG. 26) that may be coupled to one or more translational inerter assemblies 500 (see FIGS. 26-31).

Now referring to FIG. 26, FIG. 26 is a top view of a wing section 114a of the wing 114, taken along line 26-26 of FIG. 25, illustrating an actuator 202 and two translational inerter assemblies 500, such as in the form of a first translational inerter assembly 500a and a second translational inerter assembly 500b, operatively coupled to the flight control surface 122 in the form of aileron 130. FIG. 26 shows the flight control system 120 comprising the movable device 124, such as the flight control surface 122 in the form of aileron 130. As shown in FIG. 26, the flight control surface 122 may be hingedly coupled to the support structure 116 such as the wing 114, including the wing portion support structure 117, such as the wing spar 118, or such as another suitable support structure. The flight control surface 122 (see FIG. 26) may be pivotable or rotatable about a hinge axis 126 (see FIGS. 27-30A). The flight control surface 122 preferably comprises the aileron 130, and the support structure 116 preferably comprises the wing 114, the wing portion support structure 117, the wing spar 118, or another suitable support structure.

As shown in FIG. 26, the flight control surface 122, such as the aileron 130, comprises a first end 502a and a second end 502b. As further shown in FIG. 26, the first translational inerter assembly 500a is attached to the first end 502a of the flight control surface 122, such as the aileron 130, and the second translational inerter assembly 500b is attached to the second end 502b of the flight control surface 122, such as the aileron 130. As further shown in FIG. 26, the translational inerter assembly 500 comprises one or more attachment points 504 for connecting the flight control surface 122 to the support structure 116, such as the wing 114, including the wing portion support structure 117, such as the wing spar 118, or such as another suitable support structure, and to provide additional structural robustness. For example, as shown in FIG. 26, the translational inerter assembly 500, such as in the form of first translational inerter assembly 500a, may comprise attachment point 504, such as in the form of a first bearing 504a that attaches the first end 502a of the flight control surface 122 to the support structure 116. In addition, as further shown in FIG. 26 the translational inerter assembly 500, such as in the form of second translational inerter assembly 500b, may comprise attachment point 504, such as in the form of a second bearing 504b that attaches the second end 502b of the flight control surface 122 to the support structure 116. The attachment points 504 (see FIG. 26), such as in the form of the first bearing 504a (see FIG. 26) and the second bearing 504b (see FIG. 26), constrain the flight control surface 122 in five (5) degrees of freedom and allow rotation about the hinge axis 126 (see FIGS. 27-30A).

As further shown in FIG. 26, the translational inerter assembly 500, such as in the form of first translational inerter assembly 500a, may be fixedly attached to the support structure 116 via a first torsion bar bearing 506a, and the translational inerter assembly 500, such as in the form of second translational inerter assembly 500b, may be fixedly attached to the support structure 116 via a second torsion bar bearing 506b. The flight control surface 122 (see FIG. 26), such as in the form of aileron 130 (see FIG. 26), may be actuated by one or more actuators 202 (see FIG. 26) located on one or both ends of the flight control surface 122 (see FIG. 26), such as the aileron 130 (see FIG. 26). In FIG. 26, the actuator 202 and the translational inerter assemblies 500 are provided as separate components and may each be coupled between the support structure 116, such as the wing portion support structure 117, the wing spar 118, or another suitable support structure, and the flight control surface 122, such as the aileron 130. The one or more actuators 202 (see FIG. 26) are present, along with the translational inerter assembly 500. The one or more actuators 202 may be positioned anywhere along the wing spar 118 and the aileron 130 for desired and advantageous structural strength, rigidity, aircraft weight, and/or installation cost. The translational inerter assembly 500 may be applied to any flight control surface that comprises a flutter critical surface.

Now referring to FIG. 27, FIG. 27 is a sectional view of the wing section 114a of the wing 114, taken along line 27-27 of FIG. 26, and illustrates an example of the translational inerter assembly 500, such as the first translational inerter assembly 500a, installed in a first end opening 508a of the first end 502a (see FIG. 26) of the movable device 124, such as the flight control surface 122, for example, the aileron 130. FIG. 27 shows the translational inerter assembly 500, such as the first translational inerter assembly 500a, comprising a press fit element 510 inserted within the first end opening 508a, an inertia element 512 inserted within the press fit element 510, and a torsion bar 514, or torsion rod, inserted within the inertia element 512. FIG. 27 further shows the attachment point 504, such as in the form of the first bearing 504a, that attaches the flight control surface 122, such as the aileron 130, to the support structure 116, such as the wing portion support structure 117 of the wing 114, to provide further structural robustness. FIG. 27 further shows the translational inerter assembly 500, such as the first translational inerter assembly 500a, attached to a horn element 516 and a bearing 518 that may be attached to one or more actuators 202 (see FIGS. 26, 28) for surface position control.

FIG. 28 is a sectional view of the wing section 114a of the wing 114, taken along line 28-28 of FIG. 26, and illustrates an example of the translational inerter assembly 500, such as the second translational inerter assembly 500b, installed in a second end opening 508b of the second end 502b (see FIG. 26) of the movable device 124, such as the flight control surface 122, for example, the aileron 130. FIG. 28 shows the translational inerter assembly 500, such as the second translational inerter assembly 500b, comprising the press fit element 510 inserted within the second end opening 508b, the inertia element 512 within the press fit element 510, and the torsion bar 514 within the inertia element 512. FIG. 28 further shows the attachment point 504, such as in the form of the second bearing 504b, that attaches the flight control surface 122, such as the aileron 130, to the support structure 116, such as the wing portion support structure 117 of the wing 114, to provide further structural robustness.

FIG. 28 further shows an example of the actuator 202, such as in the form of a hydraulic actuator 204 that is linear, and that is mechanically coupled between the support structure 116, such as the wing spar 118, and one end of the movable device 124, such as the flight control surface 122, for example, the aileron 130. As shown in FIG. 28, the actuator 202, such as in the form of hydraulic actuator 204, includes a piston 216 coupled to a piston rod 224. The piston 216 (see FIG. 28) is slidable within an actuator housing 228 (see FIG. 7) (e.g., a cylinder). The actuator 202 (see FIG. 28), such as in the form of hydraulic actuator 204 (see FIG. 28), further includes a rod end 214 (see FIG. 28) and a cap end 212 (see FIG. 28) axially movable relative to one another in response to pressurized hydraulic fluid acting in an unbalanced manner on one or both sides of the piston 216 (see FIG. 28) inside the actuator housing 228 (see FIG. 7). In the example shown in FIG. 28, the rod end 214 of the actuator 202, such as the hydraulic actuator 204, is coupled to a bellcrank 128. The bellcrank 128 (see FIG. 28) is hingedly coupled to the flight control surface 122 (see FIG. 28), such as the aileron 130 (see FIG. 28), in a manner such that linear actuation of the hydraulic actuator 204 (see FIG. 28) causes pivoting of the flight control surface 122, such as the aileron 130, about the hinge axis 126 (see FIG. 28). Alternatively, instead of the bellcrank 128, the horn element 516 (see FIG. 27) and bearing 518 (see FIG. 27) may be used as a connection between the rod end 214 of the actuator 202 and the translational inerter assembly 500 and the flight control surface 122. The cap end 212 (see FIG. 28) of the actuator 202 (see FIG. 28), such as the hydraulic actuator 204 (see FIG. 28), is coupled to the wing spar 118 (see FIG. 28).

Figure 29A:
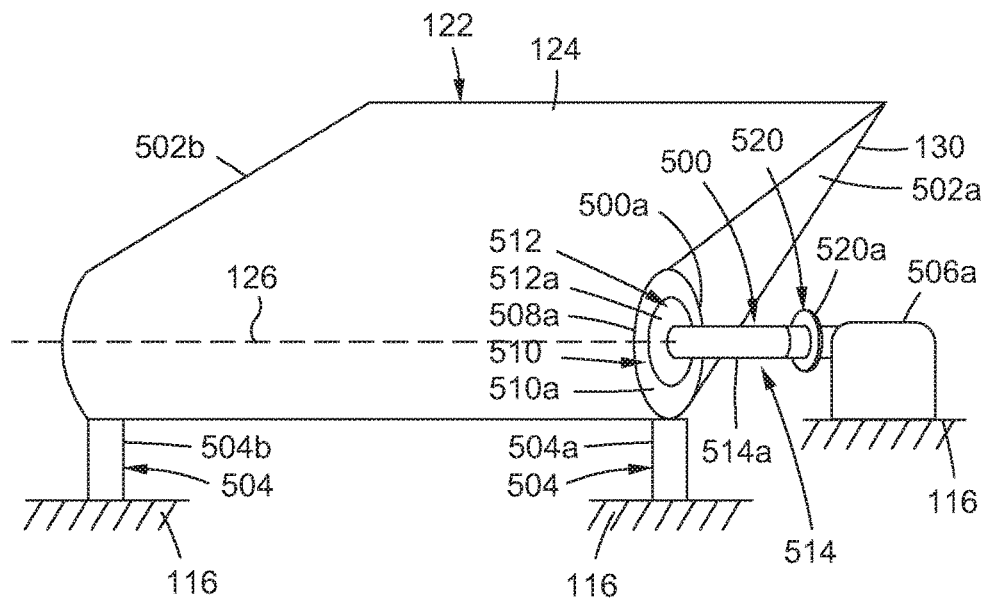
FIG. 29A is a schematic perspective view of a flight control surface with a translational inerter assembly installed in a first end of the flight control surface.

Now referring to FIG. 29A, FIG. 29A is a schematic perspective view of the movable device 124, such as the flight control surface 122, for example, the aileron 130, with the translational inerter assembly 500, such as the first translational inerter assembly 500a, installed in the first end opening 508a of the first end 502a, of the movable device 124, such as the flight control surface 122, for example, the aileron 130. FIG. 29A further shows the first translational inerter assembly 500a comprising the press fit element 510, in the form of a first press fit element 510a, inserted within the first end opening 508a, comprising the inertia element 512, in the form of a first inertia element 512a, inserted within the press fit element 510, comprising the torsion bar 514 or torsion rod, in the form of a first torsion bar 514a or first torsion rod, inserted within the inertia element 512 at one end and attached to the first torsion bar bearing 506a at the other end. The first torsion bar bearing 506a (see FIG. 29A) is attached to the support structure 116 (see FIG. 29A). The first torsion bar bearing 506a (see FIG. 29A) constrains the torsion bar 514 in six (6) degrees of freedom. FIG. 29A further shows the first translational inerter assembly 500a comprising the splined attachment element 520, in the form of a first splined attachment element 520a, coupled to the torsion bar 514.

As shown in FIG. 29A, the translational inerter assembly 500, such as in the form of first translational inerter assembly 500a, may further comprise attachment point 504, in the form of the first bearing 504a, that attaches the first end 502a of the flight control surface 122 to the support structure 116. In addition, as further shown in FIG. 29A the translational inerter assembly 500, such as in the form of second translational inerter assembly 500b, may further comprise attachment point 504, such as in the form of a second bearing 504b, that attaches the second end 502b of the flight control surface 122 to the support structure 116. The attachment points 504 (see FIG. 29A), such as in the form of the first bearing 504a (see FIG. 29A) and the second bearing 504b (see FIG. 29A), constrain the flight control surface 122 in five (5) degrees of freedom and allow rotation about the hinge axis 126 (see FIG. 29A).

Figure 29B:
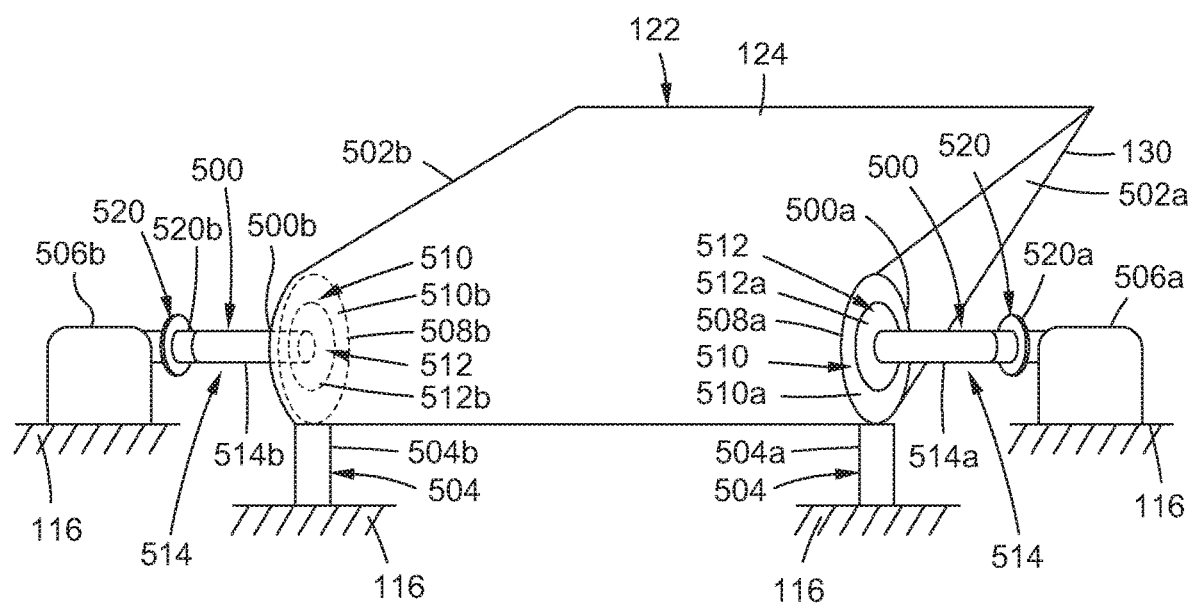
FIG. 29B is a schematic perspective view of a flight control surface with two translational inerter assemblies installed the flight control surface with one installed in a first end and another installed in a second end of the flight control surface.

Now referring to FIG. 29B, FIG. 29B is a schematic perspective view of the movable device 124, such as the flight control surface 122, for example, the aileron 130, of FIG. 29A, with two translational inerter assemblies 500, such as in the form of the first translational inerter assembly 500a, installed in the first end opening 508a of the first end 502a, and such as in the form of the second translational inerter assembly 500b, installed in the second end opening 508b of the second end 502b, of the flight control surface 122. Similar to FIG. 29A, FIG. 29B shows the first translational inerter assembly 500a comprising the press fit element 510, in the form of first press fit element 510a, inserted within the first end opening 508a, comprising the inertia element 512, in the form of first inertia element 512a, inserted within the press fit element 510, and comprising the torsion bar 514, in the form of first torsion bar 514a, inserted within the inertia element 512 at one end and attached to the first torsion bar bearing 506a at the other end. The first torsion bar bearing 506a (see FIG. 29B) is attached to the support structure 116 (see FIG. 29B). FIG. 29B further shows the first translational inerter assembly 500a comprising the splined attachment element 520, in the form of first splined attachment element 520a, coupled to the torsion bar 514. As shown in FIG. 29B, the first translational inerter assembly 500a, may further comprise attachment point 504, in the form of the first bearing 504a, that attaches the first end 502a of the flight control surface 122 to the support structure 116.

FIG. 29B further shows the second translational inerter assembly 500b comprising the press fit element 510, in the form of a second press fit element 510b, inserted within the second end opening 508b, comprising the inertia element 512, in the form of a second inertia element 512b, inserted within the press fit element 510, and comprising the torsion bar 514 or torsion rod, in the form of a second torsion bar 514b or a second torsion rod, inserted within the inertia element 512 at one end and attached to a second torsion bar bearing 506b at the other end. The second torsion bar bearing 506b (see FIG. 29B) is attached to the support structure 116 (see FIG. 29B). FIG. 29B further shows the second translational inerter assembly 500b comprising the splined attachment element 520, in the form of a second splined attachment element 520b, coupled to the torsion bar 514. As further shown in FIG. 29B the second translational inerter assembly 500b may further comprise attachment point 504, such as in the form of a second bearing 504b, that attaches the second end 502b of the flight control surface 122 to the support structure 116. The attachment points 504 (see FIG. 29B), such as in the form of the first bearing 504a (see FIG. 29B) and the second bearing 504b (see FIG. 29B), constrain the flight control surface 122 in five (5) degrees of freedom and allow rotation about the hinge axis 126 (see FIG. 29B).

Figure 30A:
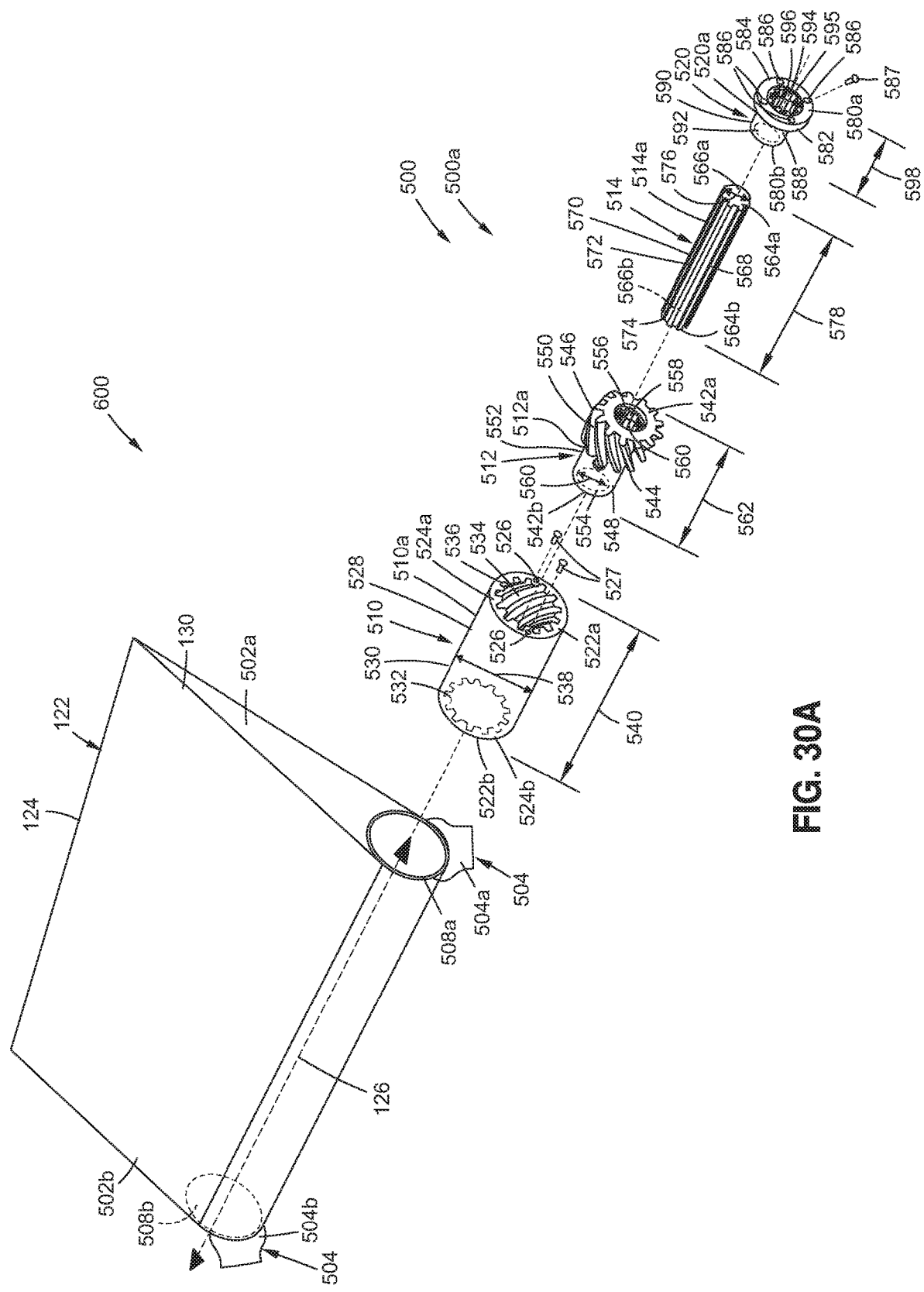
FIG. 30A is an exploded perspective view of a flight control surface with a translational inerter assembly in a disassembled position.

Now referring to FIG. 30A, FIG. 30A is an exploded perspective view of the movable device 124, such as the flight control surface 122, for example, the aileron 130a, with the translational inerter assembly 500, such as in the form of first translational inerter assembly 500a, in a disassembled position 600. As shown in FIG. 30A, the movable device 124, such as the flight control surface 122, for example, the aileron 130a, comprises the first end 502a with the first end opening 508a and comprises the second end 502b with the second end opening 508b. The flight control surface 122 (see FIG. 30A) comprises the hinge axis 126 (see FIG. 30A). The translational inerter assembly 500 further comprises the first bearing 504a (see FIG. 30A) attaching the first end 502a (see FIG. 30A) of the flight control surface 122 (see FIG. 30A) to the support structure 116 (see FIG. 30B), and the second bearing 504b (see FIG. 30A) attaching the second end 502b (see FIG. 30A) of the flight control surface 122 to the support structure 116 (see FIG. 30B). The first bearing 504a (see FIGS. 30A-30B) and the second bearing 504b (see FIG. 30A-30B) constrain the flight control surface 122 in five (5) degrees of freedom and allow rotation about the hinge axis 126 (see FIG. 30A).

As further shown in FIG. 30A, the translational inerter assembly 500, such as in the form of first translational inerter assembly 500a, comprises the press fit element 510, in the form of first press fit element 510a. As shown in FIG. 30A, the press fit element 510 comprises a press fit element first end 522a, a press fit element second end 522b, and a press fit element body 528 formed therebetween. The press fit element first end 522a (see FIG. 30A) has an outer face 524a (see FIG. 30A) with a plurality of fastener holes 526 (see FIG. 30A), for example, two fastener holes 526, configured to attach to, via a plurality of fasteners 527 (see FIG. 30A), the horn element 516 (see FIG. 30A) and the bearing 518 (see FIG. 30A) for surface position control using one or more actuators 202 (see FIG. 28). The press fit element second end 522b (see FIG. 30A) has an inner face 524b (see FIG. 30A). As further shown in FIG. 30A, the press fit element 510 has an exterior 530, a helical spline interior 532, and a press fit element through opening 534 having a plurality of interior helical splines 536 formed along the press fit element through opening 534. The press fit element 510 (see FIG. 30A) has a press fit element outer diameter 538 (see FIG. 30A) and a press fit element length 540 (see FIG. 30A).

As further shown in FIG. 30A, the translational inerter assembly 500, such as in the form of first translational inerter assembly 500a, comprises the inertia element 512, such as the first inertia element 512a. As shown in FIG. 30A, the inertia element 512 comprises an inertia element first end 542a, an inertia element second end 542b, and an inertia element body 544 formed therebetween. The inertia element body 544 (see FIG. 30A) comprises a helical spline portion 546 (see FIG. 30A) integral with a shaft portion 548 (see FIG. 30A). The helical spline portion 546 has a plurality of exterior helical splines 550. The plurality of exterior helical splines 550 may comprise one of, right hand direction helical splines 551a, or left hand direction helical splines 551b. If there are two translational inerter assemblies 500, such as in the form of first translational inerter assembly 500a (see FIG. 29B) and second translational inerter assembly 500b (see FIG. 29B), the plurality of exterior helical splines 550 of each translational inerter assembly 500 are in opposite directions 553 (see FIG. 31), that is one translational inerter assembly 500 has right hand direction helical splines 551a and the other translational inerter assembly 500 has left hand direction helical splines. By having the inertia element 512 of one translational inerter assembly 500 with right hand direction helical splines 551a and the inertia element 512 of the other translational inerter assembly 500 with left hand direction helical splines, the inertia elements 512 move opposite one another along the hinge axis 126 (see FIG. 30A) to keep the loads associated with the acceleration of the inertia elements 512 equal and opposite, so that the loads nearly cancel to limit the loading of the first bearing 504a (see FIG. 30A) and the second bearing 504b (see FIG. 30A).

The plurality of exterior helical splines 550 (see FIG. 30A) of the inertia element 512 (see FIG. 30A) correspond to the plurality of interior helical splines 536 (see FIG. 30A) of the press fit element 510 (see FIG. 30A), when the inertia element 512 is inserted into and coupled within the press fit element 510. As used herein, "helical spline" means equally spaced grooves or projections that form a helix about the exterior of a helical spine portion or a shaft portion of an inertia element, where the sides of the grooves or projections may be parallel or involute tooth form, and where the grooves or projections fit into corresponding grooves or projections in a helical spline interior of a press fit element, enabling the exterior helical splines of the inertia element to translate or slide along a plurality of interior helical splines of the helical spline interior of the press fit element.

As further shown in FIG. 30A, the inertia element 512 has an exterior 552, a linear spline interior 554, and an inertia element through opening 556 having a plurality of interior linear splines 558 formed along the inertia element through opening 556. The inertia element 512 (see FIG. 30A) has an inertia element inner diameter 560 (see FIG. 30A) and an inertia element length 562 (see FIG. 30A). The inertia element inner diameter 560 is smaller than the press fit element outer diameter 538, and the inertia element length 562 is shorter than the press fit element length 540.

As further shown in FIG. 30A, the translational inerter assembly 500, such as in the form of first translational inerter assembly 500a, comprises the torsion bar 514, such as the first torsion bar 514a. As shown in FIG. 30A, the torsion bar 514 comprises a torsion bar first end 564a with a first end face 566a, a torsion bar second end 564b with a second end face 566b, and a torsion bar body 568 formed therebetween. The torsion bar body 568 (see FIG. 30A) comprises a linear spline exterior 570 (see FIG. 30A and a solid interior 574 (see FIG. 30A). The linear spline exterior 570 comprises a plurality of exterior linear splines 572 longitudinally formed along a torsion bar length 578 of the torsion bar 514. The torsion bar 514 (see FIG. 30A) has a torsion bar outer diameter 576 (see FIG. 30A). The torsion bar outer diameter 576 is smaller than the inertia element inner diameter 560, and the torsion bar length 578 is longer than the inertia element length 562.

Preferably, there is a balance of surface areas between, (a) the contact surface area or surface interface between the plurality of exterior helical splines 550 of the inertia element 512 and the plurality of interior helical splines 536 of the press fit element 510, and (b) the contact surface area or surface interface between the interior linear splines 558 of the inertia element 512 and the plurality of exterior linear splines 572 of the torsion bar 514, such that the balance results in a wear rate that is equivalent, or substantially equivalent, of both the interior and exterior spline surface interfaces of the inertia element 512. The balance of surface areas may be achieved in the contact surface area or surface interface between the interior splines and the contact surface area or surface interface between the exterior splines, given the larger radius of the exterior helical splines 550 of the inertia element 512 and a shorter length spline engagement to assure an appropriate balance of surface area. The surface area balance may preferably be that which achieves a maximum life and acceptable load on the shaft portion 548 or interior spline shaft of the inertia element 512 and on the exterior linear splines 572 of the torsion bar 514. A torsion bar outer diameter 576 (see FIG. 30A) may be reduced near the splined attachment element 520 (see FIG. 30A) inner diameter.

As further shown in FIG. 30A, the translational inerter assembly 500, such as in the form of first translational inerter assembly 500a, comprises the splined attachment element 520, such as the first splined attachment element 520a. As shown in FIG. 30A, the splined attachment element 520 comprises a splined attachment element first end 580a, a splined attachment element second end 580b, and a splined attachment element body 582 formed therebetween. The splined attachment element body 582 (see FIG. 30A) comprises a fastener portion 584 (see FIG. 30A) integral with a shaft portion 588 (see FIG. 30A). The fastener portion 584 has a plurality of fastener holes 586 (see FIG. 30A), for example, four fastener holes 586, configured to attach to, via a plurality of fasteners 587 (see FIG. 30A), the first torsion bar bearing 506a (see FIG. 30A) and/or the support structure 116 (see FIG. 30B). Although FIG. 30A shows only one fastener 587, each fastener hole 586 would be configured to receive a separate fastener 587.

As further shown in FIG. 30A, the splined attachment element 520 has an exterior 590, a linear spline interior 592, and a splined attachment element through opening 594 having a plurality of interior linear splines 595 formed along the splined attachment element through opening 594. The splined attachment element 520 (see FIG. 30A) has a splined attachment element inner diameter 596 (see FIG. 30A) and a splined attachment element length 598 (see FIG. 30A). The splined attachment element inner diameter 596 is larger than the torsion bar outer diameter 576, and the splined attachment element length 598 is shorter than the torsion bar length 578.

Figure 30B:
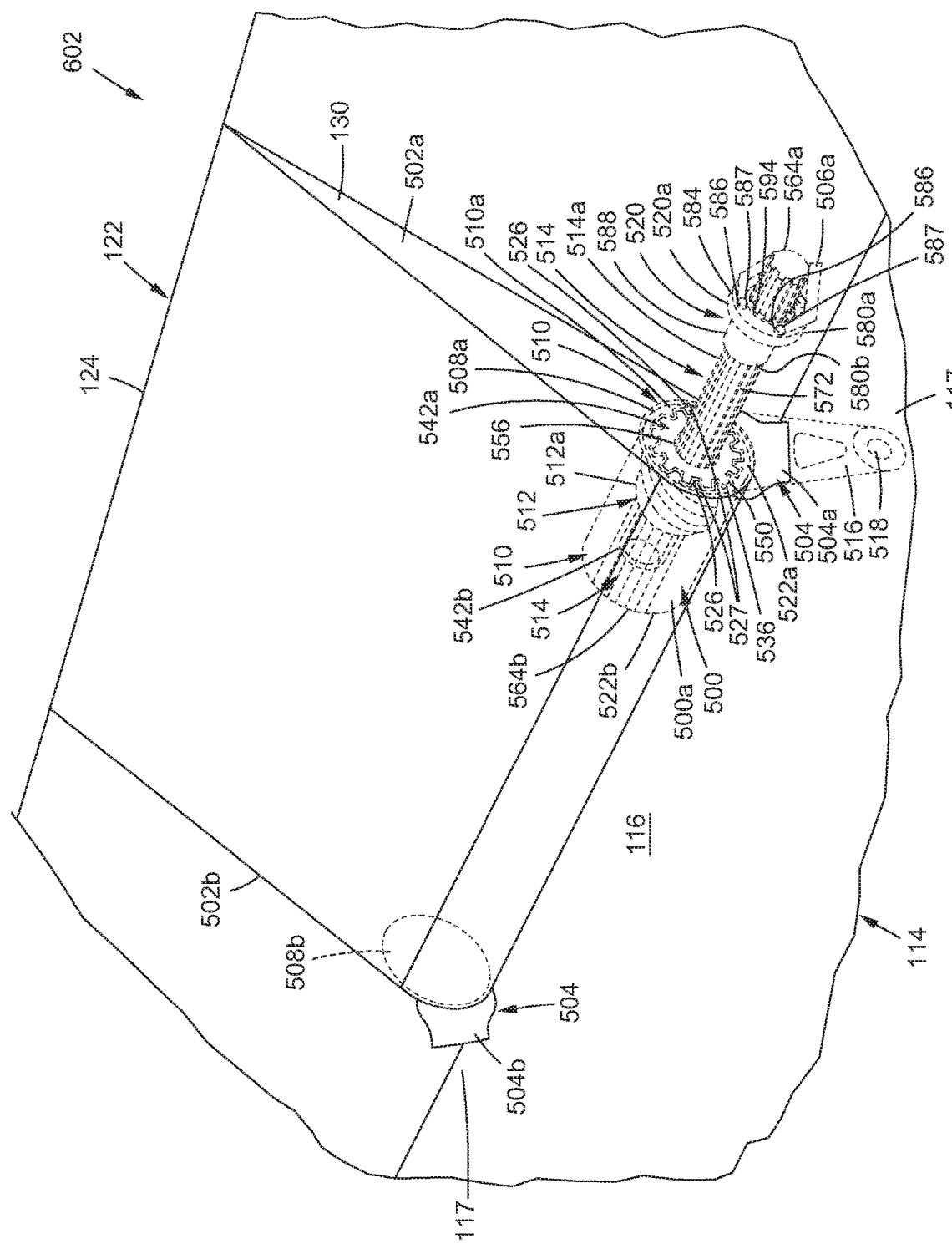
FIG. 30B is a perspective view of the flight control surface of FIG. 30A with the translational inerter assembly in an assembled position.

Rotation of the flight control surface 122 (see FIG. 30B) causes translational movement 604 (see FIG. 31) of the inertia element 512 (see FIG. 30B), via the press fit element 510 (see FIG. 30B), along the hinge axis 126 (see FIG. 30B) of the flight control surface 122, and along the torsion bar 514 (see FIG. 30B). This results in the translational inerter assembly 500 (see FIG. 30B) damping movement 606 (see FIG. 31) of the flight control surface 122 (see FIG. 30B).

Now referring to FIG. 30B, FIG. 30B is a perspective view of the movable device 124, such as the flight control surface 122, for example, the aileron 130*a*, with the translational inerter assembly 500, such as in the form of first translational inerter assembly 500*a*, of FIG. 30A, with the translational inerter assembly in an assembled position 602. FIG. 30B shows the movable device 124, such as the flight control surface 122, for example, the aileron 130*a*, comprising the first end 502*a* with the first end opening 508*a* and comprising the second end 502*b* with the second end opening 508*b*. The first end 502*a* (see FIG. 30B) of the flight control surface 122 (see FIG. 30B) is attached to attachment point 504 (see FIG. 30B), such as in the form of first bearing 504*a* (see FIG. 30B), and the first bearing 504*a* is attached to the support structure 116 (see FIG. 30B), such as the wing 114 (see FIG. 30B), for example, the wing portion support structure 117 (see FIG. 30B). The second end 502*b* (see FIG. 30B) of the flight control surface 122 (see FIG. 30B) is attached to attachment point 504 (see FIG. 30B), such as in the form of second bearing 504*b* (see FIG. 30B), and the second bearing 504*b* is attached to the support structure 116 (see FIG. 30B), such as the wing 114 (see FIG. 30B), for example, the wing portion support structure 117 (see FIG. 30B).

As further shown in FIG. 30B, the press fit element 510, such as the first press fit element 510*a*, of the translational inerter assembly 500, such as in the form of first translational inerter assembly 500*a*, is inserted into and press fit within the first end opening 508*a* of the flight control surface 122. The press fit element 510 (see FIG. 30B) is fixedly disposed within the first end opening 508*a* (see FIG. 30B) of the first end 502*a* (see FIG. 30B) of the flight control surface 122 and rotatably movable with the flight control surface 122.

In one version, as shown in FIGS. 29A and 30B, the press fit element 510 may be inserted into one end of the flight control surface 122. In another version, as shown in FIG. 29B, the press fit element 510 may be inserted into both ends of the flight control surface 122. FIG. 30B shows the press fit element first end 522*a* and the press fit element second end 522*b*. The outer face 524*a* (see FIG. 30A) of the press fit element first end 522*a* (see FIGS. 30A-30B) has the plurality of fastener holes 526 (see FIG. 30B), for example, two fastener holes 526, configured to attach to, via the plurality of fasteners 527 (see FIG. 30B), the horn element 516 (see FIG. 30B) and the bearing 518 (see FIG. 30B) for surface position control using one or more actuators 202 (see FIG. 28). The press fit element 510 (see FIG. 30B) has the plurality of interior helical splines 536 (see FIG. 30B).

As further shown in FIG. 30B, the inertia element 512, such as the first inertia element 512*a*, of the translational inerter assembly 500, such as in the form of first translational inerter assembly 500*a*, is inserted within the press fit element through opening 534 (see FIG. 30A) of the press fit element 510. The inertia element 512 is coupled to and installed in the press fit element 510. FIG. 30B shows the inertia element first end 542*a*, the inertia element second end 542*b*, and the inertia element through opening 556. The plurality of exterior helical splines 550 (see FIG. 30B) of the inertia element 512 (see FIG. 30B) correspond to and align with the plurality of interior helical splines 536 (see FIG. 30B) of the press fit element 510 (see FIG. 30B) when the inertia element 512 is inserted within the press fit element 510. As discussed above, the plurality of exterior helical splines 550 (see FIG. 30B) may comprise one of, right hand direction helical splines 551*a* (see FIG. 31), or left hand direction helical splines 551*b* (see FIG. 31).

As further shown in FIG. 30B, the torsion bar 514, such as the first torsion bar 514*a*, of the translational inerter assembly 500, such as in the form of first translational inerter assembly 500*a*, has the torsion bar first end 564*a* exteriorly positioned outside the inertia element 512, the press fit element 510, and the first end opening 508*a* of the flight control surface 122. The torsion bar 514 (see FIG. 30B) has the torsion bar first end 564*a* (see FIG. 30B) coupled to and installed in the inertia element 512 (see FIG. 30B). As further shown in FIG. 30B, the torsion bar 514 has the torsion bar second end 564*b* inserted through the inertia element through opening 556 and positioned within the inertia element 512, within the press fit element 510, and within the first end opening 508*a* of the flight control surface 122. The torsion bar second end 564*b* (see FIGS. 30A-30B) is also preferably fixedly attached to the support structure 116 (see FIGS. 25, 30B) of an aircraft 100 (see FIG. 25). The torsion bar second end 564*b* (see FIG. 30B) is preferably fixedly attached to the support structure 116 (see FIGS. 25, 30B) of the aircraft 100 (see FIG. 25), via the first torsion bar bearing 506*a* (see FIG. 30B) attached to the splined attachment element 520 (see FIG. 30B). The first torsion bar bearing 506*a* (see FIG. 30B) constrains the torsion bar 514 (see FIG. 30B) in six (6) degrees of freedom.

The plurality of exterior linear splines 572 (see FIG. 30B) longitudinally formed along the linear spline exterior 570 (see FIG. 30A) of the torsion bar 514 (see FIGS. 30A-30B) correspond to and align with the plurality of interior linear splines 558 (see FIG. 30A) of the inertia element 512 (see FIGS. 30A-30B) when the torsion bar 514 is partially inserted within the inertia element 512. The plurality of exterior linear splines 572 (see FIG. 30B) of the torsion bar 514 (see FIG. 30B) and the plurality of interior linear splines 558 (see FIG. 30A) of the inertia element 512 (see FIG. 30B) permit or allow a translational movement 604 (see FIG. 31) of the inertia element 512 along the torsion bar 514 (see FIG. 30B), but restrict rotation to that permitted by a torsion bar flexure 573 (see FIG. 31).

As further shown in FIG. 30B, the splined attachment element 520, such as the first splined attachment element 520*a*, of the translational inerter assembly 500, such as in the form of first translational inerter assembly 500*a*, is coupled to and around the torsion bar 514 near or at the torsion bar first end 564*a*. FIG. 30B shows the splined attachment element first end 580*a*, the splined attachment element second end 580*b*, the fastener portion 584 integral with the shaft portion 588, and the splined attachment element through opening 594. The fastener portion 584 (see FIG. 3B) has the plurality of fastener holes 586 (see FIG. 30A), for example, four fastener holes 586, configured to attach to, via the plurality of fasteners 587 (see FIG. 30B), the first torsion bar bearing 506*a* (see FIG. 30B) and/or the support structure 116 (see FIG. 30B). Each fastener hole 586 (see FIG. 30B) is preferably configured to receive a separate fastener 587 (see FIG. 30B). The plurality of exterior linear splines 572 (see FIG. 30B) longitudinally formed along the linear spline exterior 570 (see FIG. 30A) of the torsion bar 514 (see FIGS. 30A-30B) correspond to and align with the plurality of interior linear splines 595 (see FIG. 30A) of the splined attachment element 520 (see FIGS. 30A-30B), when the torsion bar 514 is inserted through the splined attachment element through opening 594. In other words, the plurality of interior linear splines 595 (see FIG. 30A) correspond to the plurality of exterior linear splines 572 (see FIGS. 30A-30B) of the torsion bar 514 (see FIGS. 30A-30B).

Figure 31:
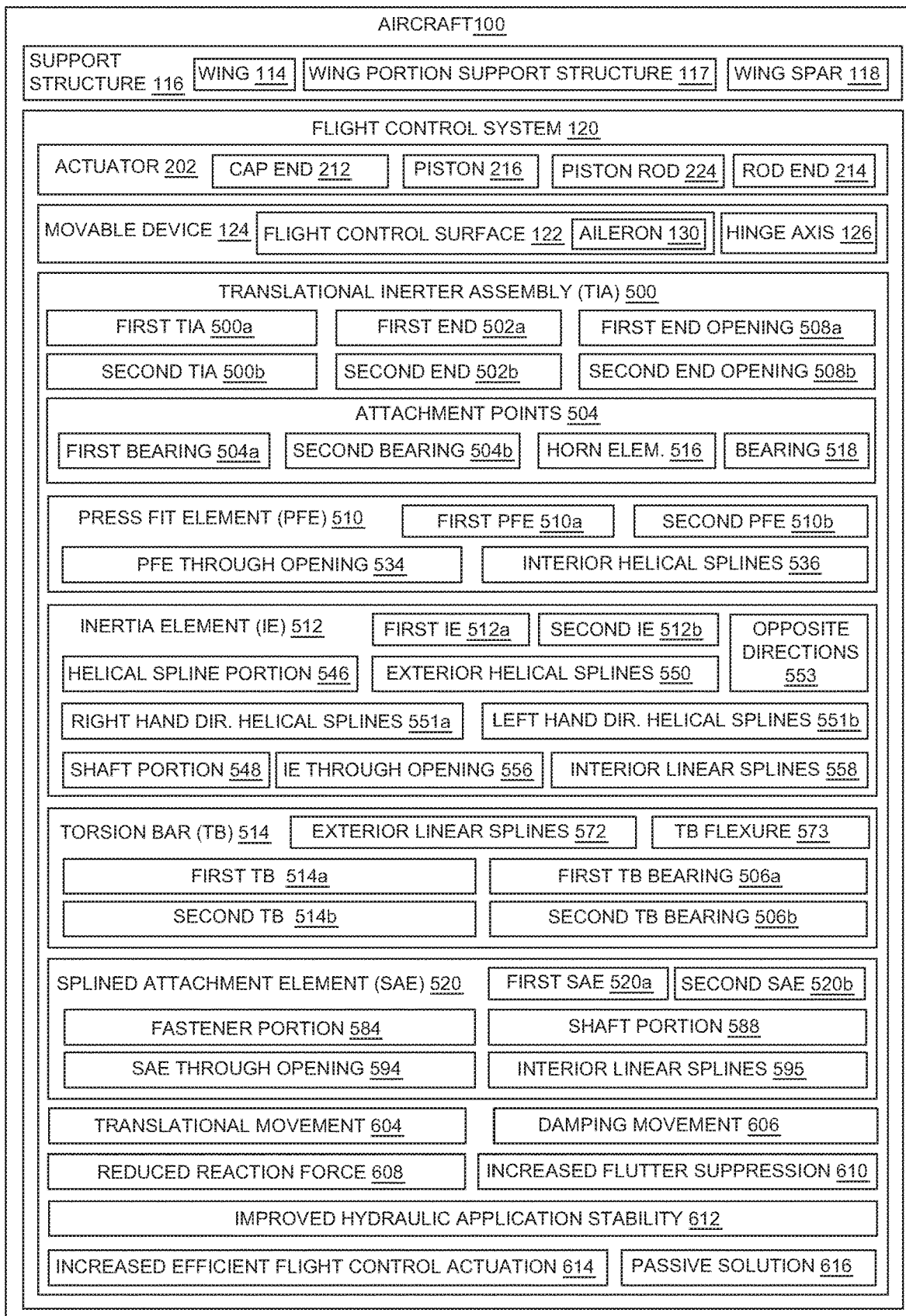
FIG. 31 is a block diagram of a flight control system of an aircraft including an actuator for actuating a flight control surface, and further including a translational inerter assembly for damping movement of the flight control surface.

Now referring to FIG. 31, FIG. 31 is a block diagram of a flight control system 120 of an aircraft 100, including one or more actuators 202 configured to actuate, or actuating, a movable device 124, such as a flight control surface 122, for example, an aileron 130, about a hinge axis 126, and further including a translational inerter assembly (TIA) 500 for damping movement 606 of the movable device 124, such as the flight control surface 122, for example, the aileron 130. The aircraft 100 (see FIG. 31) comprises the flight control surface 122 (see FIG. 31) pivotably coupled to a support structure 116 (see FIG. 31). As shown in FIG. 31, the support structure 116 may comprise a wing 114, a wing portion support structure 117, a wing spar 118, or another suitable support structure 116. As further shown in FIG. 31, the actuator 202 comprises the cap end 212, the piston 216, the piston rod, 224, and the rod end 214.

As shown in FIG. 31, the aircraft 100 further comprises at least one translational inerter assembly 500 for damping movement 606 of the flight control surface 122. The at least one translational inerter assembly 500, as discussed above, may comprise the first translational inerter assembly 500a attached at the first end opening 508a of the first end 502a of the flight control surface 122, such as the aileron 130. The at least one translational inerter assembly 500, as discussed above, may further comprise the second translational inerter assembly 500b attached at the second end opening 508b of the second end 502b of the flight control surface 122, such as the aileron 130. In one version the flight control system 120 (see FIG. 31) comprises one translational inerter assembly 500 attached to one end of the flight control surface 122. In another version, the flight control system 120 (see FIG. 31) comprises two translational inerter assemblies 500 each attached to opposite ends of the flight control surface 122. For example, the two translational inerter assemblies 500 may comprise the first translational inerter assembly 500a attached to the first end 502a of the flight control surface 122, and may comprise the second translational inerter assembly 500b attached to the second end 502b of the flight control surface 122.

As shown in FIG. 31, the translational inerter assembly 500 of the aircraft 100 comprises attachment points 504, including the first bearing 504a attaching the first end 502a of the flight control surface 122 to the support structure 116, and the second bearing 504b attaching the second end 502b of the flight control surface 122 to the support structure 116. The first bearing 504a (see FIG. 31) and the second bearing 504b (see FIG. 31) constrain the flight control surface 122 (see FIG. 31) in five (5) degrees of freedom and allow rotation about the hinge axis 126 (see FIG. 31). In addition, the translational inerter assembly 500 (see FIGS. 27, 31) may be attached to a horn element 516 (see FIGS. 27, 31) and a bearing 518 (see FIGS. 27, 31) that may be attached to one or more actuators 202 (see FIGS. 26, 28, 31) for surface position control.

As shown in FIG. 31, the translational inerter assembly 500 of the aircraft 100 further comprises the press fit element (PFE) 510 that is preferably fixedly disposed within the first end 502a of the flight control surface 122 and rotatably movable with the flight control surface 122. The press fit element (PFE) 510 (see FIG. 31) may comprise a first press fit element (PFE) 510a (see FIGS. 29B, 31) fixedly disposed within the first end 502a (see FIGS. 29B, 31) of the flight control surface 122 (see FIGS. 29B, 31), and a second press fit element (PFE) 510b (see FIGS. 29B, 31) fixedly disposed within the second end 502b (see FIGS. 29B, 31) of the flight control surface 122 (see FIGS. 29B, 31). Each press fit element 510 comprises a press fit element (PFE) through opening 534 (see FIGS. 30A, 31) with a plurality of interior helical splines 536 (see FIGS. 30A, 31).

As shown in FIG. 31, the translational inerter assembly 500 of the aircraft 100 further comprises the inertia element (IE) 512 coupled to and installed in the press fit element 510. The inertia element (IE) 512 (see FIG. 31) may comprise a first inertia element (IE) 512a (see FIGS. 29B, 31) translationally disposed within the press fit element (PFE) through opening 534 (see FIGS. 30A, 31) of the first press fit element 510a (see FIGS. 29B, 31) of the first translational inerter assembly 500a (see FIG. 31). The inertia element (IE) 512 (see FIG. 31) may further comprise a second inertia element (IE) 512b (see FIGS. 29B, 31) translationally disposed within the press fit element (PFE) through opening 534 (see FIGS. 30A, 31) of the second press fit element 510b (see FIGS. 29B, 31) of the second translational inerter assembly 500b (see FIG. 31).

As shown in FIG. 31, each inertia element 512 has a helical spline portion 546 with a plurality of exterior helical splines 550 that are configured to correspond to and correspond to the plurality of interior helical splines 536 of the press fit element 510. The plurality of exterior helical splines 550 (see FIG. 31) may comprise right hand direction helical splines 551a (see FIG. 31), or may comprise left hand direction helical splines 551b (see FIG. 31). In one version, the first inertia element 512a (see FIG. 31) may have the plurality of exterior helical splines 550 (see FIG. 31) comprising right hand direction helical splines 551a (see FIG. 31), and the second inertia element 512b (see FIG. 31) may have the plurality of exterior helical splines 550 comprising left hand direction helical splines 551b (see FIG. 31). If the flight control surface 122 (see FIGS. 29B, 31) has two translational inerter assemblies 500 (see FIGS. 29B, 31), for example, the first translational inerter assembly 500a (see FIGS. 29B, 31) with the first inertia element 512a (see FIGS. 29B, 31) and the second translational inerter assembly 500b (see FIGS. 29B, 31) with the second inertia element 512b (see FIGS. 29B, 31), then the plurality of exterior helical splines 550 (see FIGS. 29B, 31) of the first inertia element 512a and the second inertia element 512b are preferably oriented or formed in opposite directions 553 (see FIG. 31).

As shown in FIG. 31, each inertia element 512 further has a shaft portion 548, where the shaft portion 548 is preferably integral with the helical spline portion 546. Alternatively, the shaft portion 548 (see FIG. 31) and the helical spline portion 546 (see FIG. 31) may be separate pieces or parts that are attached or coupled together via a suitable attachment means. As shown in FIG. 31, each inertia element further has an inertia element (IE) through opening 556 with a plurality of interior linear splines 558.

As shown in FIG. 31, the translational inerter assembly 500 of the aircraft 100 further comprises the torsion bar (TB) 514 having the torsion bar first end 564a (see FIG. 30B) coupled to and installed in the inertia element (IE) through opening 556 (see also FIG. 30B) of the inertia element 512 (see also FIG. 30B), and having the torsion bar second end 564b (see FIG. 30B) fixedly attached to the support structure 116 (see also FIG. 30B) of the aircraft 100. As shown in FIG. 31, the torsion bar (TB) 514 may comprise a first torsion bar (TB) 514a coupled or attached to a first torsion bar (TB) bearing 506a, and may comprise a second torsion bar (TB) 514b coupled or attached to a second torsion bar (TB) bearing 506b. The first torsion bar bearing 506a (see FIG. 31) constrains the torsion bar 514 (see FIG. 31), such as in the form of first torsion bar 514a (see FIG. 31), in six (6) degrees of freedom. The second torsion bar bearing 506b (see FIG. 31) constrains the torsion bar 514 (see FIG. 31), such as in the form of second torsion bar 514b (see FIG. 31), in six (6) degrees of freedom.

Each torsion bar 514 (see FIG. 31) has a plurality of exterior linear splines 572 (see FIG. 31) configured to correspond to and corresponding to the plurality of interior linear splines 558 (see FIG. 31) of the inertia element 512 (see FIG. 31). The plurality of exterior linear splines 572 (see FIGS. 30B, 31) longitudinally formed along the linear spline exterior 570 (see FIG. 30A) of the torsion bar 514 (see FIGS. 30A-30B, 31) correspond to and align with the plurality of interior linear splines 558 (see FIGS. 30A, 31) of the inertia element 512 (see FIGS. 30A-30B, 31), when the torsion bar 514 is partially inserted within the inertia element 512. The plurality of exterior linear splines 572 (see FIG. 31) of the torsion bar 514 (see FIG. 31) and the plurality of interior linear splines 558 (see FIG. 31) of the inertia element 512 (see FIG. 30B) facilitate translational movement 604 (see FIG. 31) of the inertia element 512 along the torsion bar 514 (see FIG. 30B), but restrict rotation to that permitted by a torsion bar flexure 573 (see FIG. 31).

As shown in FIG. 31, the translational inerter assembly 500 of the aircraft 100 may further comprise a splined attachment element (SAE) 520 coupled to the torsion bar 514. The splined attachment element (SAE) 520 may comprise a first splined attachment element (SAE) 520a coupled to the first torsion bar (TB) 514a of the first translational inerter assembly 500a, and may comprise a second splined attachment element (SAE) 520b coupled to the second torsion bar (TB) 514b of the second translational inerter assembly 500b. Each splined attachment element (SAE) 520 (see FIG. 31) comprises a fastener portion 584 (see FIG. 31) integral with a shaft portion 588 (see FIG. 31). Alternatively, the fastener portion 584 (see FIG. 31) and the shaft portion 588 (see FIG. 31) may be separate pieces or parts that are attached or coupled together via a suitable attachment means. Each splined attachment element (SAE) 520 (see FIG. 31) may further comprise a splined attachment element (SAE) through opening 594 (see FIG. 31) having a plurality of interior linear splines 595 (see FIG. 31) formed along the splined attachment element (SAE) through opening 594.

Rotation of the flight control surface 122 (see FIG. 31) causes translational movement 604 (see FIG. 31) of the inertia element 512 (see FIG. 31), via the press fit element 510 (see FIG. 31), along the hinge axis 126 (see FIG. 31) of the flight control surface 122 and along the torsion bar 514 (see FIG. 31). This results in the at least one translational inerter assembly 500 (see FIG. 31) damping movement 606 (see FIG. 31) of the flight control surface 122. Damping movement 606 (see FIG. 31) of the flight control surface 122 (see FIG. 31) preferably provides increased flutter suppression 610 (see FIG. 31) of the flight control surface 122. This preferably results in an improved hydraulic application stability 612 (see FIG. 31) and an increased efficient flight control actuation 614 (see FIG. 31). The translational inerter assembly 500 (see FIG. 31) of the aircraft 100 (see FIG. 31) provides a passive solution 616 (see FIG. 31), that is, the translational inerter assembly 500 uses a passive means to change the dynamics of the flight control system 120 (see FIG. 31) instead of active control elements, such as one or more actuators 202 (see FIG. 31) and valve size or diameter of hydraulic actuators 204 (see FIG. 28).

Figure 32:
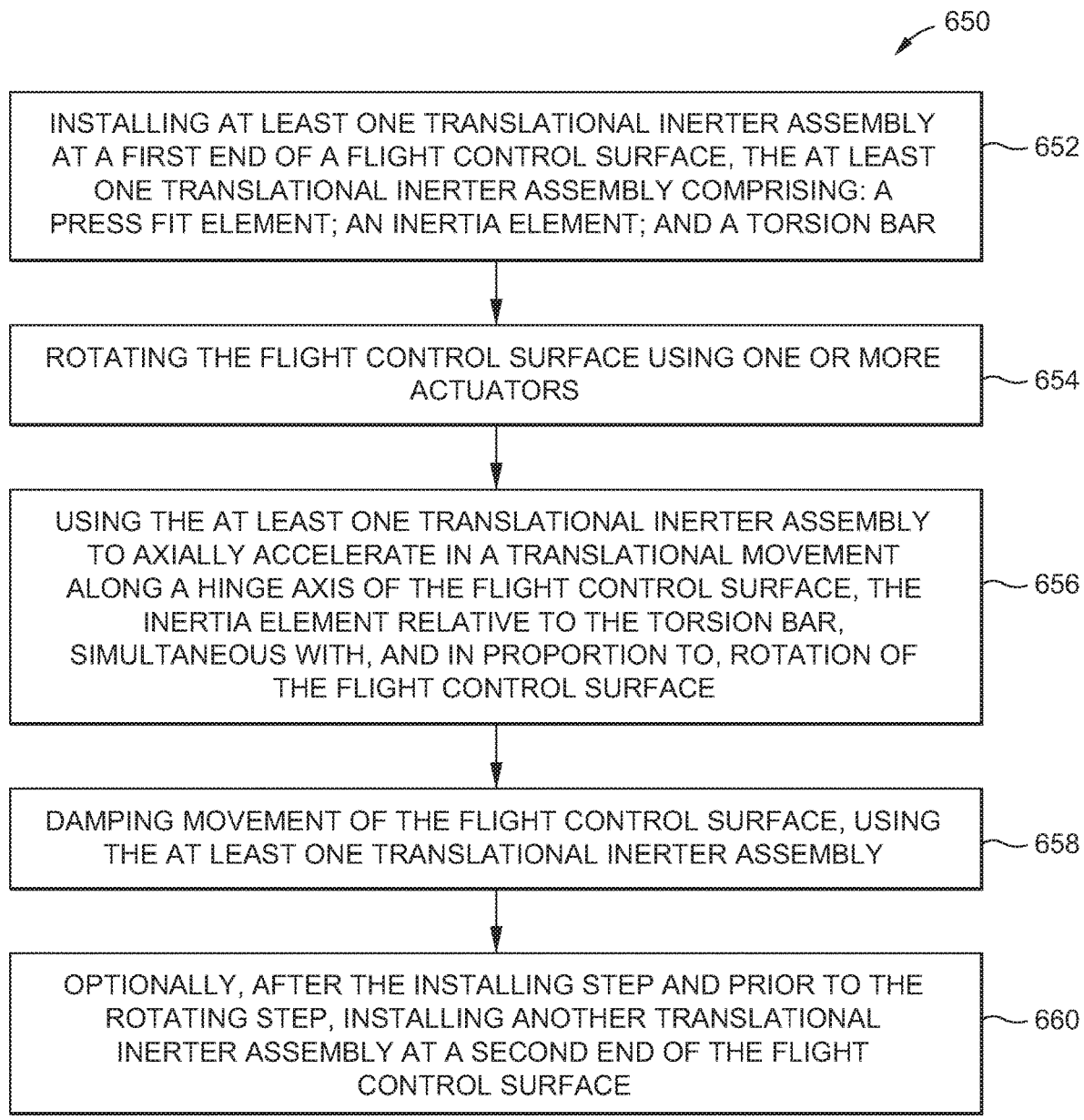
FIG. 32 is a flowchart having one or more operations that may be included in a method for damping movement of a flight control surface of an aircraft.

Now referring to FIG. 32, FIG. 32 is a flowchart having one or more operations that may be included in a method 650 for damping movement 606 (see FIG. 31) of a flight control surface 122 (see FIG. 31) of an aircraft 100 (see FIGS. 25, 31). As shown in FIG. 32, the method 650 comprises step 652 of installing at least one translational inerter assembly 500 at a first end 502a of the flight control surface 122.

As discussed in detail above, the at least one translational inerter assembly 500 (see FIGS. 29A-31) comprises the press fit element 510 (see FIGS. 29A-31) fixedly disposed within the first end 502a (see FIGS. 29A-30B) of the flight control surface 122 (see FIGS. 29A-31) and rotatably movable with the flight control surface 122. The at least one translational inerter assembly 500 (see FIGS. 29A-31) further comprises the inertia element 512 (see FIGS. 29A-31) coupled to and installed in the press fit element 510. The inertia element 512 (see FIGS. 29A-31) has the plurality of exterior helical splines 550 (see FIGS. 30A-31) corresponding to the plurality of interior helical splines 536 (see FIGS. 30A, 31) of the press fit element 510. The at least one translational inerter assembly 500 (see FIGS. 29A-31) further comprises the torsion bar 514 (see FIGS. 29A-31) having the torsion bar first end 564a (see FIGS. 30A-30B) coupled to and installed in the inertia element 512 (see FIGS. 30A-30B), and having the torsion bar second end 564b (see FIGS. 30A-30B) fixedly attached to the support structure 116 (see FIGS. 30B, 31) of the aircraft 100 (see FIGS. 25, 31). The torsion bar 514 (see FIGS. 30A-30B) further has the plurality of exterior linear splines 572 (see FIGS. 30A-30B) corresponding to the plurality of interior linear splines 558 (see FIGS. 30A, 31) of the inertia element 512 (see FIGS. 30A, 31).

The step 652 (see FIG. 32) of installing further comprises installing the at least one translational inerter assembly 500 (see FIGS. 29A-31) further comprising a splined attachment element 520 (see FIGS. 29A-31) coupled to the torsion bar 514 (see FIGS. 29A-31). The torsion bar second end 564b (see FIGS. 30A-30B) is fixedly attached to the support structure 116 (see FIG. 30B) of the aircraft 100 (see FIGS. 25, 31), via the first torsion bar bearing 506a (see FIGS. 30B, 31) attached to the splined attachment element 520 (see FIGS. 30B, 31). The first torsion bar bearing 506a (see FIGS. 30B, 31) constrains the torsion bar 514 (see FIGS. 30B, 31) in six (6) degrees of freedom. As shown in FIG. 29B, the first torsion bar 514a is attached via the first torsion bar bearing 506a to the support structure 116, and the second torsion bar 514b is attached via the second torsion bar bearing 506b to the support structure 116.

The step 652 (see FIG. 32) of installing further comprises installing the at least one translational inerter assembly 500 (see FIGS. 29A-31) further comprising attachment points 504 (see FIGS. 29A-31), such as the first bearing 504a (see FIGS. 29A-31) attaching the first end 502a (see FIGS. 29A-31) of the flight control surface 122 (see FIGS. 29A-31) to the support structure 116 (see FIGS. 29A-29B, 30B, 31), and the second bearing 504b (see FIGS. 29A-31) attaching the second end 502b (see FIGS. 29A-31) of the flight control surface 122 to the support structure 116. The first bearing 504a (see FIGS. 29A-31) and the second bearing 504b (see FIGS. 29A-31) constrain the flight control surface 122 (see FIGS. 29A-31) in five (5) degrees of freedom and allow rotation about the hinge axis 126 (see FIGS. 29A, 30A).

As shown in FIG. 32, the method 650 further comprises step 654 of rotating the flight control surface 122 (see FIGS. 29A-31) using one or more actuators 202 (see FIGS. 28, 31), such as hydraulic actuators 204 (see FIG. 28). As shown in FIGS. 28 and 31, the actuator 202 may comprise the cap end 212, the piston 216, the piston rod 224, and the rod end 214. The rod end 214 (see FIG. 28) may be coupled to the one translational inerter assembly 500 (see FIGS. 27, 28) via the bellcrank 128 (see FIG. 28) or via the horn element 516 (see FIGS. 27, 31) and bearing 518 (see FIGS. 27, 31).

As shown in FIG. 32, the method 650 further comprises step 656 using the at least one translational inerter assembly 500 (see FIGS. 29A-31) to axially accelerate in a translational movement 604 (see FIG. 31) along the hinge axis 126 (see FIGS. 29A, 30A, 31) of the flight control surface 122 (see FIGS. 29A-31), the inertia element 512 (see FIGS. 29A-31) relative to the torsion bar 514 (see FIGS. 29A-31), simultaneous with, and in proportion to, rotation of the flight control surface 122.

The step 656 (see FIG. 32) of using the at least one translational inerter assembly 500 (see FIGS. 29A-31) to axially accelerate the inertia element 512 (see FIGS. 29A-31) relative to the torsion bar 514 (see FIGS. 29A-31) comprises axially accelerating the first inertia element 512a (see FIGS. 29B, 31) and the second inertia element 512b (see FIGS. 29B, 31) in opposite directions 553 (see FIG. 31), along the respective first torsion bar 514a (see FIGS. 29B, 31) and the second torsion bar 514b (see FIGS. 29B, 31), when the flight control surface 122 (see FIGS. 29B, 31) is rotated.

As shown in FIG. 32, the method 650 further comprises step 658 of damping movement 606 (see FIG. 31) of the flight control surface 122 (see FIGS. 29A-31), using the at least one translational inerter assembly 500 (see FIGS. 29A-31). The step 658 (see FIG. 32) of damping movement 606 (see FIG. 31) of the flight control surface 122 (see FIGS. 29A-31) further comprises damping movement 606 of the flight control surface 122 to provide increased flutter suppression 610 (see FIG. 31) of the flight control surface 122. This preferably results in an improved hydraulic application stability 612 (see FIG. 31) and an increased efficient flight control actuation 614 (see FIG. 31).

As shown in FIG. 32, the method 650 may further comprise step 660 of, after the step 652 of installing and prior to the step 654 of rotating, optionally, installing another translational inerter assembly 500 (see FIGS. 29B, 31) at the second end 502b (see FIGS. 29B, 31) of the flight control surface 122 (see FIGS. 29B, 31). The two translational inerter assemblies 500 (see FIGS. 29B, 31) preferably comprise the first translational inerter assembly 500a (see FIGS. 29B, 31), with the first press fit element 510a (see FIGS. 29B, 31), the first inertia element 512a (see FIGS. 29B, 31), and the first torsion bar 514a (see FIGS. 29B, 31), attached to the first end 502a (see FIGS. 29B, 31) of the flight control surface 122, and preferably comprise the second translational inerter assembly 500b (see FIGS. 29B, 31), with the second press fit element 510b (see FIGS. 29B, 31), the second inertia element 512b (see FIGS. 29B, 31), and the second torsion bar 514b (see FIGS. 29B, 31), attached to the second end 502b (see FIGS. 29B, 31) of the flight control surface 122.

Disclosed versions of the translational inerter assembly 500 (see FIGS. 29A-31) and method 650 (see FIG. 32) for damping movement 606 (see FIG. 31) of the flight control surface 122 (see FIGS. 29A-31) of the aircraft 100 (see FIGS. 25, 31) have numerous advantages such as, increased flutter suppression 610 (see FIG. 31) by providing surface torsion critical damping, and reduced actuator swept volume and smaller actuators providing engine power offtake and weight and power offtake reduction, where reduced power offtake enables more fuel efficient engines. In addition, disclosed versions of the translational inerter assembly 500 (see FIGS. 29A-31) and method 650 (see FIG. 32) have the advantages of enabling high pressure hydraulic actuator sizing to reduce flow and weight, reducing space required by enabling smaller actuator, valve, and horn element radius, reducing required stiffness to achieve an aero-servo-elasticity goal, addressing force equalization by enabling reduced linear stiffness, increasing compliance that reduces force-fight for active-active modes, enhancing electro-hydrostatic actuator (EHA) bandwidth without increasing stiffness or heat, and reducing flight control surface resonant amplitude that reduces fatigue. Moreover, disclosed versions of the translational inerter assembly 500 (see FIGS. 29A-31) and method 650 (see FIG. 32) have the further advantages of enabling unanticipated kinematic action to further reduce flow and weight, reducing fatigue by eliminating amplification of torsion resonance, resolving potential electro-hydrostatic actuator (EHA) thermal issues by relaxing stiffness requirement, enabling relaxation of an electromechanical actuator (EMA) backlash requirement, including tolerances in automated sizing to evaluate required precision, using variable pressure to achieve weight reduction at comparable reliability, and sizing pressure, e.g., greater than 6000 psi (pounds per square inch) which may decrease offtake with small weight penalty, where lower offtake enables higher bypass ratio, which improves fuel efficiency.

In addition, disclosed versions of the translational inerter assembly 500 (see FIGS. 29A-31) and method 650 (see FIG. 32) permit the elimination of any stiffness constraint in sizing, which enables reduced hydraulic system and aircraft size, reduced weight, and reduced power. This solution presents a more space efficient assembly and method. Further, disclosed versions of the translational inerter assembly 500 (see FIGS. 29A-31) and method 650 (see FIG. 32) may improve the performance of aircraft 100 (see FIG. 25) by improving the actuation system design. Further, the translational inerter assembly 500 (see FIGS. 30A-30B) and method 650 (see FIG. 32) is a passive solution 616 (see FIG. 31), that is, it uses a passive means to change the dynamics of the flight control system 120 (see FIG. 25) instead of the active control elements such as the actuator 202 (see FIG. 28) and valve size or diameter.

Moreover, disclosed versions of the translational inerter assembly 500 (see FIGS. 29A-31) and method 650 (see FIG. 32) may be installed within the flight control surface 122 (see FIGS. 29A-31), about the hinge axis 126 (see FIG. 29A, 30A) on the aircraft 100 (see FIGS. 25, 31), to increase damping of the flight control surface 122. Increased damping will suppress flutter response of the flight control surface 122 (see FIGS. 29A-31) to provide improved hydraulic application stability 612 (see FIG. 31) and enable an increased efficient flight control actuation 614 (see FIG. 31). This solution permits the addition of one or more translational inerter assemblies 500 (see FIGS. 29A-31) to the flight control system 120 (see FIGS. 25, 31), which changes the dynamic characteristic of the hardware under control, rather than complicating the control elements themselves.

In addition, disclosed versions of the translational inerter assembly 500 (see FIGS. 30A-30B) and method 650 (see FIG. 32) may be used to address flutter critical control surface applications on aircraft 100 (see FIG. 25) to further optimize the translational inerter assembly 500 (see FIGS. 30A-30B) design by enabling a translating inerter instead of a rotational inerter, where the translational inerter assembly 500 (see FIGS. 30A-30B) comprises the torsion bar 514 (see FIGS. 30A-30B), or torsion rod, fixed to the support structure 116 (see FIGS. 26, 30B), such as the wing 114 (see FIGS. 26, 30B), the wing portion support structure 17 (see FIGS. 26, 30B), and/or the wing spar 18 (see FIG. 26), and where the inertia element 512 (see FIGS. 30A-30B) translates rather than rotates. The linear spline exterior 570 (see FIGS. 30A-30B) of the torsion bar 514 (see FIGS. 30A-30B) is undercut at its fatigue location and preferably has a longitudinal linear spline exterior 570 (see FIG. 30A), where the inertia element 512 (see FIGS. 30A-30B) slides translationally along the plurality of exterior linear splines 572 (see FIGS. 30A-30B), whenever the flight control surface 122 (see FIGS. 30A-30B) rotates.

The inertia element 512 (see FIGS. 30A-30B) is accelerated only in the translational movement 604 (see FIG. 31), or fashion, instead of rotating. Preferably, there are also at least two attachment points 504 (see FIGS. 30A-30B) connected to the support structure 116 (see FIGS. 26, 30B), such as the wing 114 (see FIGS. 26, 30B), the wing portion support structure 17 (see FIGS. 26, 30B), and/or the wing spar 18 (see FIG. 26), for further structural robustness. The torsion bar 514 (see FIGS. 29A-31) is extended beyond the first end 502a (see FIG. 29A) and/or second end 502b (see FIG. 29B) of the flight control surface 122 (see FIGS. 29A-31) and supported by the support structure 116 (see FIGS. 29A-29B, 30B, 31) in all six (6) degrees of freedom. Thus, the rotation of the flight control surface 122 (see FIGS. 29A-31) causes each inertia element 512 (see FIGS. 29A-31), for example, the first inertia element 512a (see FIG. 29B) and the second inertia element 512b (see FIG. 29B), to translate along the linear spline exterior 570 (see FIG. 30A) of the torsion bar 514 (see FIG. 30A) in opposite directions 553 (see FIG. 31). This opposite motion is required to reduce reaction force on the flight control surface 122 (see FIGS. 29A-31) from loading wing structure. When the flight control surface 122 (see FIGS. 29A-31) and the fixed press fit element 510 (see FIGS. 29A-31) within the flight control surface 122 moves, the inertia element 512 (see FIGS. 29A-31) is forced to translate along the hinge axis 126 (see FIGS. 29A, 30A, 31) by the helical or threaded engagement of the flight control surface 122 (see FIGS. 29A-31) and the fixed press fit element 510 (see FIGS. 29A-31) and the inertia element 512. This acceleration will dampen flight control surface 122 motion. Optionally, a second torsion bar 514b (see FIG. 29B) may be added on the other side of the flight control surface 122 to improve surface dampening. In addition, the first torsion bar bearing 506a (see FIGS. 29A-29B) constrains the torsion bar 514, such as the first torsion bar 514a (see FIGS. 29A-29B), and the second torsion bar bearing 506b (see FIG. 29B) constrains the torsion bar 514, such as the second torsion bar 514b (see FIG. 29B), in six (6) degrees of freedom. The first bearing 504a (see FIGS. 29A-2B) and the second bearing 504b (see FIG. 29B) constrain surface motion of the flight control surface 122 (see FIGS. 29A-29B) in five (5) degrees of freedom to permit rotation about the hinge axis 126 (see FIGS. 29A, 30A, 31).

Additional modifications and improvements of the present disclosure may be apparent to those of ordinary skill in the art. Thus, the particular combination of parts described and illustrated herein is intended to represent only certain examples of the present disclosure and is not intended to serve as limitations of alternative examples or devices within the spirit and scope of the disclosure.

What is claimed is:

1. A translational inerter assembly for damping movement of a flight control surface of an aircraft with a support structure, the translational inerter assembly comprising:
a press fit element rotatably disposed within the flight control surface;
an inertia element disposed in the press fit element; and
a torsion bar coupled to the inertia element and to the support structure of the aircraft, such that when the flight control surface rotates, the inertia element translates, and movement of the flight control surface is dampened.

2. The translational inerter assembly of claim 1, further comprising a splined attachment element coupled to the torsion bar, the splined attachment element having a plurality of interior linear splines corresponding to a plurality of exterior linear splines of the torsion bar.

3. The translational inerter assembly of claim 1, wherein the press fit element comprises a plurality of interior helical splines, the inertia element comprises a plurality of exterior helical splines and a plurality of interior linear splines, and the torsion bar comprises a plurality of exterior linear splines, and further wherein the plurality of exterior helical splines of the inertia element correspond to the plurality of interior helical splines of the press fit element, and the plurality of exterior linear splines of the torsion bar correspond to the plurality of interior linear splines of the inertia element.

4. The translational inerter assembly of claim 1, wherein the translational inerter assembly is attached to a horn and a bearing, and the horn and the bearing are further attached to one or more actuators for surface position control.

5. The translational inerter assembly of claim 4, wherein the one or more actuators comprise one or more hydraulic actuators, each of the one or more actuators comprising a piston coupled to a piston rod, the piston slidable within an actuator housing, and further comprising a rod end and a cap end axially movable relative to one another.

6. The translational inerter assembly of claim 1, wherein the torsion bar is fixedly attached to the support structure of the aircraft, via a first torsion bar bearing, the first torsion bar bearing constraining the torsion bar in six (6) degrees of freedom.

7. The translational inerter assembly of claim 1, further comprising a first bearing attaching a first end of the flight control surface to the support structure, and a second bearing attaching a second end of the flight control surface to the support structure, wherein the first bearing and the second bearing constrain the flight control surface in five (5) degrees of freedom and allow rotation about a hinge axis of the flight control surface.

8. The translational inerter assembly of claim 1, wherein when the movement of the flight control surface is dampened, an increased flutter suppression of the flight control surface is obtained, resulting in an improved hydraulic application stability and an increased efficient flight control actuation.

9. The translational inerter assembly of claim 1, wherein the flight control surface comprises an aileron, and the support structure comprises one of, a wing, a wing portion support structure, and a wing spar.

10. An aircraft, comprising:
a flight control surface pivotably coupled to a support structure;
one or more actuators actuating the flight control surface; and
at least one translational inerter assembly for damping movement of the flight control surface, the at least one translational inerter assembly comprising:
a press fit element rotatably disposed within the flight control surface;
an inertia element disposed in the press fit element; and
a torsion bar coupled to the inertia element and to the support structure, such that when the flight control surface rotates, the inertia element translates, and movement of the flight control surface is dampened.

11. The aircraft of claim 10, wherein the aircraft comprises two translational inerter assemblies comprising a first translational inerter assembly attached to a first end of the flight control surface, and comprising a second translational inerter assembly attached to a second end of the flight control surface.

12. The aircraft of claim 11, wherein the first translational inerter assembly has a first inertia element with a plurality of exterior helical splines comprising right hand direction helical splines, and wherein the second translational inerter assembly has a second inertia element with a plurality of exterior helical splines comprising left hand direction helical splines, and further wherein rotation of the flight control surface causes the first inertia element and the second inertia element to translate along a hinge axis of the flight control surface, and along a linear spline exterior of the torsion bar in opposite directions, to reduce reaction force on the flight control surface.

13. The aircraft of claim 10, wherein the flight control surface comprises an aileron, and the support structure comprises one of, a wing, a wing portion support structure, and a wing spar.

14. The aircraft of claim 10, wherein the translational inerter assembly further comprises a first bearing attaching a first end of the flight control surface to the support structure, and a second bearing attaching a second end of the flight control surface to the support structure, and further wherein the first bearing and the second bearing constrain the flight control surface in five (5) degrees of freedom and allow rotation about a hinge axis of the flight control surface.

15. A method for damping movement of a flight control surface of an aircraft having a support structure, the method comprising the steps of:
   attaching at least one translational inerter assembly to the flight control surface, the at least one translational inerter assembly comprising:
      a press fit element rotatably disposed within the flight control surface;
      an inertia element disposed in the press fit element; and
      a torsion bar coupled to the inertia element and to the support structure of the aircraft;
   rotating the flight control surface using one or more actuators, to cause the inertia element, via the press fit element, to translate along a hinge axis of the flight control surface, and to translate along the torsion bar; and
   damping movement of the flight control surface, using the at least one translational inerter assembly.

16. The method of claim 15, further comprising, after attaching the at least one translational inerter assembly and prior to rotating the flight control surface, attaching another translational inerter assembly to the flight control surface, wherein the two translational inerter assemblies comprise a first translational inerter assembly, with a first press fit element, a first inertia element, and a first torsion bar, attached to a first end of the flight control surface, and comprise a second translational inerter assembly, with a second press fit element, a second inertia element, and a second torsion bar, attached to a second end of the flight control surface.

17. The method of claim 16, wherein rotating the flight control surface further comprises using the at least one translational inerter assembly to axially accelerate the first inertia element and the second inertia element in opposite directions, along the respective first torsion bar and the second torsion bar, when the flight control surface is rotated.

18. The method of claim 15, wherein rotating the flight control surface using one or more actuators, to cause the inertia element to translate along the torsion bar further comprises rotating the flight control surface using one or more actuators, to cause the inertia element to translate along a linear spline exterior of the torsion bar, the linear spline exterior having a plurality of exterior linear splines corresponding to a plurality of interior linear splines of the inertia element.

19. The method of claim 15, wherein rotating the flight control surface using one or more actuators, comprises using one or more hydraulic actuators each comprising a piston coupled to a piston rod, the piston slidable within an actuator housing, and further comprising a rod end and a cap end axially movable relative to one another, and further wherein the one or more actuators are attached to a horn and a bearing, which is attached to the at least one translational inerter assembly.

20. The method of claim 15, wherein damping movement of the flight control surface further comprises damping movement of the flight control surface to provide increased flutter suppression of the flight control surface, resulting in an improved hydraulic application stability and an increased efficient flight control actuation.

* * * * *